United States Patent
Zowarka, Jr. et al.

(10) Patent No.: US 8,995,232 B2
(45) Date of Patent: Mar. 31, 2015

(54) ELECTROMAGNETIC SEISMIC VIBRATOR ARCHITECTURE

(75) Inventors: Raymond C. Zowarka, Jr., Austin, TX (US); Siddharth Pratap, Austin, TX (US); Jim Upshaw, Austin, TX (US); Michael C. Lewis, Austin, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 507 days.

(21) Appl. No.: 13/235,336

(22) Filed: Sep. 16, 2011

(65) Prior Publication Data

US 2012/0147709 A1 Jun. 14, 2012

Related U.S. Application Data

(63) Continuation-in-part of application No. 12/724,807, filed on Mar. 16, 2010, now Pat. No. 8,699,302.

(60) Provisional application No. 61/160,405, filed on Mar. 16, 2009.

(51) Int. Cl.
  *G01V 1/155* (2006.01)
  *B06B 1/04* (2006.01)
  *G01V 1/00* (2006.01)

(52) U.S. Cl.
  CPC ............... *G01V 1/005* (2013.01); *B06B 1/045* (2013.01); *G01V 1/155* (2013.01)
  USPC ............................ 367/189; 181/113; 181/121

(58) Field of Classification Search
  USPC ................................... 367/189; 181/113, 121
  See application file for complete search history.

(56) References Cited

U.S. PATENT DOCUMENTS

| | | | | |
|---|---|---|---|---|
| 3,123,728 A | * | 3/1964 | Kreiskorte | 310/19 |
| 3,287,696 A | * | 11/1966 | Cholet et al. | 367/189 |
| 3,313,370 A | * | 4/1967 | Cole | 367/189 |
| 4,222,455 A | | 9/1980 | Lerwill | |
| 4,529,898 A | * | 7/1985 | Voloshin et al. | 310/15 |
| 4,631,430 A | * | 12/1986 | Aubrecht | 310/12.24 |
| 4,821,246 A | | 4/1989 | Van Kampen et al. | |
| 8,228,762 B2 | * | 7/2012 | Greig | 367/189 |

FOREIGN PATENT DOCUMENTS

| | | |
|---|---|---|
| NL | 9002065 A | 4/1992 |
| SU | 1022101 A1 | 6/1983 |

OTHER PUBLICATIONS

Notification of International Search Report and Written Opinion issued by International Searching Authority on Jul. 7, 2011 for Intl. App. No. PCT/US2011/027432, filed on Mar. 16, 2010 (First Named Inventor—R. Zowarka; Applicant—Board of Regents, The University of Texas System; pp. 1-13).

* cited by examiner

*Primary Examiner* — Ian J Lobo
(74) *Attorney, Agent, or Firm* — Ballard Spahr LLP

(57) ABSTRACT

Aspects described herein relate to an electromagnetic seismic vibrator (EMSV) architecture that provide wide frequency range operation, ground force application with high fidelity, and low environmental impact. The EMSV architecture can include a base member that can support a force coil and mitigate electrical heating due, at least in part, to spurious currents. The EMSV architecture can include means for restricting movement of a reaction member included in the EMSV architecture relative to the base member. Such means can permit mitigation of damage of the EMSV architecture in scenarios in which control of the EMSV architecture may fail.

28 Claims, 98 Drawing Sheets

Control diagram

Sweep force control diagram

Vibrator electrical waveforms

Spectral power density

Reaction mass motion

Random phase ground force comparison

Random phase ground force comparison

Random phase spectral power comparison

Random phase spectral power comparison

Random amplitude ground force comparison

Random amplitude ground force comparison

Random amplitude spectral power comparison

Random amplitude spectral power comparison

Spectral power plots for fixed frequency sweeps

Spectral power plots for fixed frequency sweeps

Spectral power plots for fixed frequency sweeps

Electromagnetic shaker suitable for a large stroke (a) Two coils connected in anti-series (b) One of the two coils is shorted Connecting two coils in anti-parallel will yield a larger inductance at higher frequency than shorting one of the two coils.

Geometry for generating lift force from a fixed field winding on the steel structure Forces generated when the currents are creating lift for various positions along the highlighted segment in Figure 9C Forces generated when the currents are creating a down force for various positions along the highlighted segment in Figure 9C Force variation with displacement for constant current Baseline design geometry Variables to perturb during the optimization Three-dimensional surface is constructed to link the optimization variables to the problem geometry Magnetic optimization requires smearing the current over a region Current density multiplier as a function of β where β represents the proportion of the total force load made up by the dc (steady state weight) component Optimized exemplary design dimensions Field plot for the optimized design at maximum excitation Armature coil layout using two parallel circuits dc lift coils are best positioned in the center of the armature stack Magnetic field through the middle of the armature gap

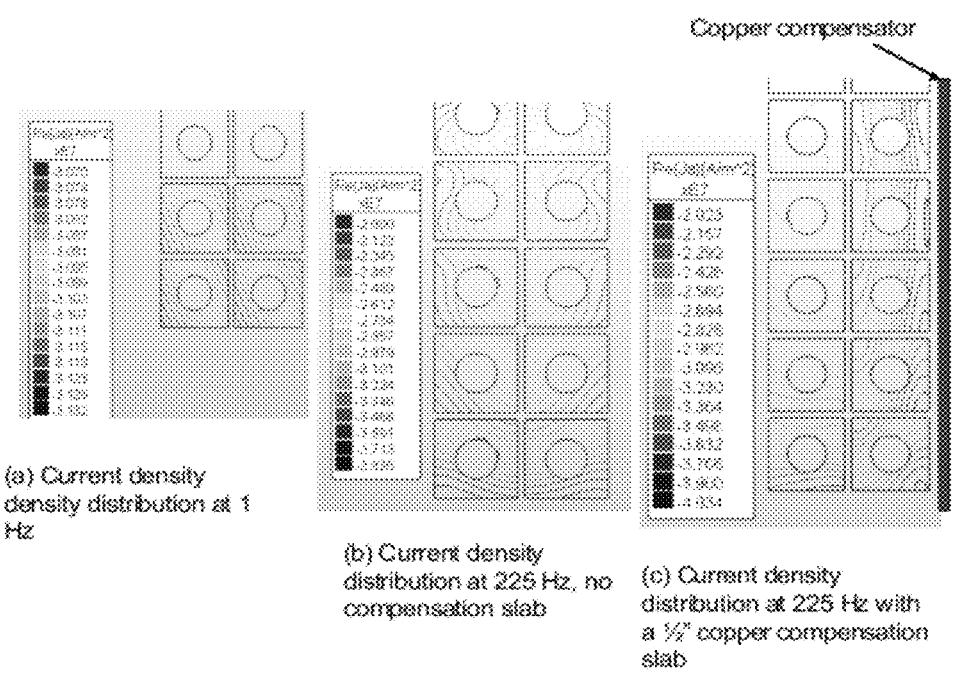
FIG. 9Q(a), (b) and (c)
Plots of current density changes with frequency and in the presence of a copper compensator (e.g., a lining, or a sleeve, coupled to a reaction member of an EMSV). Such compensator is a passive compensator.

Power and voltage requirements for thin and thick compensator with identical armature coil excitation (225 Hz, maximum excitation in certain embodiments)

Equivalent ladder network used to represent the armature circuit

Performance of the ladder equivalent circuit to model the armature's power dissipation.

Transient analysis to compute force with the dc field and ac armature excitation Placing two columns magnets on either side of the armature gap Leakage field away from the armature gap with magnet excitation

| Resin | Class | Tg (°C) | HDT (°C) |
|---|---|---|---|
| VRI 777C | H | 94 | 55 |
| PDG Y881K | H | 131 | 120 |
| Y881K + R26 | H | 140 | 124 |
| Dolph | H | 109 | 67 |
| Master Bond | H | 128 | 118 |
| Epoxylite 347 | H | 139 | 123 |
| Epoxylite #6107 | H | 154 | 139 |

Heat deflection and glass transition temperatures of insulation systems

Exemplary insulation system design that can be exploited in a plurality of electrical conductor rings utilized in force coils or field coils

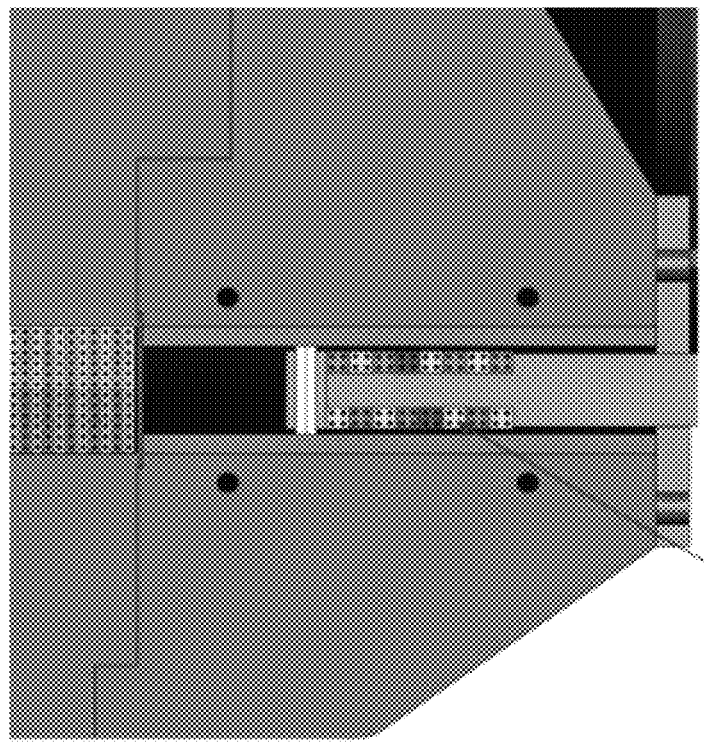
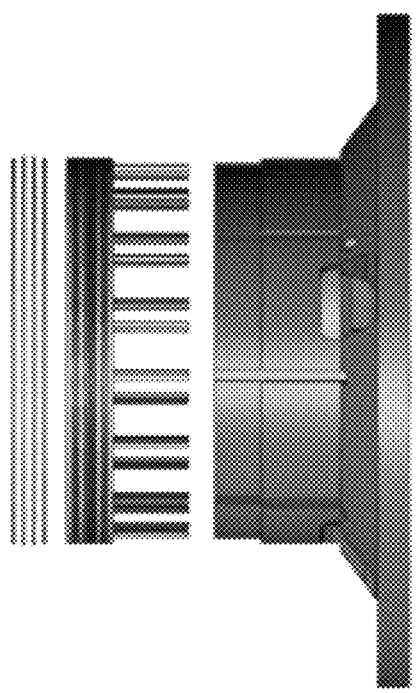
1/4 in. Square Copper Tubing Conductor with 1/8in. ID hole for active cooling
FIG. 11E Outer casting (e.g., a steel casting) prior to copper ring placement Center casting (e.g., a steel casting) prior to copper ring placement EMSV reaction mass with a base member (e.g., a baseplate) inserted EMSV base member (e.g., baseplate) guide bearings truck showing the top view truck showing the side view Reaction mass D.C. load
• 17,000 lb Electromagnetic load
• 60,000 lbs varying sinusoidally Airbag load around perimeter
• 53,000 lbs Lateral deflection from lateral load Modified base member (e.g., baseplate) with stiffening ribs Boiling and freezing temperatures of ethylene glycol aqueous solutions (ASHRAE handbook)

Field coil cooling design

Finite-element thermal model mesh for field coils

Finite-element thermal model meshes for lift coils and compensating plates

Field coil steady-state temperature distribution (using average coolant temperature)

Field coil steady-state temperature distribution (using exit coolant temperature)

Lift coil steady-state temperature distribution (using average coolant temperature)

Lift coil steady-state temperature distribution (using exit coolant temperature)

Compensating plate steady-state temperature distribution (using average coolant temperature)

Compensating plate steady-state temperature distribution (using exit coolant temperature)

Magnetic field map in air gap

Current check out of a PWM at 10 Hz

Check out of a PWM converter at 50 Hz

Conductors redesigned with 0.125 in. tubing

Conductor comprised of a plurality of electric conductors transposed in a Roebel array

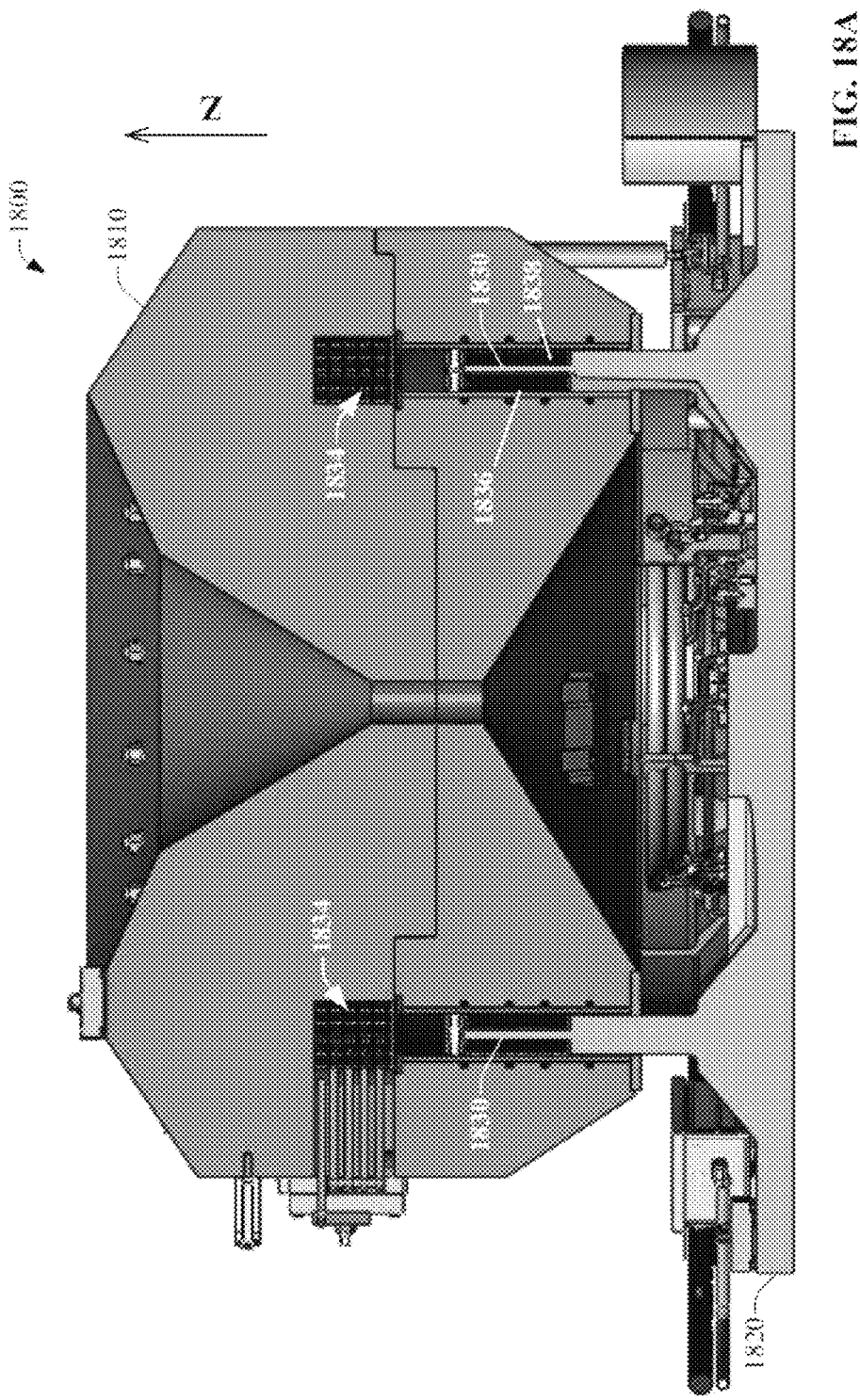

ELECTROMAGNETIC SEISMIC VIBRATOR ARCHITECTURE

CROSS-REFERENCE TO RELATED APPLICATIONS

This application is a continuation-in-part of U.S. patent application Ser. No. 12/724,807, filed on Mar. 16, 2010, which claims benefit of and priority to U.S. provisional patent application No. 61/160,405 filed Mar. 16, 2009. The entireties of the above-captioned patent applications are incorporated herein by reference and made a part hereof.

BACKGROUND

Vibroseis, as known in the art, is a method used in exploration seismology to propagate energy signals into the earth over an extended period of time as opposed to the near instantaneous energy provided by an impulsive source such as explosives or weight-drop trucks. Data recorded in this way can be correlated to convert the extended source signal into an impulse. Generally, the signal has been generated by a servo-controlled hydraulic vibrator or shaker unit mounted on a mobile base unit.

Techniques for using seismic waves to probe for oil reserves or other geological structures and/or anomalies in the earth are becoming quite sophisticated. The key requisite for the work is a high fidelity ground shaker whose force, frequency, and phase can be controlled precisely. Currently, hydraulic shakers dominate the industry. These devices can be truck-mounted for mobility. Generally, with hydraulic shakers, small mechanical actuators control high pressure hydraulic fluid flow to apply sinusoidal compressive forces to a baseplate. Large forces can be achieved with this design. Yet, there are drawbacks to hydraulic shakers. The use of hydraulic fluids can impose environmental concerns regarding leaks and spillage. Furthermore, hydraulic shakers generally are relatively slow-responding, which can result in decreased fidelity to the input signal.

SUMMARY

Certain embodiments of the disclosure provide an electromagnetic seismic vibrator (EMSV) architecture that can replace traditional hydraulic oil seismic vibrator systems employed to actuate mass movement. Embodiments described herein can provide wide frequency range of operation, ground force application with high fidelity with respect to an excitation waveform, and low environmental impact. Some uses of the embodiments of the EMSV architecture described herein can include seismic exploration and vibroseis applications.

The EMSV architecture can include a base member that can support a force coil and mitigate electrical heating due, at least in part, to spurious currents. Mitigation of such currents (e.g., eddy currents) can improve controllability of the EMSV architecture. The force coil can be wound from discrete electrical conductors assembled in an array that can be transposed in a Roebel pattern, which can reduce power losses. The EMSV architecture can include means for restricting movement of a reaction member included in the EMSV architecture relative to the base member. Such means can permit mitigation of damage of the EMSV architecture in scenarios in which control of the EMSV architecture may fail.

In one aspect, the disclosure provides an apparatus for excitation of a seismic platform (e.g., a portion of ground). Such apparatus can comprise a reaction member; a first plurality of electrical conductor rings (ECRs) in communication with a source of electric current, the first plurality of ECRs being coupled to a portion of the reaction member, wherein the first plurality of ECRs is configured to transport a selectable first electric current effective to create a magnetic field of a desired strength; an annular base member having an upright upper end portion having an inner annular surface and an outer annular surface, wherein the reaction member is operatively coupled to the base member for selective axial movement about an equilibrium position relative to the annular base member; and a second plurality of ECRs in communication with a source of electric current, the second plurality of ECRs being coupled to at least a portion of the inner annular surface or the outer annular surface of the upper end portion of the annular base member, wherein the second plurality of ECRs is configured to transport a selectable second electric current effective to operatively interact with the magnetic field generated by the first plurality of ECRs to selectively displace the reaction member from the equilibrium position, and wherein at least a portion of the second plurality of ECRs are transposed in a Roebel array.

In another aspect, the disclosure provides another apparatus for excitation of a seismic platform (e.g., a portion of ground). The apparatus can comprise a reaction member; a first plurality of electrical conductor rings (ECRs) in communication with a source of electric current, the first plurality of ECRs being coupled to a portion of the reaction member, wherein the first plurality of ECRs is configured to transport a selectable first electric current effective to create a magnetic field of a desired strength; an annular base member having an upright upper end portion and an elongate lower portion, the upper end portion having a bottom end, an inner annular surface and an outer annular surface, the elongate lower portion having a top end defining an annular slot that is configured to accept a portion of the upper end portion proximate to the bottom end of the upper end portion, wherein the upper end portion has a split ring shape, and wherein the reaction member is operatively coupled to the base member for selective axial movement about an equilibrium position relative to the annular base member; and a second plurality of ECRs in communication with a source of electric current, the second plurality of ECRs being coupled to at least a portion of the inner annular surface or the outer annular surface of the upper end portion of the annular base member, wherein the second plurality of ECRs is configured to transport a selectable second electric current effective to operatively interact with the magnetic field generated by the first plurality of ECRs to selectively displace the reaction member from the equilibrium position, and wherein at least a portion of the second plurality of ECRs are transposed in a Roebel array.

Various advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

FIG. 9I is an illustration of a three-dimensional surface is constructed to link the optimization variables to the problem geometry.

FIG. 9O illustrates dc lift coils are best positioned in the center of the armature stack.

FIGS. 9Q(a), (b) and (c) illustrate plots of how current density changes with frequency and in the presence of a copper compensator.

FIG. 11E illustrates EMV force coils.

FIG. 11I illustrates the outer steel casting prior to placement of a metal ring (e.g., a copper ring).

FIG. 14I illustrates lateral deflection from lateral load.

FIG. 18A illustrates an exemplary EMV baseline design.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Figure 1:
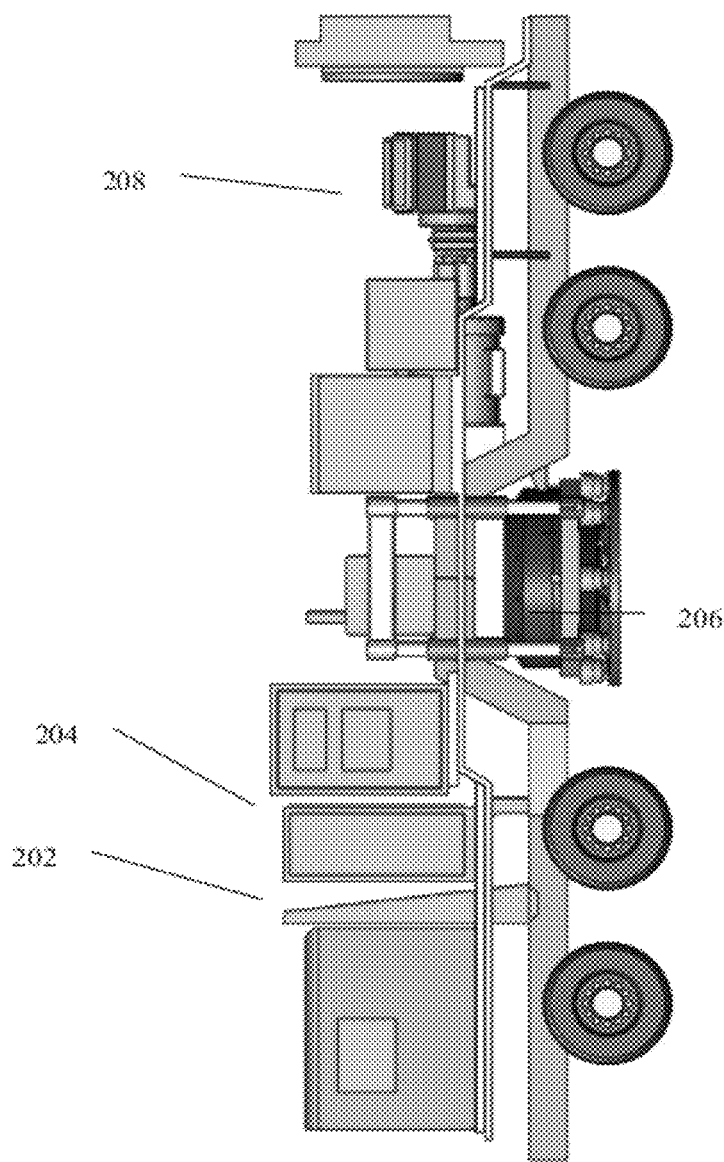
FIG. 1 illustrates an embodiment of a truck-mounted electromagnetic vibrator system comprised of a power supply, a control system, and a transducer.

Described herein are systems and methods of an electromagnetic vibrator. As shown in FIG. 1, in one embodiment an electromagnetic vibrator system can be comprised of a power supply 202, a control system 204 and a transducer 206. The embodiment of FIG. 1 is optionally shown in a truck-mounted configuration and is further comprised of a prime-mover 208 used for power generation.

Figure 2:
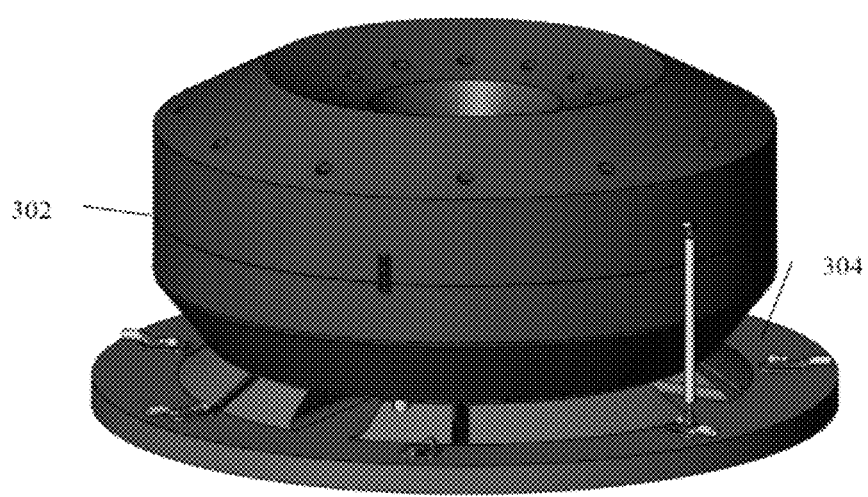
FIG. 2 illustrates one exemplary embodiment of a transducer.

FIG. 2 illustrates one exemplary embodiment of a transducer 306, which is generally comprised of a reaction mass 302 and a baseplate 304.

Figure 3:
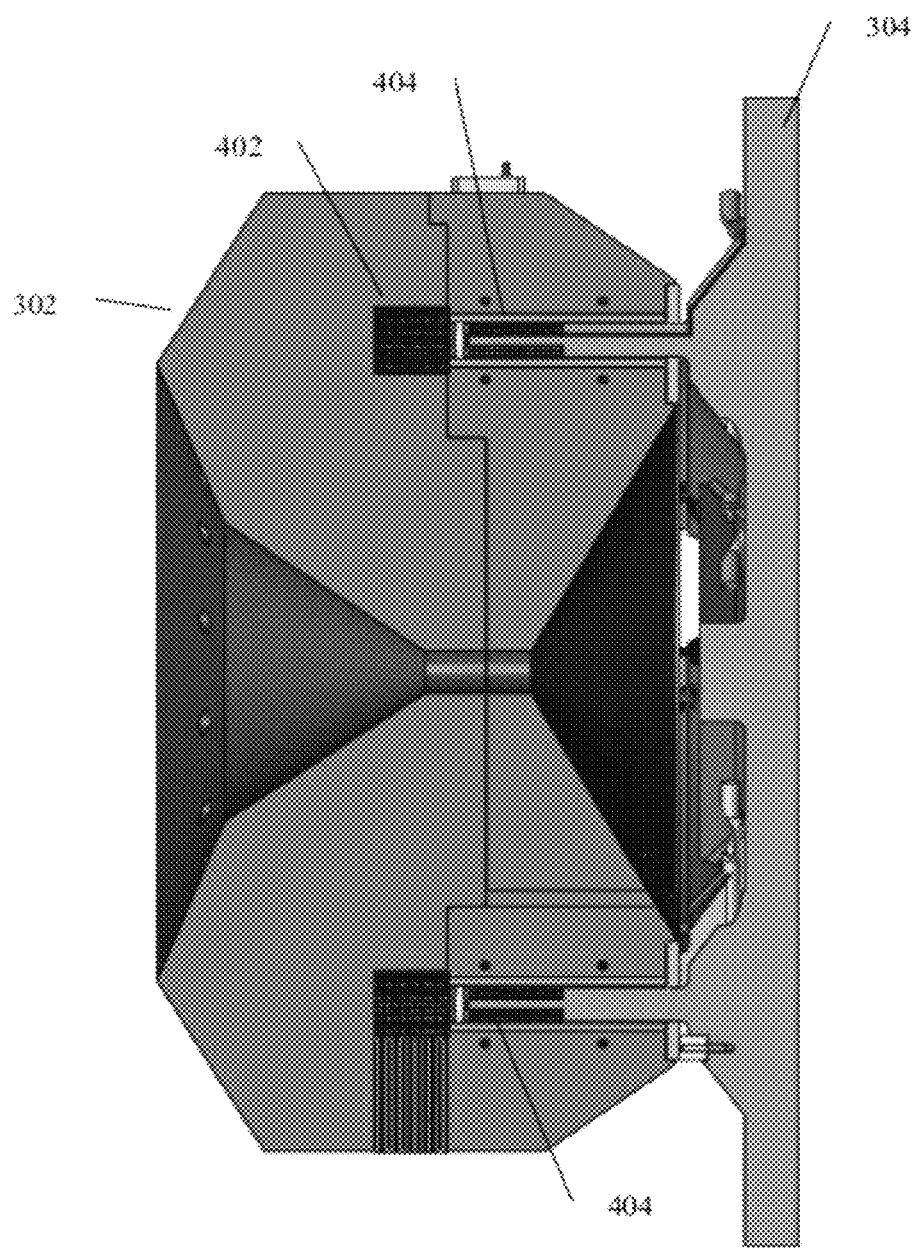
FIG. 3 is a cross section of one embodiment of a transducer.

FIG. 3 is a cross section of one embodiment of a transducer 306. As shown in this figure, field windings 402 are embedded within the reaction mass 302. A field winding current in the field windings 402 creates a magnetic field that reacts with a magnetic field created by an armature current in armature windings 404 that are associated with the baseplate 304. By varying one or more of the direction, frequency or magnitude (amplitude) of the field winding current and/or the armature winding current, the baseplate and/or the reaction mass can be moved in upward or downward directions.

Figure 4:
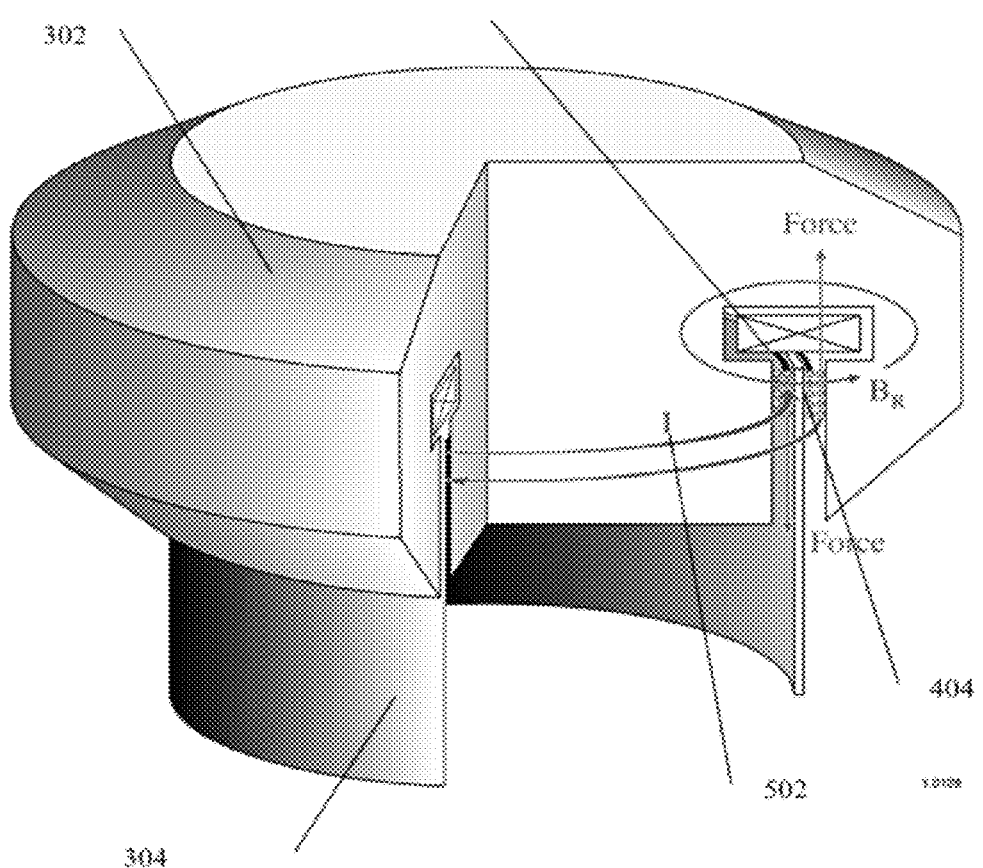
FIG. 4 further illustrates magnetic forces that cause movement of one embodiment of a transducer.

FIG. 4 further illustrates magnetic forces that cause movement of one embodiment of a transducer 306. As shown in FIG. 4, magnetic forces cause movement of the reaction mass 302 and/or the baseplate 304 (only a portion of the baseplate is shown in FIG. 4). The armature winding current (I) 502 creates a magnetic field that interacts with the magnetic field ($B_R$) created by the field winding current in the field winding 402. In one embodiment, the armature winding current can be a sinusoidally-varying current. The magnetic field created by the armature winding current can be controlled by changing one or more of the direction, amplitude, or frequency of the armature winding current. In one aspect, the armature winding comprises Roebel windings or other forms of transposed windings, as are known in the art. In one aspect, the field winding current can be direct current (DC).

In one exemplary embodiment, the shaker can create 60,000 lbf. In one aspect, it can have a dynamic range from about 6 Hz to about 150 Hz. In one aspect, the shaken mass or reaction mass can comprise about 16,000 lbm and the baseplate mass can comprise 3,000 lbm.

Referring back to FIG. 1, in one embodiment a power supply can be provided. While electrical power supplies as are available from a utility grid are contemplated within the scope of embodiments described herein, in one aspect a prime-mover such as an internal-combustion engine or combustion turbine, for example, can be provided that drives an electrical generator. Generally, the generator produces alternating current (AC) power. In one aspect, the generator can be single-phase. In another aspect, the generator can be multiple-phase, such as a three-phase generator.

Figure 5:
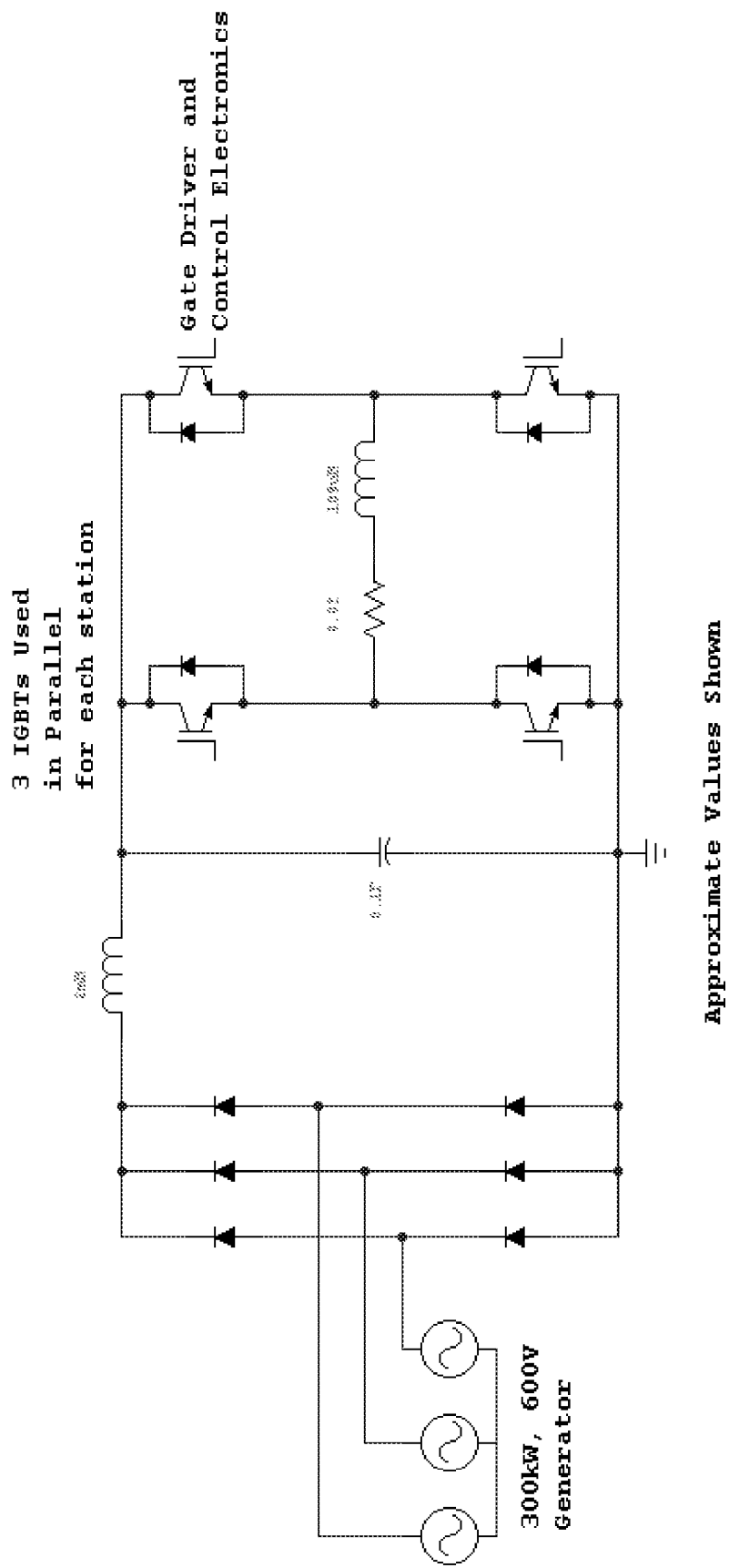
FIG. 5 illustrates one embodiment of an electrical schematic of an inverter scheme that can be used to create AC power and control an embodiment of the electromagnetic vibrator system.

FIG. 5 illustrates one embodiment of an electrical schematic of an inverter scheme that can be used to create AC power and control an embodiment of the electromagnetic vibrator system. As shown in FIG. 5, the inverter is generally comprised of a diode bridge and power transistors. In this embodiment, insulated-gate bipolar transistors (IGBT's) are used, though other power transistors as known in the art are contemplated with the scope of embodiments of the described invention. In one aspect, because of the large power requirements, the diodes and/or the power transistors may be operated in parallel. By operation of the power transistors, the control of the direction, and duration of current flow (and voltage polarity) through the load can be achieved.

Figure 6:
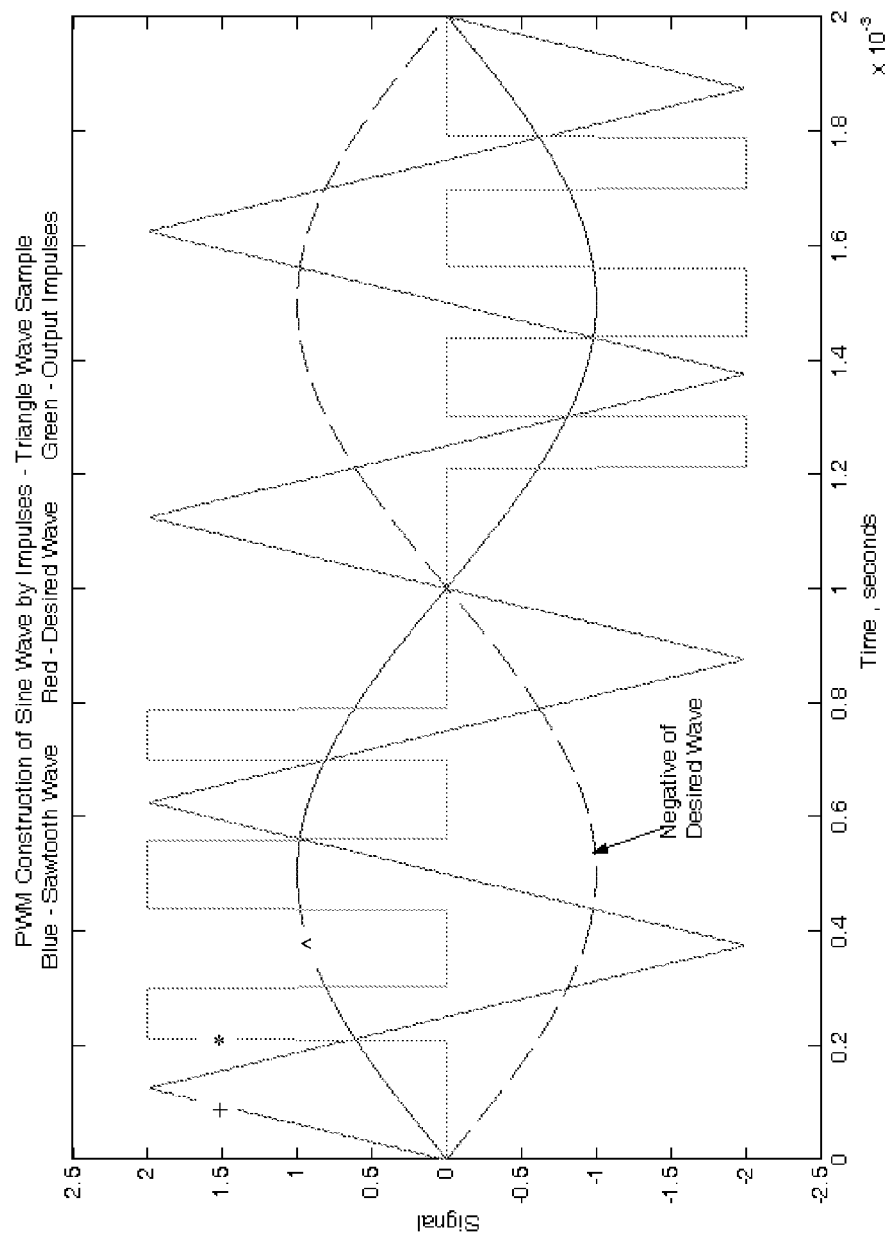
FIG. 6 illustrates a pulse-width modulated signal from the inverter can be combined with a sawtooth wave to produce a desired sinusoidal wave.

The output of the inverter of FIG. 5 can be used as an input to the armature winding of the transducer to control the operation of the transducer. For example, referring to FIG. 6 it can be seen that a pulse-width modulated signal (indicated by an *) from an inverter such as the one shown in FIG. 5 can be combined with a sawtooth wave (indicated by a + sign) to produce a desired sinusoidal wave (indicated by a ^). This sinusoidally-varying current can be used as an input to the transducer (armature winding), thus creating movement of the reaction mass of the transducer either up or down in a sinusoidal manner. Generally, the reaction of an embodiment of the electromagnetic transducer has higher fidelity to the input signal than can be achieved with a hydraulic shaker, thus fewer harmonics are imposed onto the vibroseis analysis.

Figure 7A:
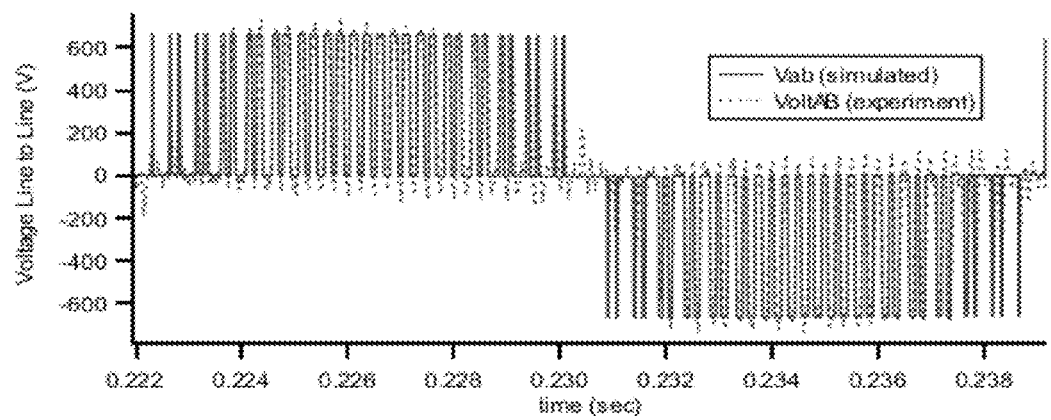
FIGS. 7A and 7B illustrate simulated and actual outputs from the embodiment of an inverter as shown in FIG. 5.
Figure 7B:
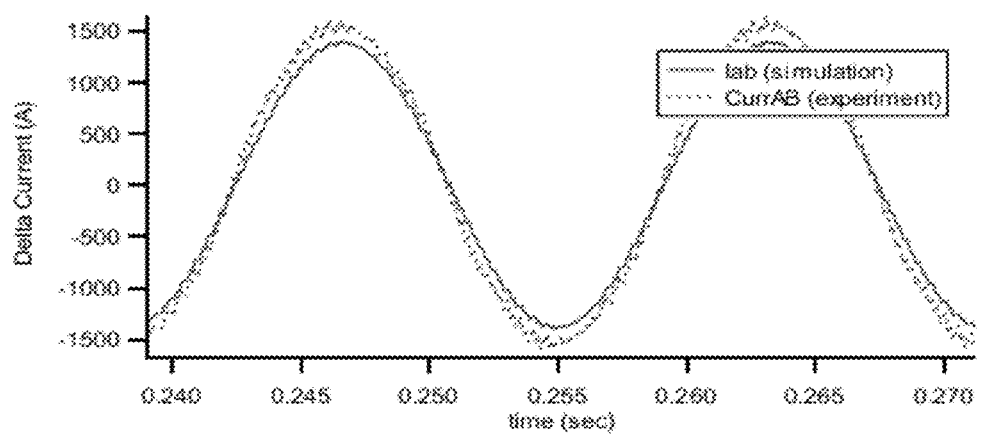

FIGS. 7A-7B illustrates simulated and actual voltage and current outputs from the embodiment of an inverter as shown in FIG. 5.

In one embodiment as described herein, an electromagnetic vibrator system comprises an AC power source driven by an internal-combustion engine such as a diesel engine; a power unit capable of providing the required electrical drive to the electromechanical transducer; an electromechanical transducer system that converts the electrical drive into mechanical vibrations to be transferred into the ground; and control and sensing circuitry, that insures that the energy transmitted into the ground faithfully represents the desired output. In one aspect, a described embodiment of the system can output typical linear and nonlinear vibroseis sweeps as well as special random sweeps developed for multi-source acquisition recording, and output a sustained full ground force of 60,000 lbs.-force with a low end frequency defined at the −3 dB point of full ground force of approximately 4 Hz and a high end frequency defined at the −3 dB point of full ground force of at least 125 Hz. One embodiment of an electromagnetic vibrator system has the following parameters: low distortion; 4 Hz to 225 Hz capability; 60,000 lb-force output from about 4 Hz to about 125 Hz; force taper from about 125 Hz to about 225 Hz; a reaction mass of approximately 16,500 lbs.; a baseplate having a mass of approximately 4,707 lbs.; linear, non linear, and special random vibroseis sweeps; water (or other liquid) cooled for continuous operation; and a total stroke of approximately 6" to 6¾".

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric.

Simulation Modeling

To provide a tool for evaluating the electrical and mechanical performance of the system design, a simulation code was employed. The code was implemented using the Simulink™ software, as known to one of ordinary skill in the art, which includes electrical power block elements. Simulink™ employs a graphical programming environment, so that the simulation layout is apparent visually, and is used to illustrate the discussion below.

Figure 8A:
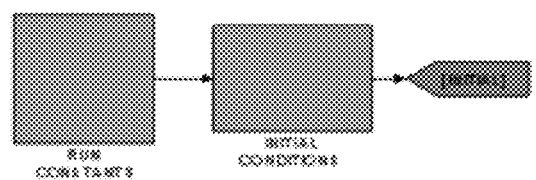
FIGS. 8A-8C illustrate a schematic of simulation model.
Figure 8B:
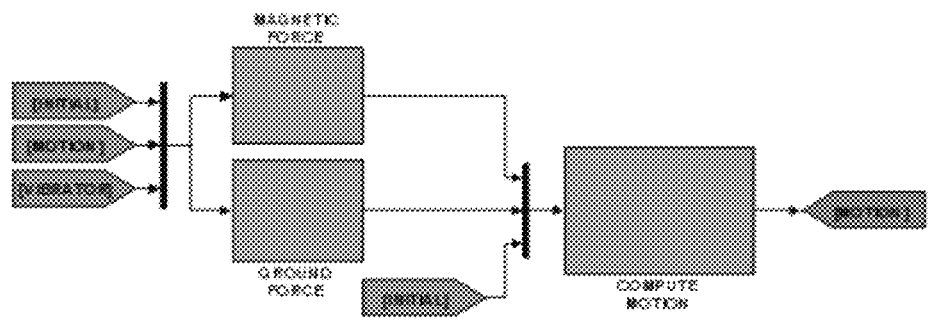
Figure 8C:
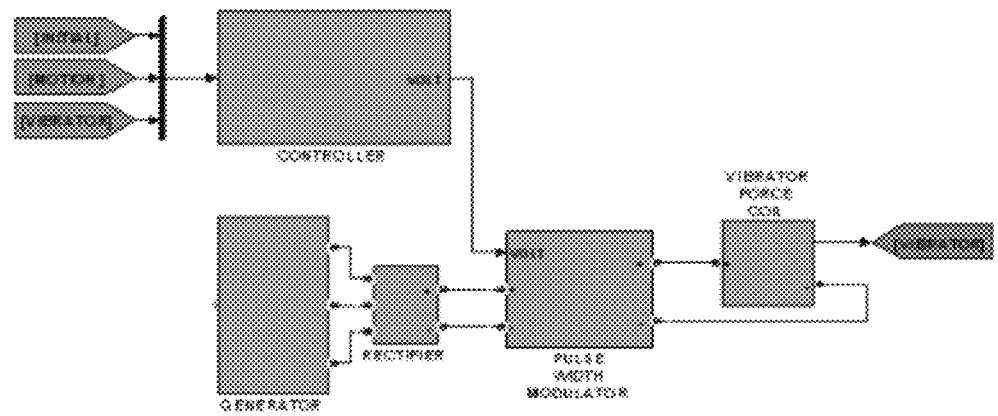

The structure of the simulation model is shown in FIGS. 8A-8C. The top modular blocks consist of one block wherein run parameters can be set: sweep time, start and end frequency, component masses, ground model spring constant and damping constant, etcetera. These constants are input to another block which establishes the initial mechanical conditions for the reaction mass and baseplate.

Another section of the simulation (see, e.g., FIG. 8B) can utilize initial conditions along with information about the actual computed motion of the reaction mass and baseplate, and electrical information about the vibrator, to compute electromagnetic force being applied, and also the force produced by the ground on the baseplate.

The ground model consists of a spring and damper, which are coupled to the baseplate, and the total hold down mass.

The spring constant used for simulations was set to either model a hard clay surface, or alternatively a softer response surface such as sand. The magnetic force module incorporates both the current in the force coil and the position of the force coil relative to the baseplate. In this way the spatial dependence of force generation, which was provided by finite element analysis (FEA), was included in the model. In addition, a bi-directional spring model was employed to look for harmonic distortion effects. This model of the ground used a hard spring constant for the ground under compression, and a smaller constant when the ground was relieving from compression.

The third code section (FIG. 8C) includes the vibrator control module, the AC generator prime power, a rectifier which takes the generator power and charges a DC link capacitor. For the simulation, the link voltage is 650 V.

Referring to FIG. 8C, the controller sends a demand voltage signal to a PWM inverter which generates the demand voltage at the input of the vibrator force coil. The PWM module employs an algorithm which generates the true output voltage pulses without requiring use of actual switching thyristors. The PWM architecture is full H-bridge. Recent runs have used a 12 kHz switching frequency for the PWM.

The actual vibrator load was initially modeled as a simple inductor and resistor. More recent runs have employed a more complex ladder network of inductors and resistors, to capture the dynamics of the passive compensation scheme employed in the vibrator design. The electrical modeling is very detailed and incorporates non-linear elements for force production, as well as PWM switching frequency effects.

A. Vibrator Controller Description

Figure 8D:
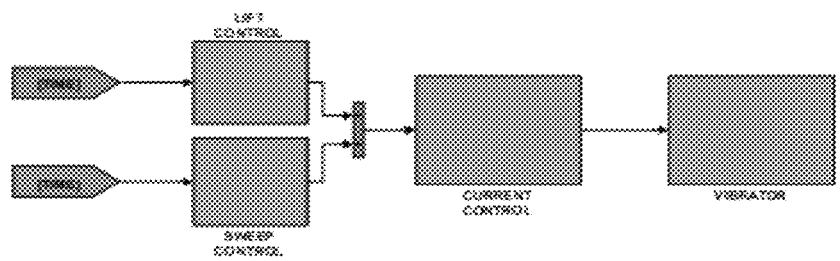
FIG. 8D illustrates a control diagram.

A block diagram of the control architecture is shown in FIG. 8D. It has a module which lifts the reaction mass from an initial rest position to a height at which the force coil is centered in the DC magnet air gap. This is the start point at which vibratory sweeps begin.

The lift module uses an open loop algorithm to generate the lift to the start position. That is, a lift position versus time profile is used to generate a force demand. The profile used has no initial or final velocity. It has the form:

$$\Delta X = \frac{\Delta X_0}{2}\{1 - \cos(\pi t/\Delta t)\} \text{ for } t < \Delta t \quad (1\text{-}1)$$

The lift module generates a current demand signal. Simulation results show that with this lift algorithm no start position over-shoot is produced. Once lift is completed, this module continues to generate a force demand which supplies enough force to compensate the gravitational force acting on the reaction mass. That is, it produces force to make the reaction mass neutrally buoyant.

Figure 8E:
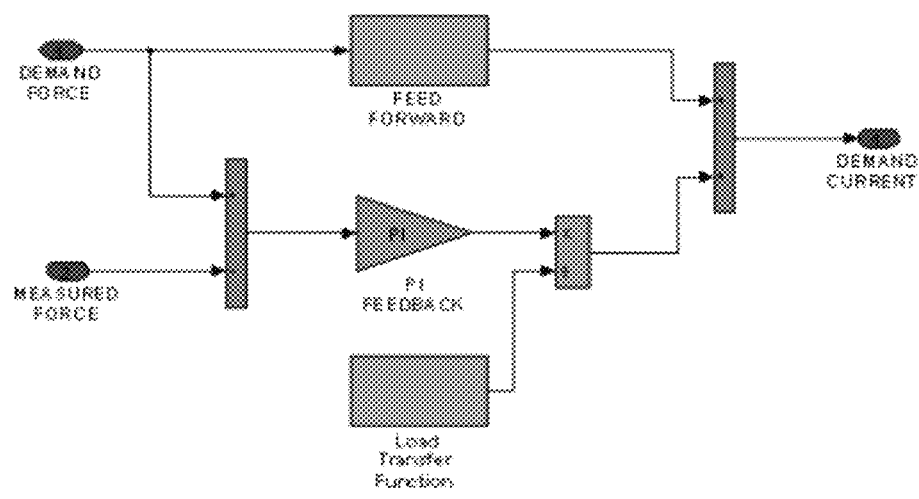
FIG. 8E illustrates a sweep force control diagram.

The sweep control module accepts as input a file containing demand force as a function of time. To date, these files have consisted of linear sweeps, random phase sweeps, and random amplitude sweeps. The module employs feed forward and feed back components to generate a current demand signal. A block diagram of the sweep control structure is shown in FIG. 8E.

The demand force directly feeds into the feed forward module. The difference between demand and actual force generates an additional current command by use of a position-integral controller. The two commands are summed to generate a total current command.

It has been found that position control of the reaction mass can be almost completely achieved by selecting the initial start position of the reaction mass and in addition imparting an initial velocity to the reaction mass during the 0.1 s before the demand force is initiated. The initial velocity in particular has been found to be very effective in limiting the range of motion. This is supported by analytic arguments. The initial position and velocity are easily determined by double integration of the demand force table. This is done just prior to the sweep to set the appropriate parameters in the controller. The total current commanded, that is the sum of the commands from the lift and sweep modules, is input to a current control module. Its architecture is similar to that in FIG. 8E. The command current generates a feed forward voltage command, and also a feed back voltage command. The total voltage command is output as the voltage demand signal sent to the PWM, which then generates the input voltage to the vibrator force coil.

B. Overall Performance

Figure 8F:
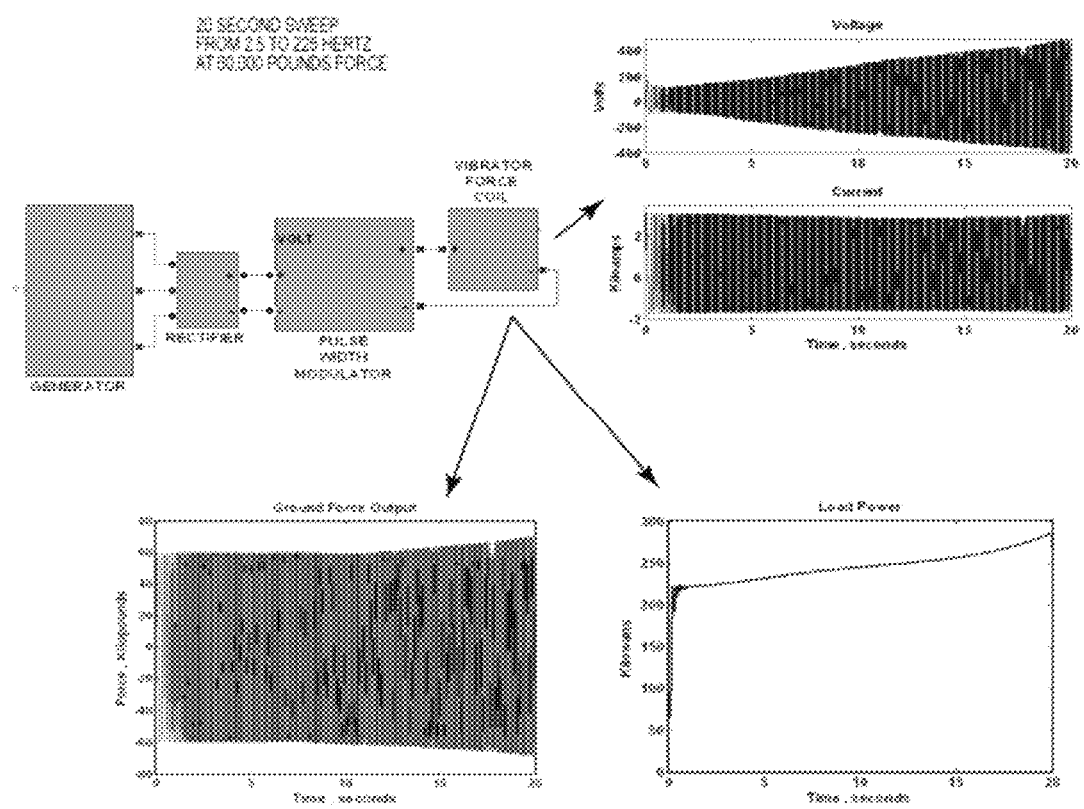
FIG. 8F illustrates vibrator electrical waveforms.

The simulation code was used to generate the electrical performance characteristics of the major system components: the generator, the PWM, and the vibrator. A linear sweep, of 20 s duration, was employed starting at 2.5 Hz and going to 225 Hz. The ground force amplitude was 60,000 lb. FIG. 8F shows electrical waveforms for the simulated vibrator.

Figure 8G:
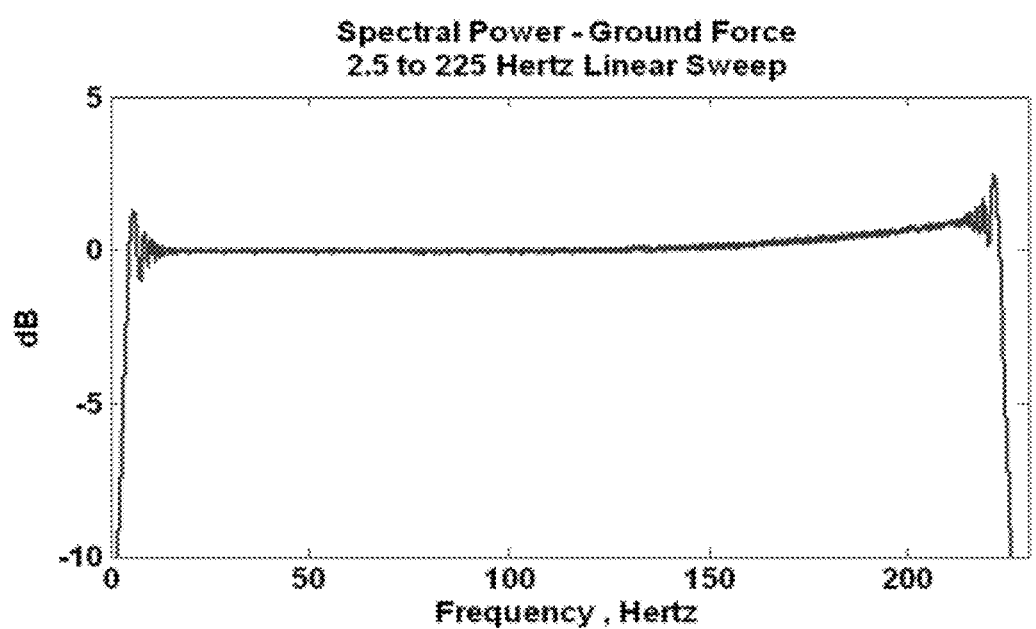
FIG. 8G is a graph of spectral power density.

The load power rises to nearly 300 kW at the end of the sweep. The peak current level is less than 3.2 kA at all times, and the peak voltage 500 V. The ground force spectral power density is shown in FIG. 8G.

The ground force increases with frequency, reflecting the gain characteristics of the force controller. This is correctable with modifications to the controller.

The force control gain settings lead to more output than demanded at higher frequency. This causes the output power to be about 1 dB higher at 200 Hz. The spectrum is fairly flat, and shows the power to be down less than 3 dB at 4 Hz.

Figure 8H:
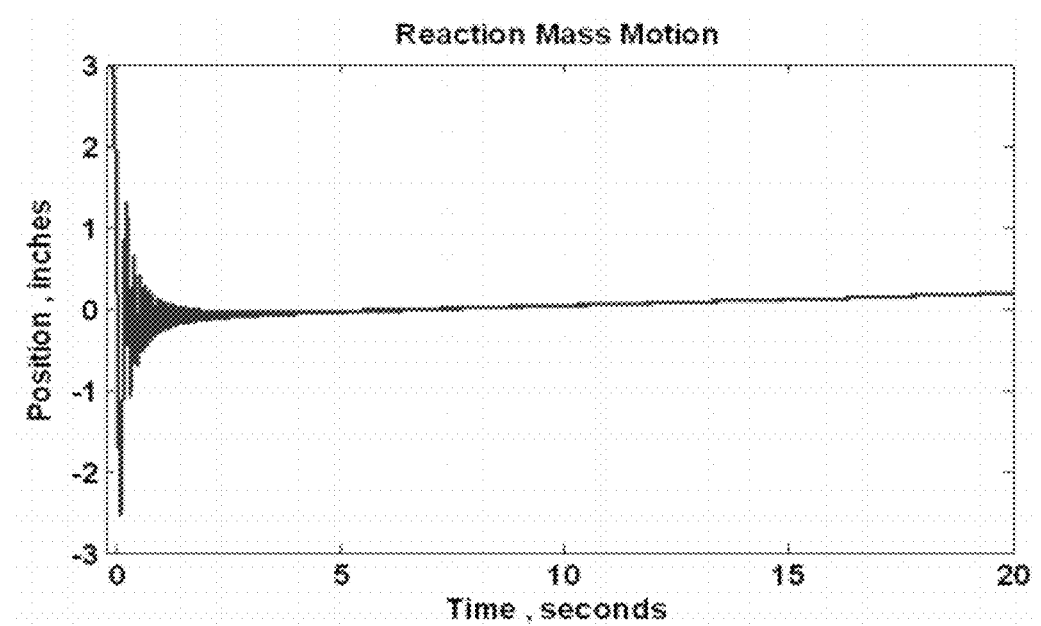
FIG. 8H is a graph of reaction mass motion.

The motion of the reaction mass for this sweep is shown in FIG. 8H. The total range of motion is slightly less than 6 inches. The passive motion control using an initial position and velocity impulse keeps any late time drift of the reaction mass small.

C. Sweep Variation

An advantage of embodiments of an electromagnetic vibrator is its ability to track complex demand profiles with good fidelity. The case of a linear sweep was discussed above. More complex waveforms can also be utilized.

In one aspect, two different types of demand waveforms were simulated. One was a profile in which the wave phase was changed randomly in time (a random phase sweep). The other was a profile in which the wave amplitude was changed in a random manner (a random amplitude sweep).

Figure 8I:
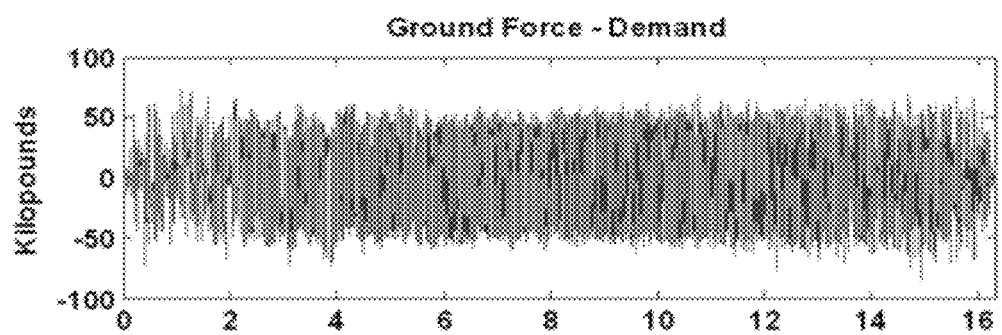
FIGS. 8I and 8J are graphs of random phase ground force comparison.
Figure 8J:
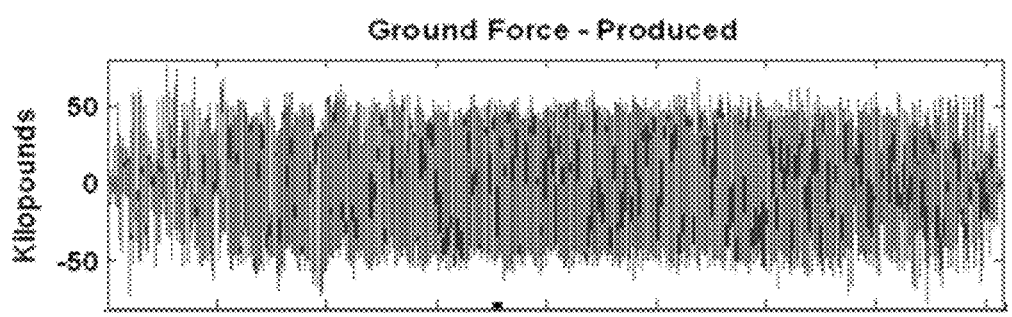
Figure 8K:
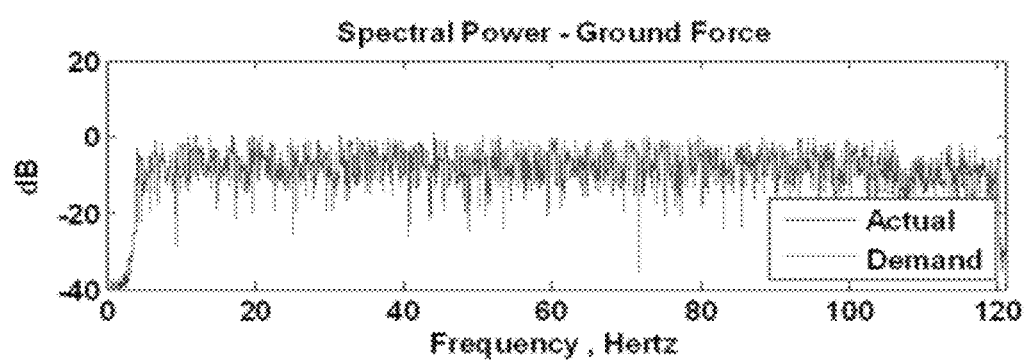
FIGS. 8K and 8L are illustrations of random phase spectral power comparison.
Figure 8L:
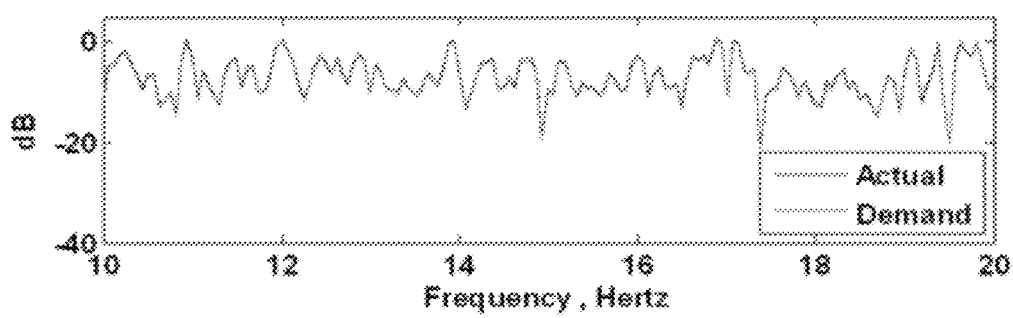
Figure 8M:
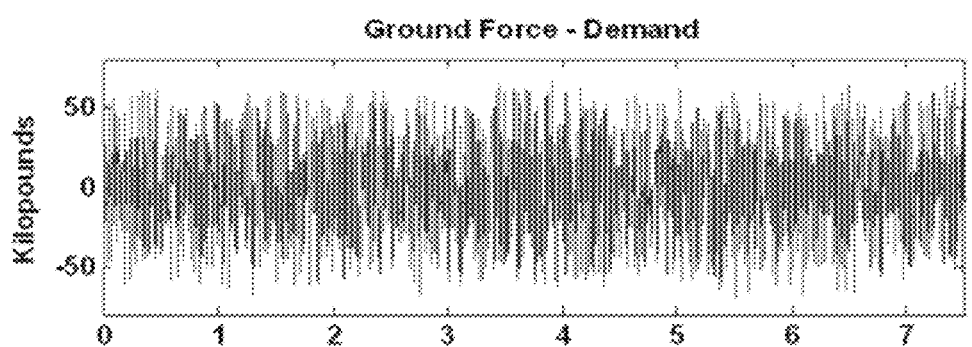
FIGS. 8M and 8N are illustrations of random amplitude ground force comparison.
Figure 8N:
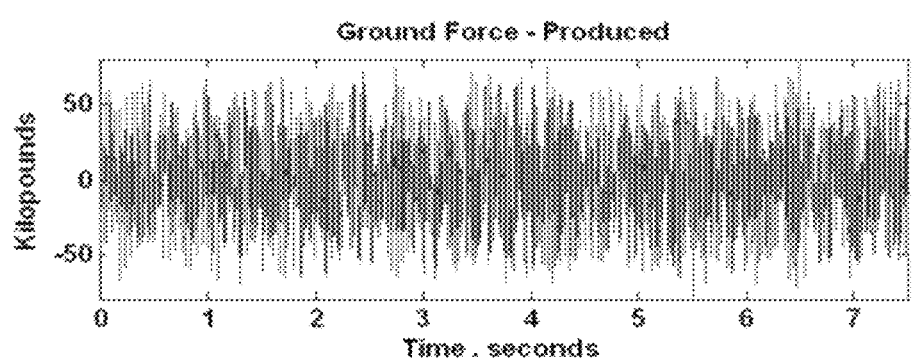
Figure 8O:
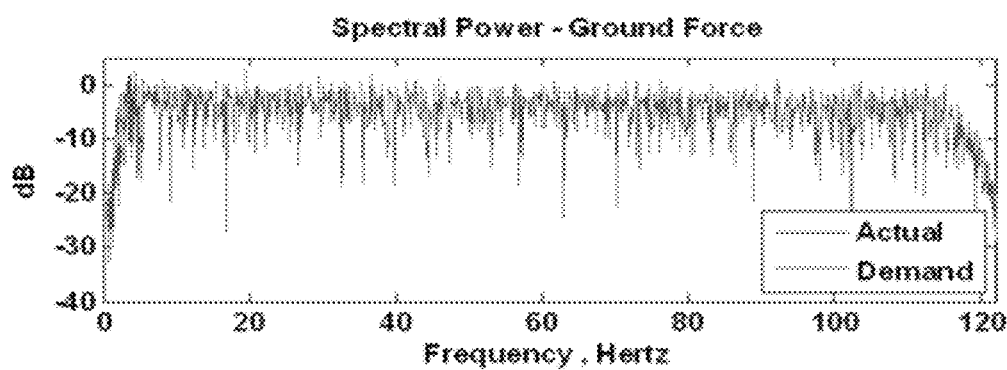
FIGS. 8O and 8P are illustrations of random amplitude spectral power comparison.
Figure 8P:
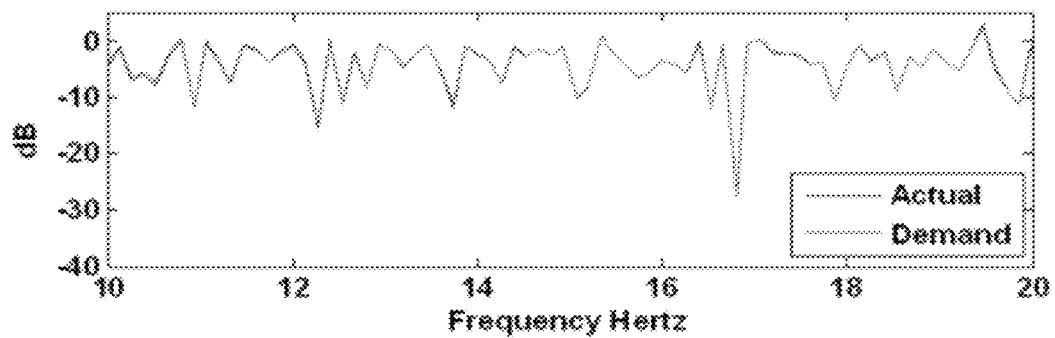

For the random phase sweep, the peak amplitude was held to about 60,000 lb. FIGS. 8I and 8J show plots of demand ground force and actually produced ground force, respectively. FIGS. 8K and 8L show a comparison between spectral power for the two waveforms—demand and actual. A smaller frequency range is shown in FIG. 8L to indicate the good tracking of the vibrator output to demand signal.

FIGS. 8M and 8N and FIGS. 8O and 8P show similar results for the random amplitude case. Again the spectral power comparison is good.

To obtain information on how ground model non-linearity might generate harmonic distortion in the vibrator ground force output, a bi-directional spring model was employed (described above). The variation in spring constant was set at 4:1. The spring constants were also set to emulate sand conditions, i.e. a softer spring constant. Then sweeps at 40,000 pounds force were simulated at fixed frequencies. That is, the output was set to be monochromatic. Frequency values of 6, 25, and 125 Hz were simulated.

Figure 8Q:
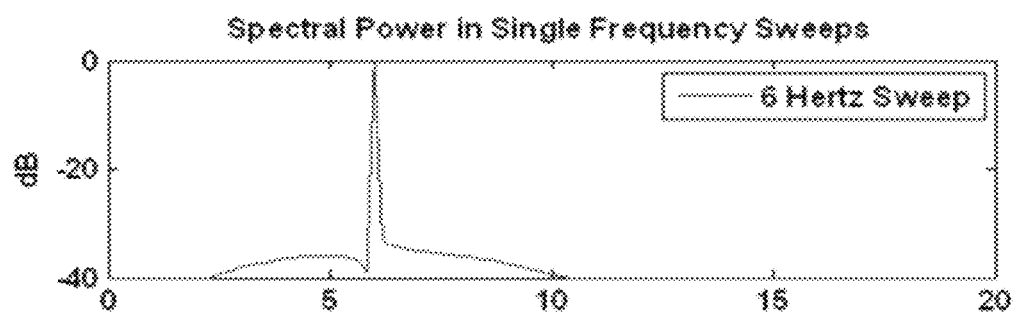
FIGS. 8Q, 8R and 8S are illustrations of spectral power plots for fixed frequency sweeps.
Figure 8R:
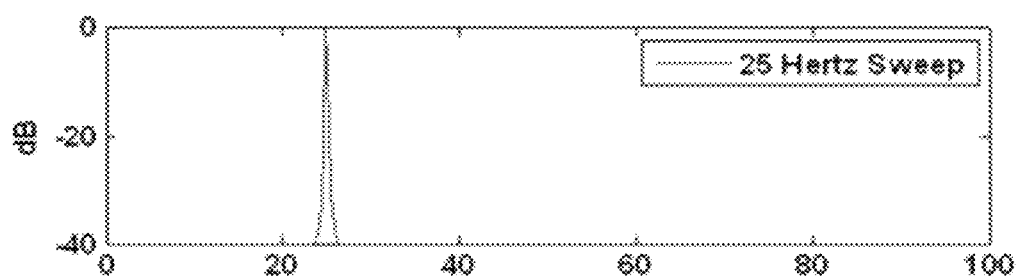
Figure 8S:
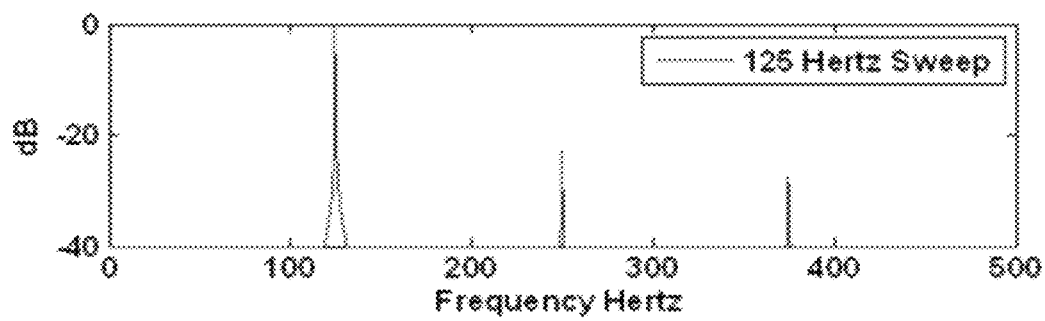

FIGS. 8Q, 8R and 8S show spectral power plots for all three cases. No harmonics were observed in the sweeps at 6 and 25 Hz. Very low amplitude $2^{nd}$ and $3^{rd}$ harmonics were seen in the 125 Hertz case. The THD is essentially zero for all runs.

Magnetic Analysis and Device Optimization

A. Geomagnetic Shaker

Figure 9A:
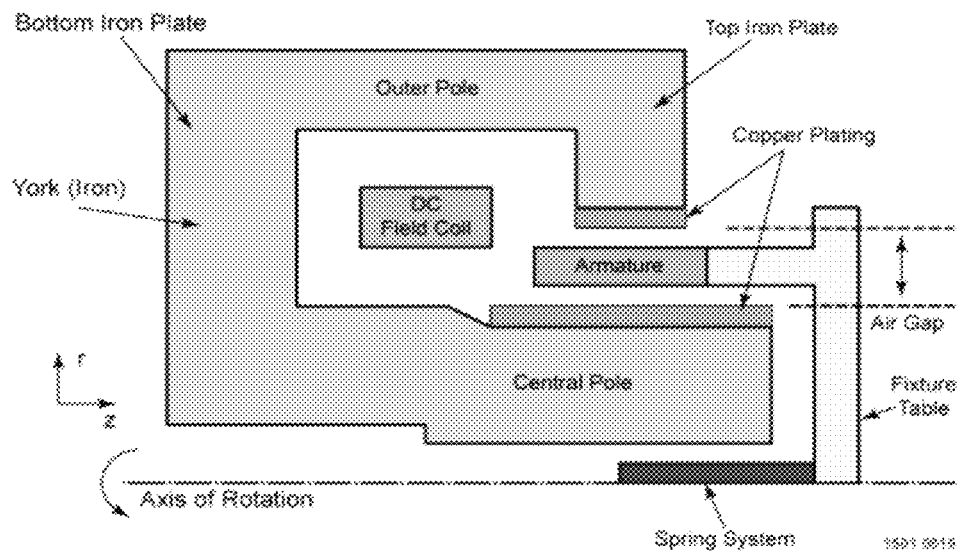
FIG. 9A illustrates an exemplary electromagnetic shaker suitable for a large stroke.

A geomagnetic shaker should have the ability to shake a large mass through a large stroke. FIG. 9A shows an embodiment of a design suitable for this task [2-4]. In one embodiment, there can be a DC power supply for the field coil and a separate PWM power supply for the armature coil that produces AC. In one aspect, a DC winding in the armature winding produces lift, though in other aspects a DC component from the PWM passes through all armature coils to produce lift. In another embodiment, the PWM produces a DC offset of the AC armature current to provide the lift. In one aspect, there is only one armature circuit and all coils are in series. The field coil carries dc current, and the armature carries both ac and dc current. The voltage demand on this coil can climb unacceptably unless one of two measures is adopted. The first is to place a passive copper (annotated copper plating) band on either side of the armature coil. The induced currents are essentially opposite in phase to those in the armature. The second option is to wind a second winding on the central and outer pole which is connected in series with the armature winding. This so-called active compensator is effective only when it shadows the armature coil. Thus it has the two negative features of not being able to compensate when longer strokes are involved and the added construction difficulty of running armature current to the same structure that the field coil is mounted to. There is actually a more fundamental aspect of this trade in considering whether to use a passive versus an active compensator, having to do with a theoretical limit.

B. Passive Compensation

Figure 9B:
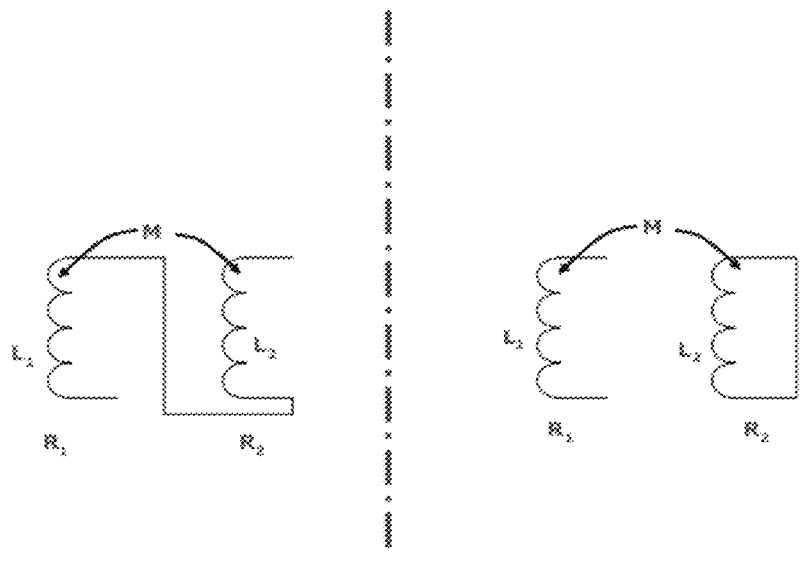
FIG. 9B is an illustration of exemplary connecting two coils in anti-parallel which can yield a larger inductance at higher frequency than shorting one of the two coils.

Passive compensators can have a lower inductance at higher frequency than active compensation. FIG. 9B shows a thought experiment that can be performed on two coils to defend this statement.

To simplify this analysis, consider the case where $L_1=L_2$ and $R_1=R_2$. At radian frequency $\omega$, the voltage across the two coils in FIG. 9A(a) is $$V=2\cdot(j\omega L_1+R_1)i_1+2j\omega M i_1. \quad (2\text{-}1)$$

Let $M=k\sqrt{L_1 L_2}$. The inductance for case (a) is $$L_{eq}=\mathcal{J}\left(\frac{V}{\omega i_1}\right)=2L_1(1+k). \quad (2\text{-}2)$$

The shorted coil of case 9B(b) requires a prediction of current. Since it is shorted, $$(j\omega L_2+R_2)i_2+j\omega M i_1=0. \quad (2\text{-}3)$$

Solving for $i_2$, $$i_2=-\frac{j\omega M i_1}{j\omega L_2+R_2}. \quad (2\text{-}4)$$

Inserting (2-4) into the voltage equation for $V_1$ gives $$V_1=j\omega L_1 i_1+\frac{\omega^2 M^2 i_1}{j\omega L_2+R_2}. \quad (2\text{-}5)$$

Writing (2-5) in terms of real and imaginary parts gives $$V=j\omega i_1\left(L_1-\frac{\omega^2 M^2 L_2}{R_2^2+\omega^2 L_2^2}\right)+\frac{R_2\omega^2 M^2 i_1}{R_2^2+\omega^2 L_2^2}+R_i i_1. \quad (2\text{-}6)$$

The first term in parenthesis on the right-hand side of (2-6) is the equivalent inductance of this circuit. At high frequency $$\omega\Box\left(\frac{R_2}{L_2}\right),$$

$$L_{eq}\Box L_1(1-k^2). \quad (2\text{-}7)$$

Consider a coupling coefficient with $k=-0.95$. The anti-series solution yields $L_{eq}=0.1\,L_1$. The passive shorted coil yields $L_{eq}=0.0975\,L_1$. In the high frequency limit, the passive compensator always requires less voltage since it has the lower inductance. The two are equal when $k=1$. Note that $(1-k^2)=2(1+k)$ when $k=-1$. For coupling coefficients $-1<k<0$, the passive compensator always has the lower inductance.

C. The Role of the Compensator

Figure 9C:
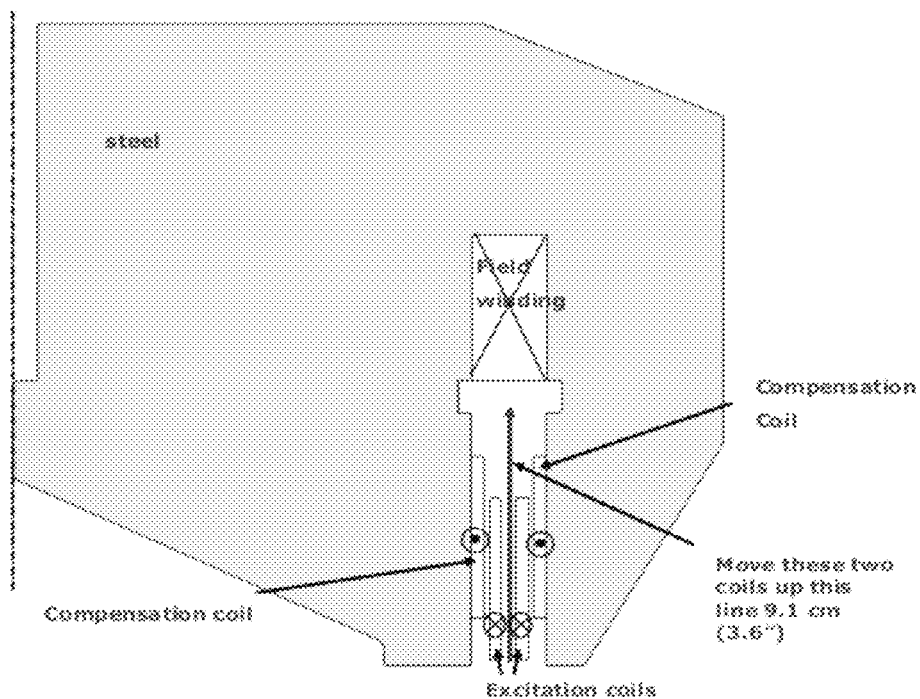
FIG. 9C is an illustration of geometry for generating lift force from a fixed field winding on the steel structure.
Figure 9D:
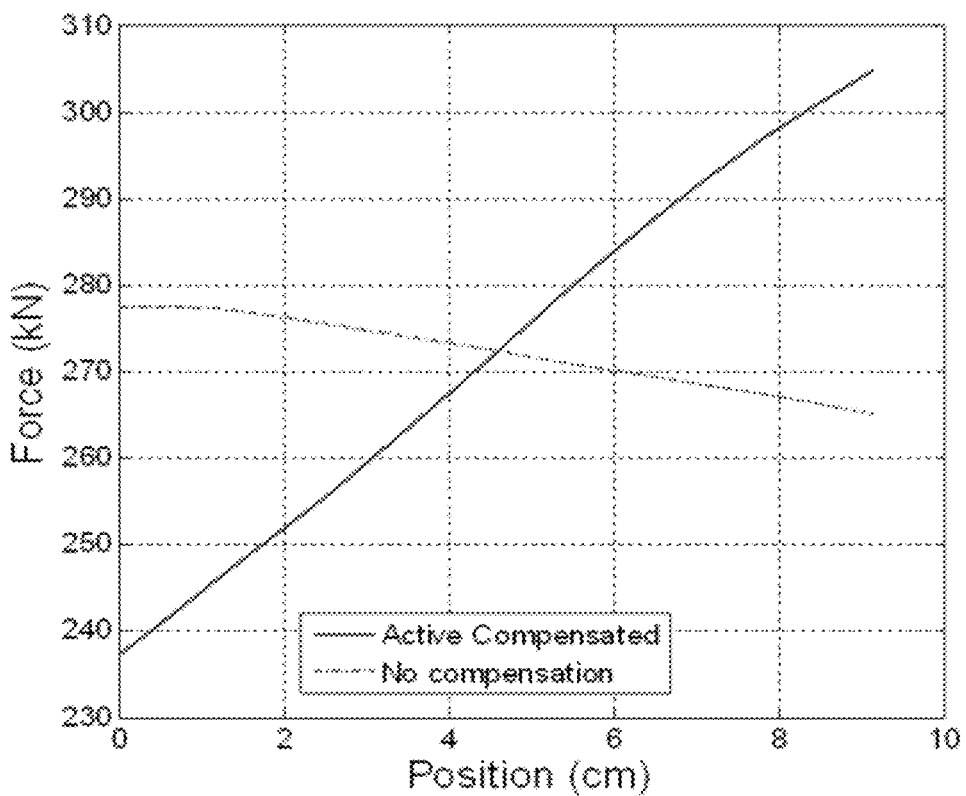
FIG. 9D is an illustration of forces generated when the currents are creating lift for various positions along the highlighted segment in FIG. 9C.
Figure 9E:
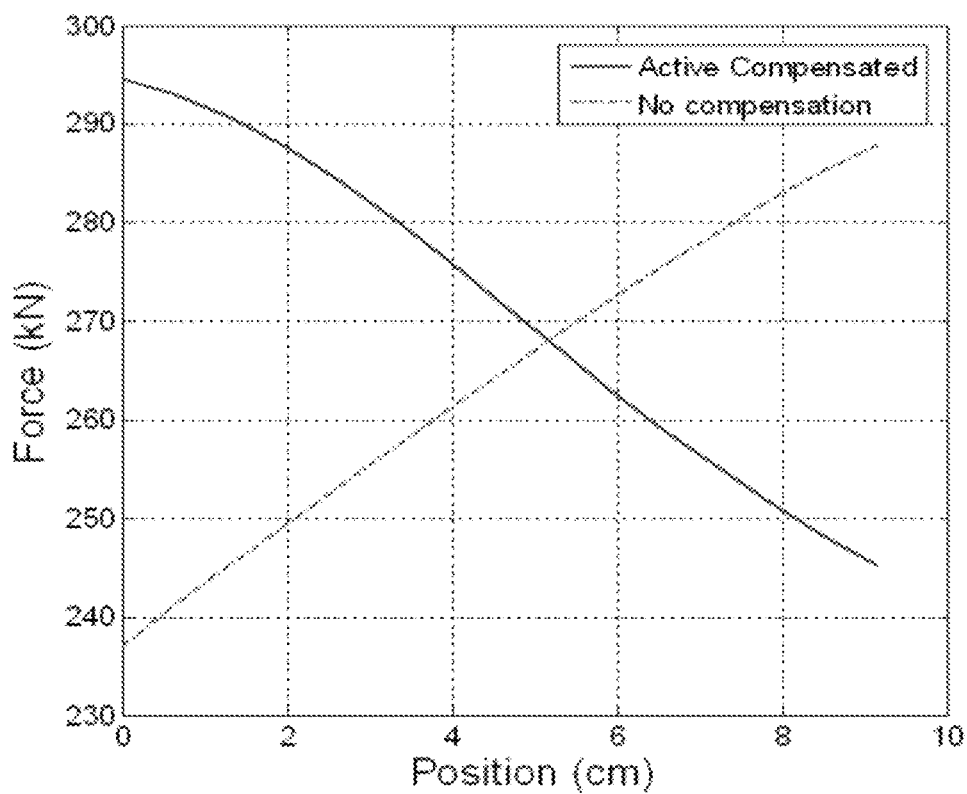
FIG. 9E is an illustration of forces generated when the currents are creating a down force for positions along the highlighted segment in FIG. 9C.
Figure 9F:
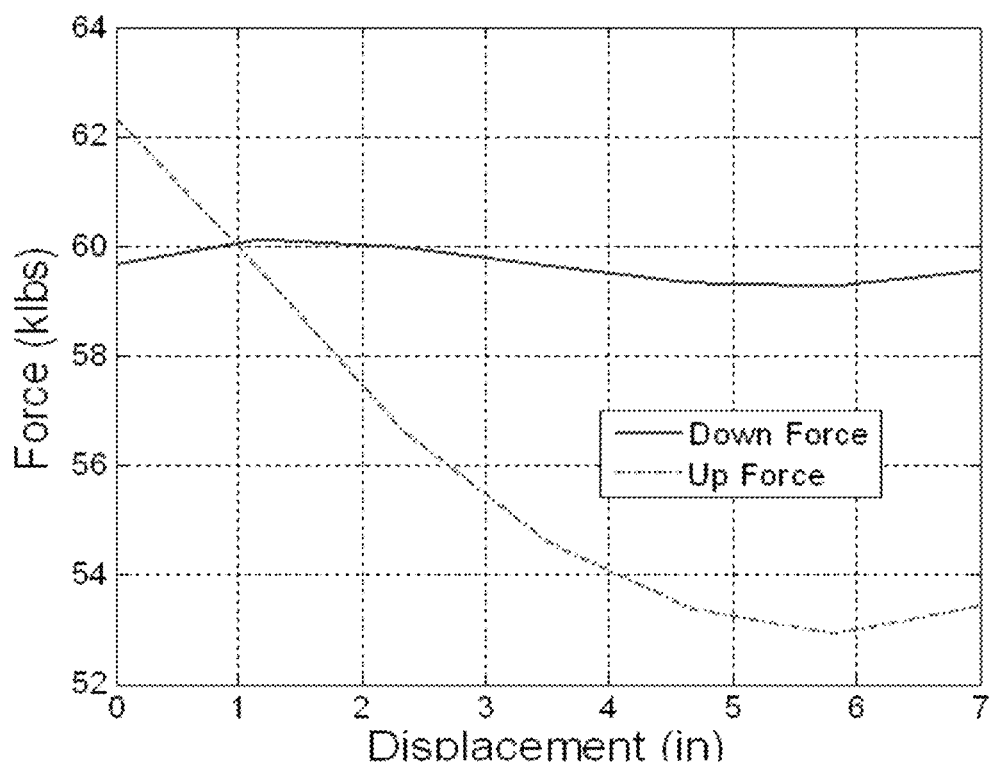
FIG. 9F is an illustration of force variation with displacement for constant current.

In one aspect, to assess role of a compensator, the geometry shown in FIG. 9C. can be set forth. Part of the assessment includes evaluating the effect of the compensation coil on force in a scenario in which the center of the two excitation coils are allowed to move vertically up the open channel, along a segment represented by a thick arrow in FIG. 9C. In one evaluation scenario, such movement is implemented with the compensation coils activated so that such coils carry substantially exactly the same current in the opposite direction. In another evaluation scenario, the excitation coils are moved along the referred segment without excitation of the compensation coils (e.g., excitation coils are removed). FIG. 9D shows that the uncompensated case has the flatter force curve versus position. Next, reverse the current in the excitation and compensation coils so that the force is downward. FIG. 9E and FIG. 9F show that the compensation winding reverses the slope of the force versus position curve. In certain embodiments, the mean of the compensated force and the uncompensated force can be substantially identical.

D. Design Geometry

Figure 9G:
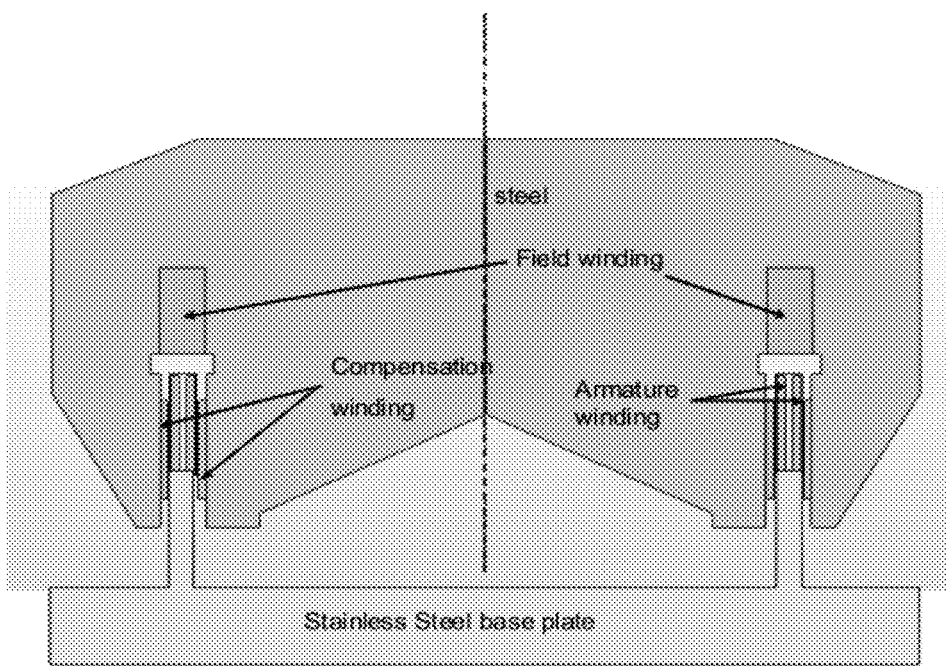
FIG. 9G is an illustration of baseline design geometry.

The primary difference between a geomagnetic seismic shaker (FIG. 9G) and an electromagnetic shaker affixed to a shaker table is that the field coil moves in the seismic shaker. An example of design criterions are as follows: ac force generated=267 kN (60 klb); dc force generated=75.6 kN (17 klb); total force generated on the down stroke for the armature=342.5 kN (77 klb); weight <7.72 tonnes (17 klb); stroke allowance approximately 17.14 cm (6.75 in.); and power <448 kW (600 Hp).

Figure 9H:
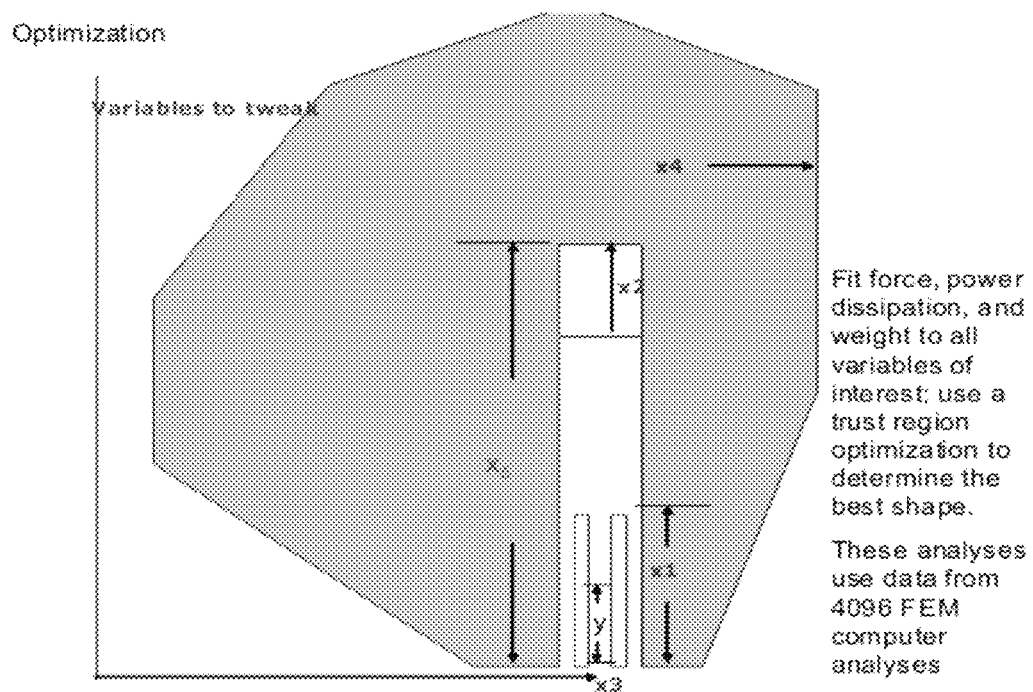
FIG. 9H is an illustration of variables to perturb during the optimization.
Figure 91:
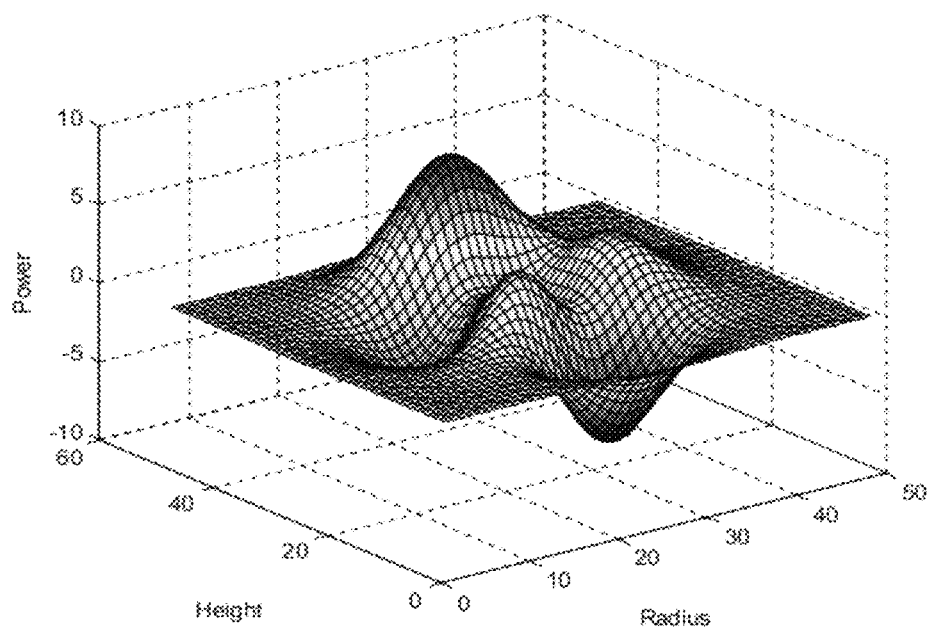

As one will appreciate, the design variables shown in FIG. 9H can be selected to achieve these objectives. In addition to the variables shown, in one aspect, the force under maximum excitation can be computed in various positions y to ensure that the force objectives are met as an average over the entire displacement range. The down stroke force condition dominates in this design. The down stroke condition is accompanied by a sizeable reluctance force to pull the armature up further in the slot. This force is nearly constant and approximately equal to 177 kN (40 klb) to pull the armature into the field coil regardless of the sign of the armature current.

In one aspect, the optimization is approached using a trust region optimization algorithm. Sequential quadratic programming (SQP) algorithms are among the more powerful deterministic methods that use gradient information [2-5, 2-6]. The response surface method attempts to build an n dimensional surface of the problem and then examines how that surface varies with the system unknowns [2-7]. Something akin to the response surface method in [2-8] is used to determine the right shape, minimizing the power dissipation subject to the constraints listed previously.

FIG. 9I shows a three-dimensional surface linking power to two of the variables. Optionally, a five-dimensional surface can be constructed in this optimization for each of the key variables, source power, weight, and force. This five-dimensional spline fit represents the data; and can also be used to compute the derivatives for all the variables [2-9]. Knowing the gradient information allows for a fast and accurate determination of minimum power satisfying the constraints [2-10, 2-11, 2-12].

Each of the five variables annotated in FIG. 9H is varied in a nested loop. Force has to be computed at a minimum of four positions. In connection with the finite element analysis, these four positions can serve as a sixth variable. If the variables are perturbed about four positions, the number of finite element analyses required would be:

$$\text{\# analyses} = 4^6 = 4096. \tag{2-8}$$

In one aspect, only negative forces (e.g., forces to increase the separation of the armature and field winding) are examined at the top of the stroke and only positive forces at the bottom of the stroke.

Figure 9J:
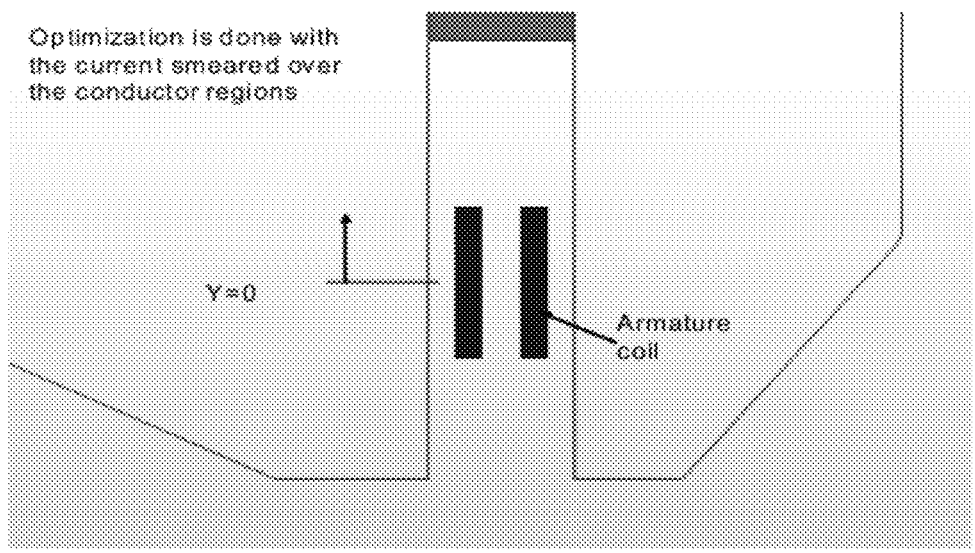
FIG. 9J illustrates magnetic optimization requires smearing the current over a region.

Current density is central to the solution of the nested set of problems. This density is smeared over the current carrying regions shown in FIG. 9J.

E. Current Density

Onsite testing has shown that a 3.175 mm (0.125 in.) diameter copper tube with a 1.58 mm (0.063 in.) diameter water cooling hole can sustain 200 A steady state. This corresponds to a current density of $$J_{cu} = \frac{200 \cdot 4}{\pi(1/64 - 1/16^2)} \cdot 39.37^2 = 3.368 \cdot 10^7 \text{ A/m}^2. \tag{2-9}$$

The conductors for the field and the armature are targeted at 12.7 mm (0.5 in.) square with a 6.35 mm (0.5 in.) cooling hole. The area open to copper is $$A_{cu} = 0.5^2 - \pi \left(\frac{1}{4}\right)^2 / 4 = 0.201 \text{ in}^2. \tag{2-10}$$

For the field windings they can be insulated with a 10 mil wrap of glass followed by a 2 mil wrap of Kapton™. So the equivalent current density in the field winding is $$J_{field} = J_{cu} \frac{A_{cu}}{0.524^2} = 2.464 \cdot 10^7 \text{ A/m}^2. \tag{2-11}$$

The armature current density must account for the tie dependence of the waveform. A steady state base to the weight of the unit (75.6 kN (17 klb)) must be superimposed on an oscillating component capable of achieving a target force $f_t$ (267 kN (60 klb)). The current density in Eq. (2-force $f_b$ equal 9) is a steady state value. A value of the current density in the armature $J_{arm}$ that can deliver the same heating in the copper can be determined by solving the equation $$J_{cu}^2 \Delta t = \int_0^{\Delta t} \left[ J \left\{ \left( \frac{f_b}{f_b + f_t} \right) + \left( \frac{f_t}{f_b + f_t} \right) \sin(\omega t) \right\} \right]^2 dt. \tag{2-12}$$

The integration needs to be performed over an integral number of periods. When this is done, the allowed current density that exactly equals the loss of a dc coil carrying $J_{cu}$ is determined $$J_{arm} = \frac{J_{cu}}{\sqrt{\left(\frac{f_b}{f_b + f_t}\right) + \frac{1}{2}\left(\frac{f_t}{f_b + f_t}\right)^2}} \tag{2-13}$$

$$= \frac{J_{cu}}{\sqrt{\beta^2 + \frac{1}{2}(1-\beta)^2}},$$

where $$\beta \equiv \frac{f_b}{f_t + f_b}.$$

Figure 9K:
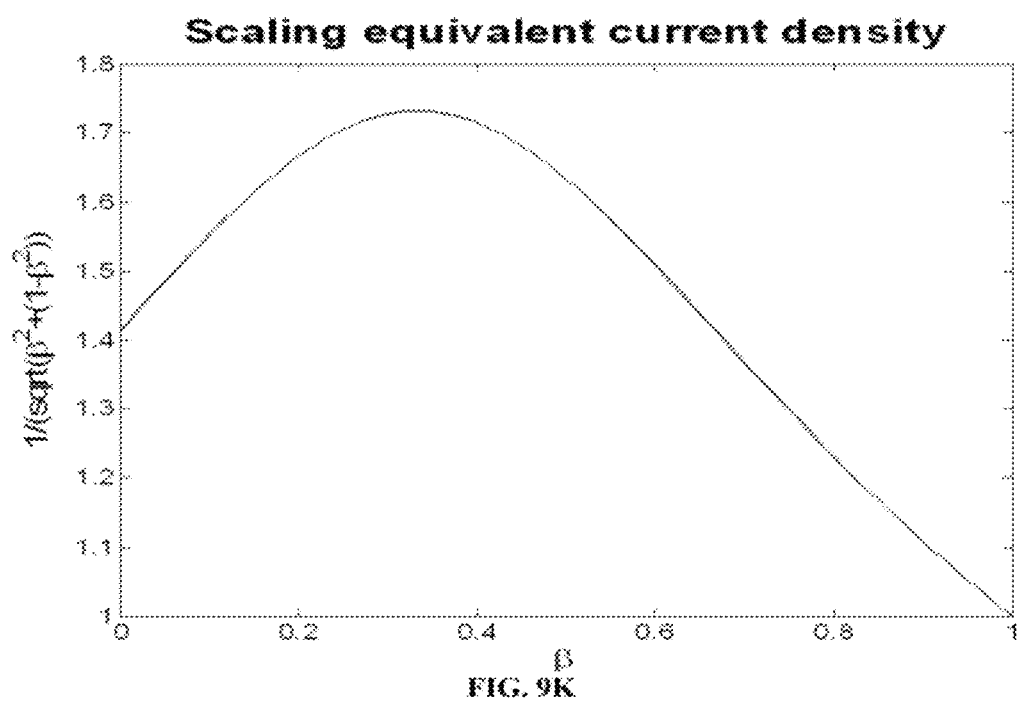
FIG. 9K illustrates current density multiplier as a function of $\beta$, where $\beta$ represents the proportion of the total force load made up by the DC (or steady state weight) component.

The multiplier on $J_{cu}$ is an interesting number. When the base weight (force) is a large proportion of the total force, this multiplier goes to unity. When it is a small proportion of the total weight, i.e., the desired force is nearly sinusoidal, this multiplier goes to $\sqrt{2}$. FIG. 9K shows how this multiplier changes beginning with a 100% sinusoidal load to a purely dc load at $\beta=1$. The interesting point is the maximum value ( $\sqrt{3}=1.73$). The large multiplier results due to the combined sinusoidal effect with an offset. This density must be reduced by the packing density as in Eq. (2-11) to get an equivalent modeling density. In this exemplary aspect, since 20 mil insulation wrap followed by a 2.5 mil Kapton™ is envisioned, the equivalent peak current density should be $$J_{arm} = \frac{J_{cu}}{\sqrt{\beta^2 + \frac{1}{2}(1-\beta)^2}} \frac{A_{cu}}{0.59^2} \tag{2-14}$$

$$= 3.275 \cdot 10^7 \text{ A/m}^2.$$

F. Power Calculations

The current densities listed in Eq. (2-11) and Eq. (2-14) are apparent current densities that account for fields and forces. The common expression for computing power is $$P = (JA)^2 \frac{l}{\sigma A} = J^2 \frac{\text{vol}}{\sigma}. \tag{2-15}$$

The apparent volume $V_{ap}$ used in a field calculation is larger than the actual copper volume $V_{cu}$. This enters as a correction which requires increasing the apparent power demand. For the field, the power dissipated in the field is $$P_{field} = J_{field}^2 \frac{V_{ap}^2}{\sigma V_{cu}} = J_{cu}^2 \frac{V_{ap}}{\sigma} \cdot \frac{V_{cu}}{V_{ap}}. \tag{2-14}$$

where $J_{field}$ is defined in Eg. (2-11). A similar correction must be applied on the armature power. It is easier to use $J_{cu}$ in this calculation since the equivalent $J_{arm}$ was defined to match it.

$$P_{arm} = J_{cu}^2 \frac{V_{ap}}{\sigma} \cdot \frac{V_{cu}}{V_{ap}}. \qquad (2\text{-}17)$$

Here $V_{ap}$ is the apparent armature copper volume. This is of course the loss ignoring skin proximity effect. These effects are considered after the optimization since it is simply not practical to add this complexity to the optimization procedure.

G. Optimization Results

Figure 9L:
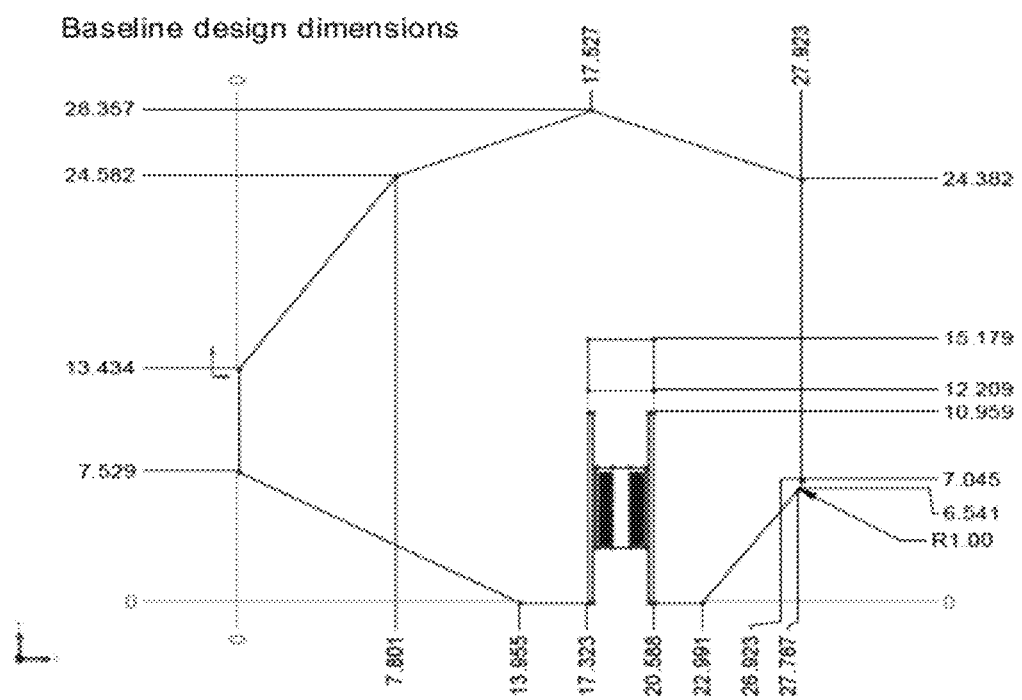
FIG. 9L illustrates optimized design dimensions.
Figure 9M:
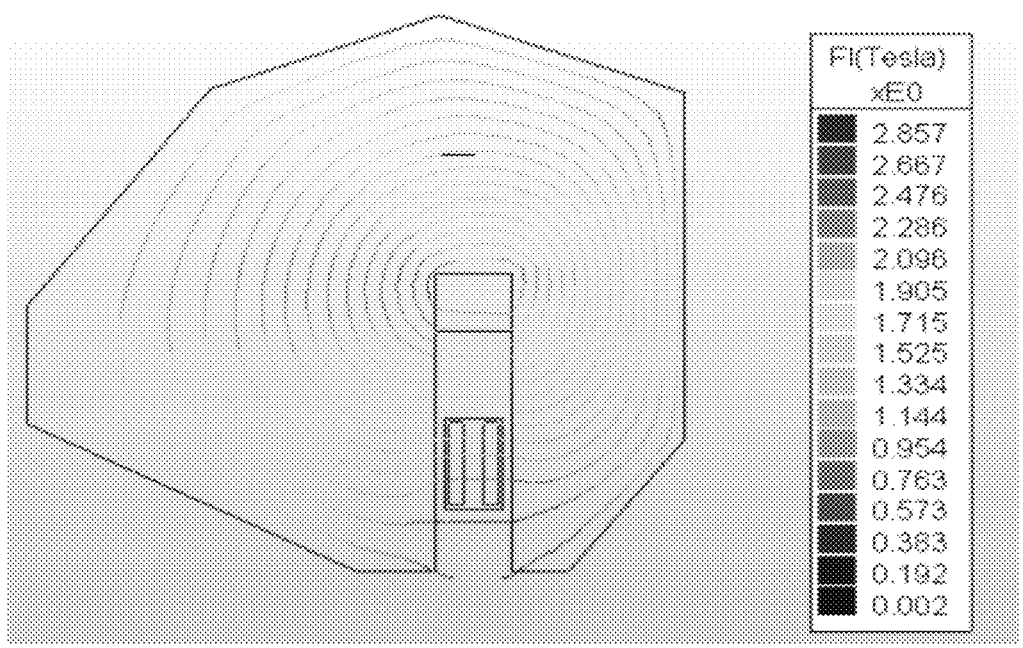
FIG. 9M illustrates a field plot for the optimized design at maximum excitation.

FIG. 9L shows an embodiment of an optimal design minimizing power dissipation within the constraints. Homogeneity in the field plot shows that the steel is used nearly to the maximum throughout FIG. 9M.

Figure 9N:
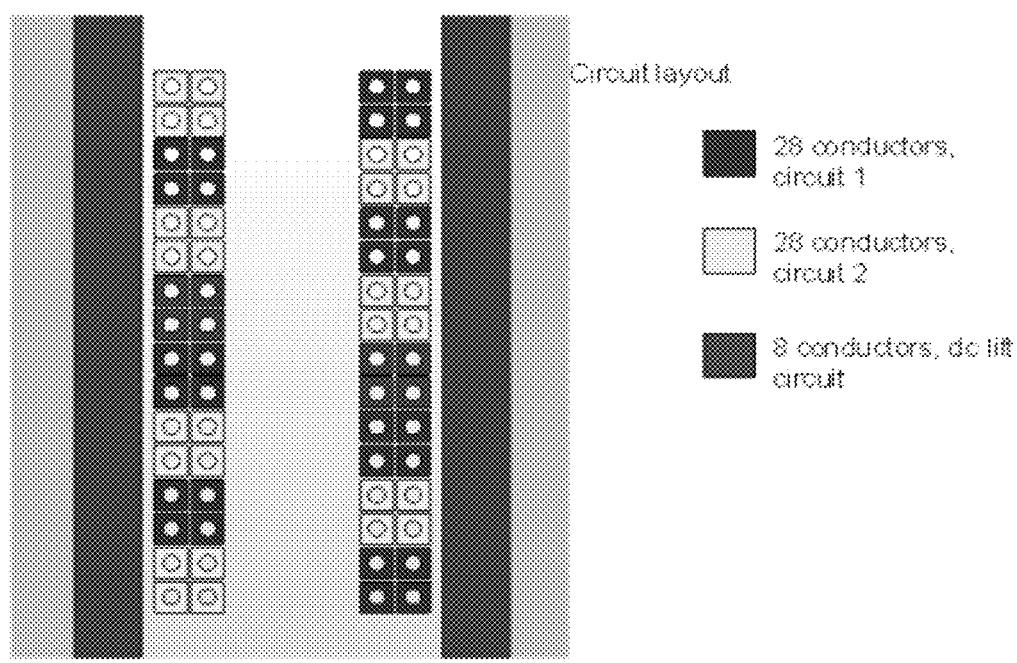
FIG. 9N illustrates an armature coil layout using two parallel circuits.
Figure 90:
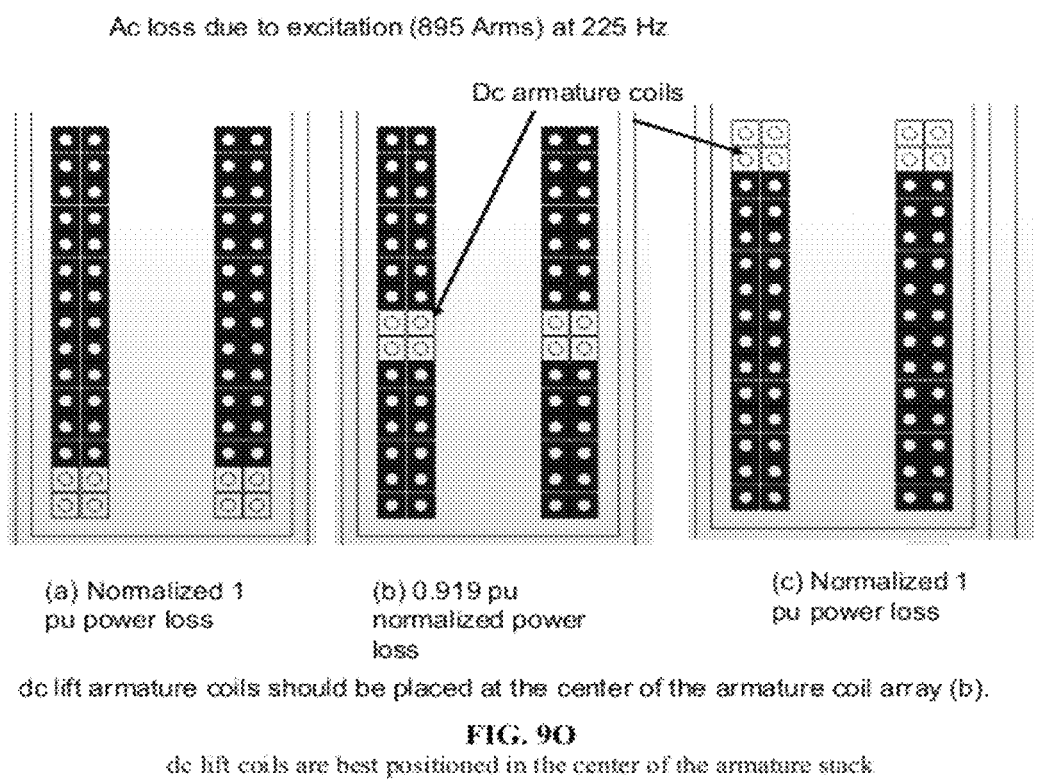

The optimized armature cutout closely fits a series of 6.35 mm (0.25 in.) conductors as shown in FIG. 9N. The voltage limitations of the inverter electronics suit two parallel circuits more than one series circuit. The staggering registered in this layout is an attempt to balance the induced voltages.

Optionally, there are at least two modalities to introduce the DC component of current required in the armature to achieve static lift. In the first modality, the inverter supplies the added DC component. The second modality excitea a subset of the inverter coils to carry only DC. Since DC power supplies are cheaper than AC inverters, this second option can save money.

In the second modality, the AC excited armature coils induce parasitic losses in the DC sub-conductors. In this aspect, and as shown in the simulation results summarized in FIG. 9O, a power saving of about 10% can be realized in implementation in which the DC coils are positioned in proximity to the center of the armature stack.

Figure 9P:
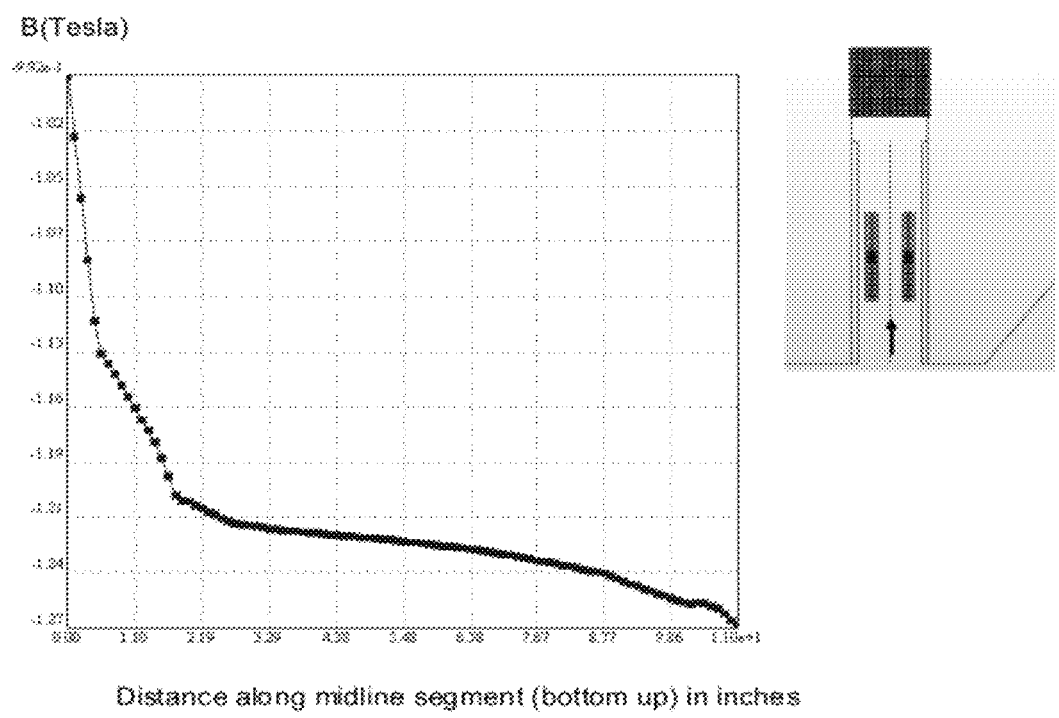
FIG. 9P illustrates magnetic field through the middle of the armature gap.

The optimization procedure computed a desired field excitation of 134 kAT. Total field power loss in all field coils plus eight armature coils containing DC is 275 kW. The real AC armature power loss at 225 Hz is approximately 306 kW. The magnetic field generated by the field coil alone is shown in FIG. 9P.

H. Power Dissipation with Skin and Proximity Effect

It is contemplated that, to achieve the forces demanded with the weight constraints, large current densities as described herein can be used. These internal water cooled coils suffer from parasitic skin effect and proximity effect losses as the armature frequency increases. Skin effect, moving the current to the outside of the conductor is well understood.

In each of the plots shown in FIG. 9Q, a fixed current was specified, but not the distribution. For this axi-symmetric problem, the field can be characterized by a single component of magnetic vector potential $A_\phi$. A finite element code was used to solve $$\nabla^2 A_{100} - j\omega\mu\sigma A_\phi = \mu J_s. \qquad (2\text{-}18)$$

Here $J_s$ is the source current, except in this current imposed conductor where it is assigned to be zero. In the conductor the vector potential is assigned to have two parts, a constant component $A_c$ and a variable component to be determined. If the current in the sub-conductor is I, $A_c$ has the value $I/(j\omega S\sigma)$, where $\sigma$ is the conductivity of the region and S is the regions surface area.

As expected, the low frequency current density distribution shown in FIG. 9Q(a) is essentially uniform. FIG. 9Q(b) shows the distribution of current in several sub-conductors that are clustered at 225 Hz. FIG. 9Q(c) shows the distribution of current in the same sub-conductors adjacent to a copper compensation slab, which can be a lining (or a sleeve) coupled to a reaction member (e.g., a reaction mass). The current induced in the slab is 180 degrees out of phase with the armature conductor current. The maxim about unlike currents attracting applies, and explains why the red currents crowd towards the center.

I. Power Calculations and Equivalent Circuits

Minimizing power consumption generally is preferred since the generator typically is carried and supplied by the vehicle carrying the equipment. One exemplary method for computing the inverter power is to shut down the dc field coils, excite the armature only with ac, and integrate $\vec{E} \times \vec{H}$ over the interface of all regions carrying current. It should be appreciated that the presence of a compensator can lower the voltage required on the armature coil. As shown in FIG. 9H, in one aspect, the presence of compensation does not alter the average force, but rather it alters the mean value of the force. Since inverters are rated by their volt-amp product, this is of no small importance. It also should be appreciated that current induced in a passive compensator is largely unlikely to exceed that in the armature circuit. Thus, it is contemplated that a thicker compensator also can result in a smaller real power requirement.

Figure 9R:
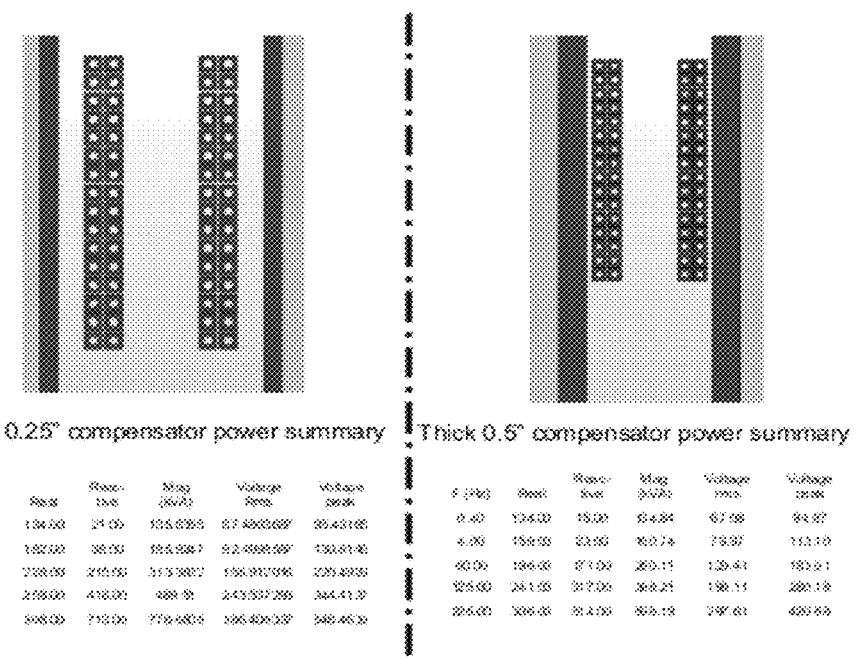
FIG. 9R illustrates power and voltage requirements for thin and thick compensator with identical armature coil excitation (225 Hz, maximum excitation).

The tabulated results annotated in FIG. 9R show that both voltage and power requirements are reduced with the thicker 12.7 mm (0.5 in.) compensator. The voltages are computed by dividing the volt-amp product by the current.

J. Control

Figure 9S:
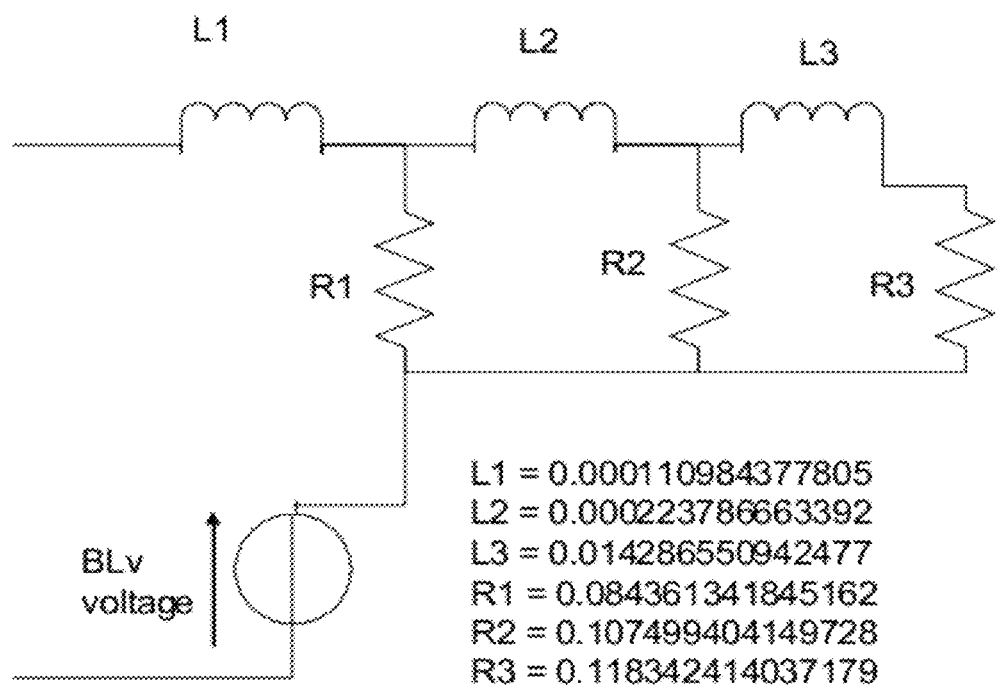
FIG. 9S illustrates an equivalent ladder network used to represent the armature circuit.

In addition to a stabilized lift generation, it is necessary to generate a number of force profiles including those that linearly increase with frequency. The controller requires a good circuit model in order to supply the right control voltage. The presence of the compensator complicates the use of an equivalent circuit. Both Silvester [2-13] and Giesselmann [2-14] approach this type of diffusion system with a ladder circuit such as that shown in FIG. 9S. The BLv voltage is a motion-induced voltage. This term is computed by computing the flux $\Phi$ linking the armature coil as a function of position with the DC field excitation on. The BLv voltage for any velocity is $$BLv = \frac{d\Phi}{dy}v. \qquad (2\text{-}19)$$

Figure 9T:
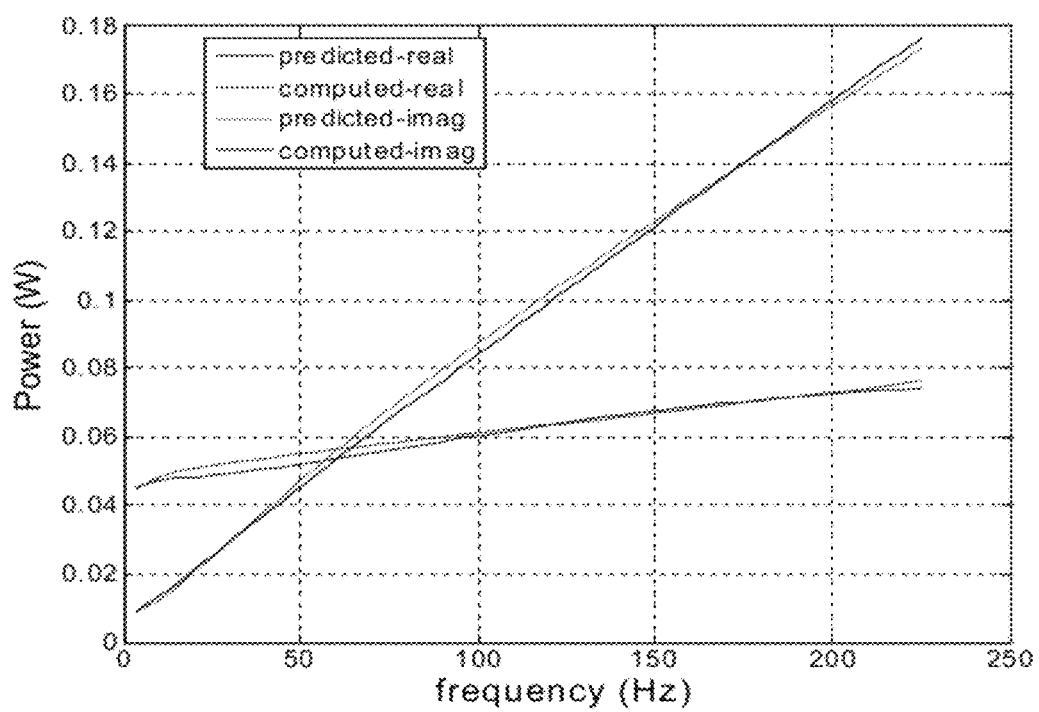
FIG. 9T illustrates performance of the ladder equivalent circuit to model the armature's power dissipation.

The derivative is determined by fitting the flux to a spline and taking the derivative of the spline [2-9]. The ladder parameter fit was determined using a Levenberg-Marquardt method with line-search to best fit the real and imaginary power dissipation [2-15]. FIG. 9T shows that this representation method is quite good for a large range of frequencies.

K. Closing the Design Loop

Figure 9U:
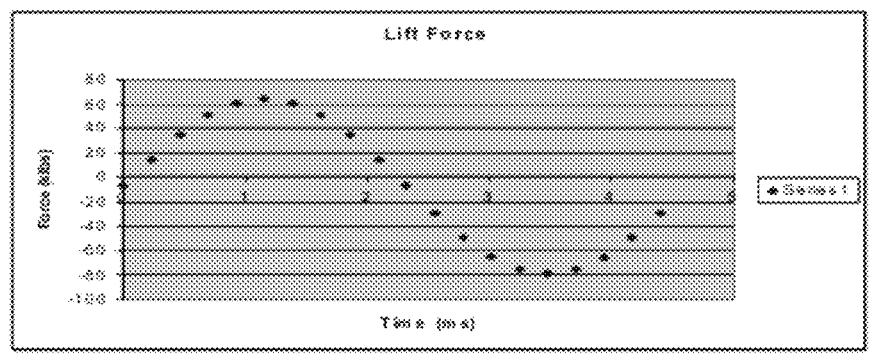
FIG. 9U illustrates transient analysis to compute force with the dc field and ac armature excitation.

Closing the design loop (or completing a predetermined design protocol) is equivalent to asking whether the device meets the force requirement with rated current. The highest frequency can be the most taxing. In one example and without limitation, determining what is the force when the field coil is excited with dc, the armature coil with ac, and the eight subconductors in FIG. 9N excited with dc can be performed using a transient time-stepping analysis. Eddy currents in both the steel and the compensator can respond to the AC current. FIG. 9U presents results of a transient analysis that predicts that the lift force (e.g., a negative force, or a force oriented in the opposite direction to the acceleration of gravity) can reach the target of 77 klb in the presence of all compensation currents and eddy currents.

L. Permanent Magnets

Figure 9V:
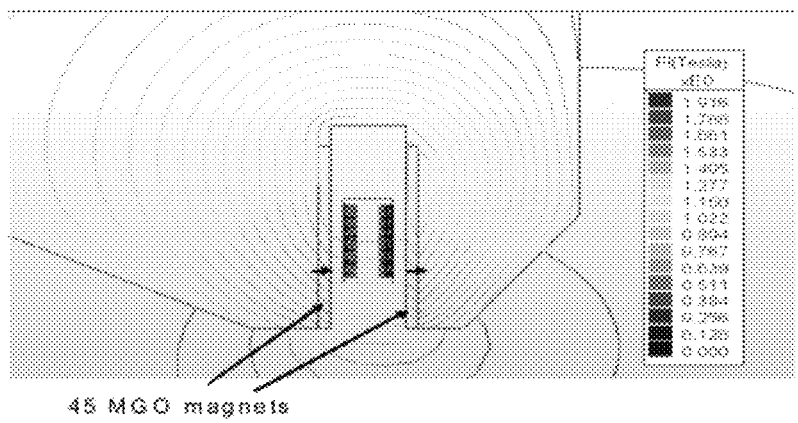
FIG. 9V illustrates placing two columns magnets on either side of the armature gap.
Figure 9W:
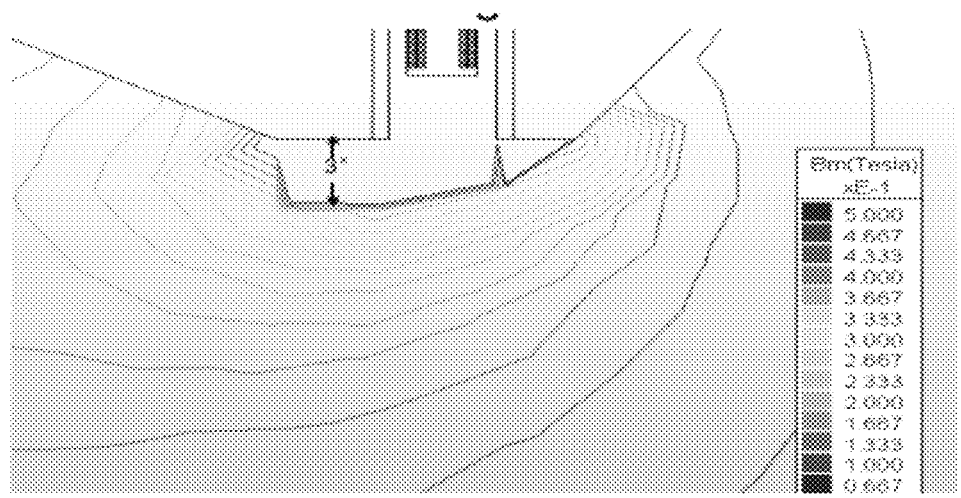
FIG. 9W illustrates a leakage field away from the armature gap with magnet excitation.

The power demand for the device may be a concern. In one scenario, of the 275 KW DC loss, 260 kW originate primarily on the field winding alone. Options for reducing the power dissipation include, without limitation, using smaller conductors for the armature winding (also referred to as force coil) to reduce skin and proximity effects, and magnets to replace the field winding (also referred to as field winding). Magnets can have the greatest effect on real power usage. FIG. 9V illustrates two exemplary columns of about 12.7 mm (0.5 in.) 45 MGO NdFeB magnets placed on either side of the armature gap (or armature channel) in the absence of any field coils. Forces can be within 7% of the target result with such an array. In certain scenarios, the magnets may not be turned off, thus possible concern related to interference with other tools may arise from their use. Leakage field from these magnets is illustrated in FIG. 9W. A leakage field of 0.5 T can be expected at about 7.6 cm (3 in.) away from the armature gap.

M. Conclusions

A exemplary and scalable magnetic optimization has been performed to design an electromagnetic shaker capable of generating 342 kN. The response method approach employed in this exemplary optimization required 4094 finite element analyses per optimization round. The exemplary and scalable design had a stroke length of about 17.1 cm (6.75 in.) and a total armature and field base weight of just under 7.72 tonnes (17 klb). A transient analysis shows that the design meets the force specifications. Optionally, permanent magnets can be used to reduce real power consumption.

N. References

Unless otherwise noted, each of the references listed below are fully incorporated by reference into this paper and made a part hereof:

[2-1] H. Dai, M. Sain, and B. Spencer, "Using tensors to track earthquakes on hydraulic shaker tables," *IEEE Trans. on Mechatronics*, vol. 4, no. 1, March 1999, pp. 60-70.

[2-2] L. Flora and H. Grundling, "Acceleration control of an inverter-fed electrodynamic shaker," IEEE Power Electronic Specialist Conference, Jun. 18-22, 2006, pp. 1-7.

[2-3] R. Fair and H. R. Bolton, "Analysis and design of electromagnetic moving coil vibration generators,"1993. Sixth International Conference on Electrical Machines and Drives, Sep. 8-10, 1993, pp. 529-534.

[2-4] M.-T. Peng and T. J. Flack, "Numerical analysis of the coupled circuit and cooling holes for an electromagnetic shaker," *IEEE Trans. on Magn.*, vol. 41, no. 1, January 2005, pp. 47-54.

[2-5] R. Fletcher and M. J. D. Powell, "A rapidly convergent descent method for minimization," *Computer Journal*, vol. 6, 1963, pp. 163-168.

[2-6] Goldfarb, D., "A family of variable metric updates derived by variational means," Mathematics of Computing, vol. 24, 1970, pp. 23-26.

[2-7] G. E. P. Box and N. R. Draper, Empirical model building and response surface, John Wiley and Sons, New York, 1987.

[2-8] P. Alotto, P. Girdinio, P. Molfino, and M Nervi, "Mesh adaption and optimization techniques in magnet design," *IEEE Trans. on Magn.*, vol. 32, no. 4, July 1996, pp. 2954-2957.

[2-9] Carl de Boor, A Practical Guide to Splines, ISBN 9780387953663, Applied Mathematical Sciences, New York, Springer, 1978.

[2-10] K. R. Davey, "Magnet design optimization using variable metrics," *IEEE Trans. on Magn.*, vol. 31, no. 6, 1995, pp. 3566-3568.

[2-11] K. R. Davey, "Use of tensor product splines in magnet optimization," *IEEE Trans. on Magn.*, vol. 35, no. 3, May 1999, pp. 1714-1717.

[2-12] K. R. Davey, "Examination of various techniques for the acceleration of multivariable optimization techniques," *IEEE Trans. on Magn.*, vol. 39, no. 3, May 2003, pp. 1293-1296.

[2-13] P. Silvester, "Modal network theory of skin effect n flat conductors," Proc. IEEE, vol. 54, no. 9, September 1966, pp. 1147-1151.

[2-14] M. Giesselmann, T. Heeren, A. Neuber, and M. Kristiansen, "Advanced modeling of an exploding flux compression generator using lumped element models of magnetic diffusion," IEEE Pulsed Power Plasma Science Conference, June 17-21, 2001, vol. 1, pp. 162-165.

[2-15] D. Marquardt, "An algorithm for least-squares estimation of nonlinear parameters," *SIAM Journal Applied Math.*, vol. 11, 1963, pp. 431-441.

Insulation Design

Figure 10A:
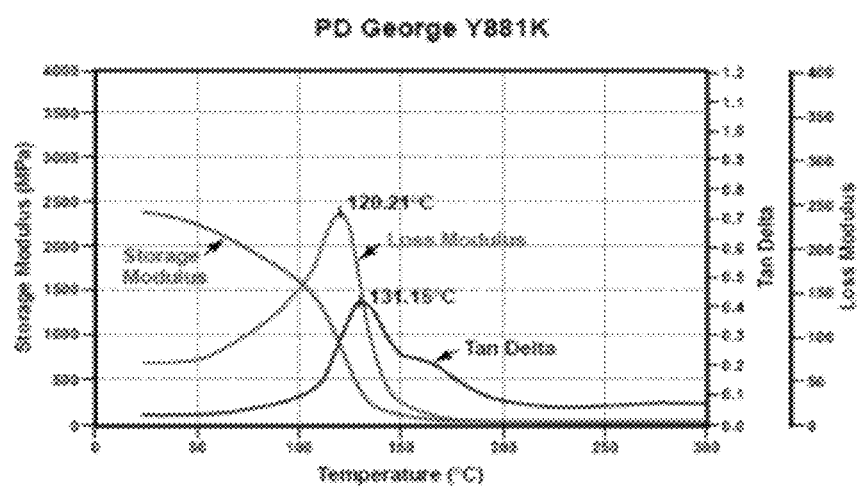
FIG. 10A illustrates heat deflection and glass transition temperatures of insulation systems.

In one aspect, the class rating for insulation systems indicates a temperature range where the resin in the insulation starts to sublime and over time can lose insulation strength. This rating is appropriate if the conductors are not carrying much mechanical load which is the case for winding in iron slots of generator stators. The coils for the electromagnetic seismic vibrator (EMSV) can have mechanical load and the rating that is desired to be observed is the heat deflection temperature (HDT). FIG. 10A presents laboratory test data from which the HDT and Glass Transition Temperature ($T_g$) are calculated. The figure also presents a table of these values for some of the commonly available resin insulation systems. The HDT generally represents the maximum temperature at which the insulation retains good strength and $T_g$ is the temperature at which the insulation can show duress under load.

Figure 10B:
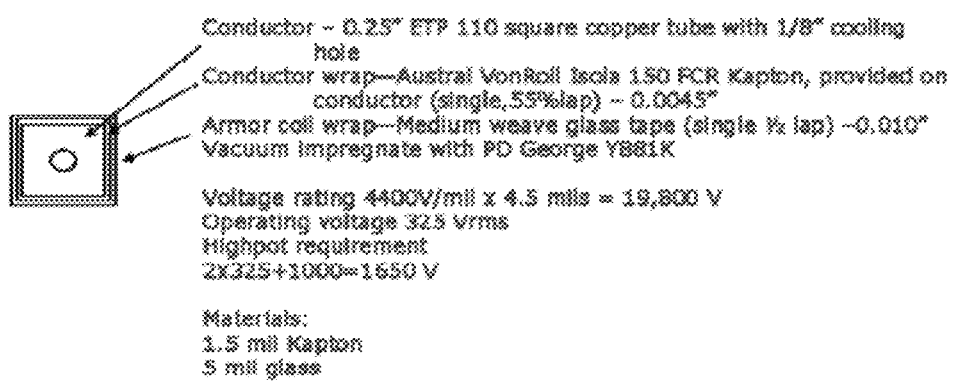
FIG. 10B illustrates an insulation system design.

One exemplary layup of insulation on the conductor is shown in FIG. 10B. The Kapton™ can be bonded to the copper tubing with Teflon™ through a heating process. This produces a very robust insulator. Two more layer of Kapton™ can be applied to the conductor and then an overwrap of glass can be applied as the armor. The glass readily wets with the VPI resin and creates a very strong mechanical encapsulation of the conductor. FIG. 10B also indicates the insulation strength for this system. It is an order of magnitude greater than the highpot inspection voltage. This specification should provide high temperature capability and long life.

EMV Mechanical Design

Figure 11A:
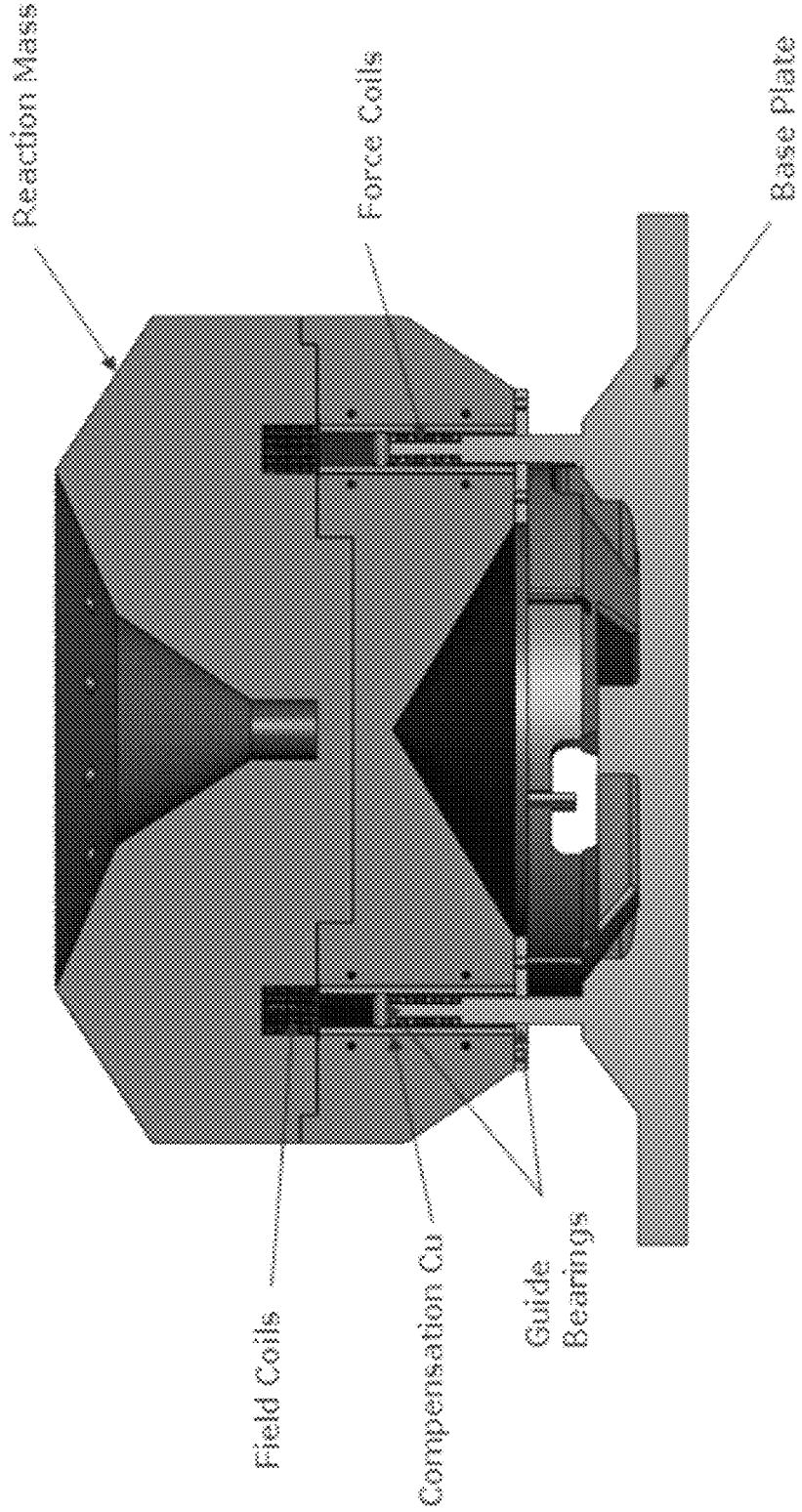
FIG. 11A illustrates an EMV baseline design.

The major mechanical parts for an embodiment of the EMV can comprise the:

1) Reaction Member (e.g., reaction mass)
2) Base Member (e.g., a stainless steel Baseplate)
3) Field Coils
4) Force Coils
5) Passive Compensation Copper Conductors
6) Guide Bearings for Base Member
7) Electrical and Cooling Terminations Many of these parts are illustrated in the exemplary EMV baseline design presented in FIG. 11A and FIG. 18A.

A. Reaction Member

Figure 11B:
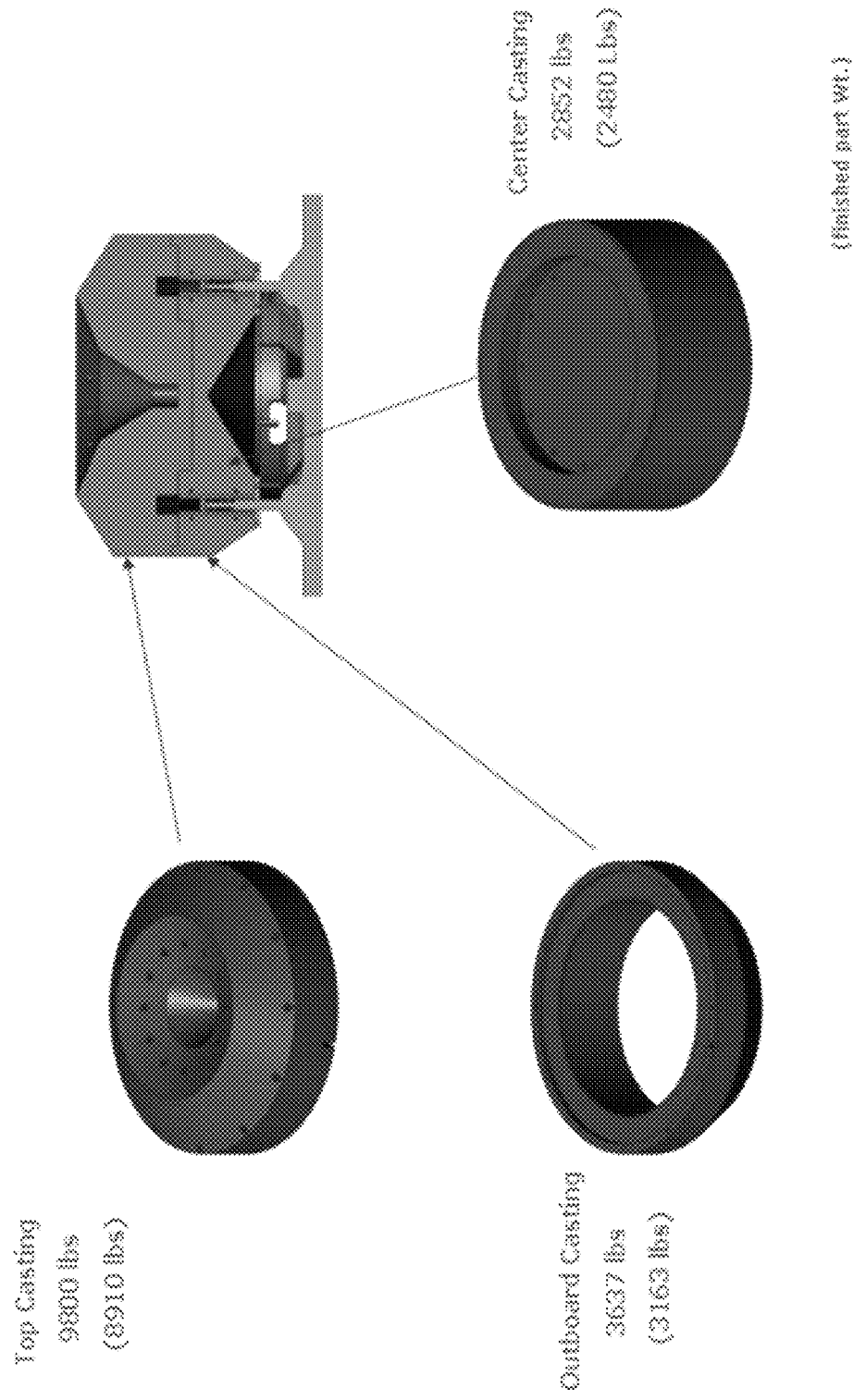
FIG. 11B illustrates a metal reaction mass.
Figure 18B:
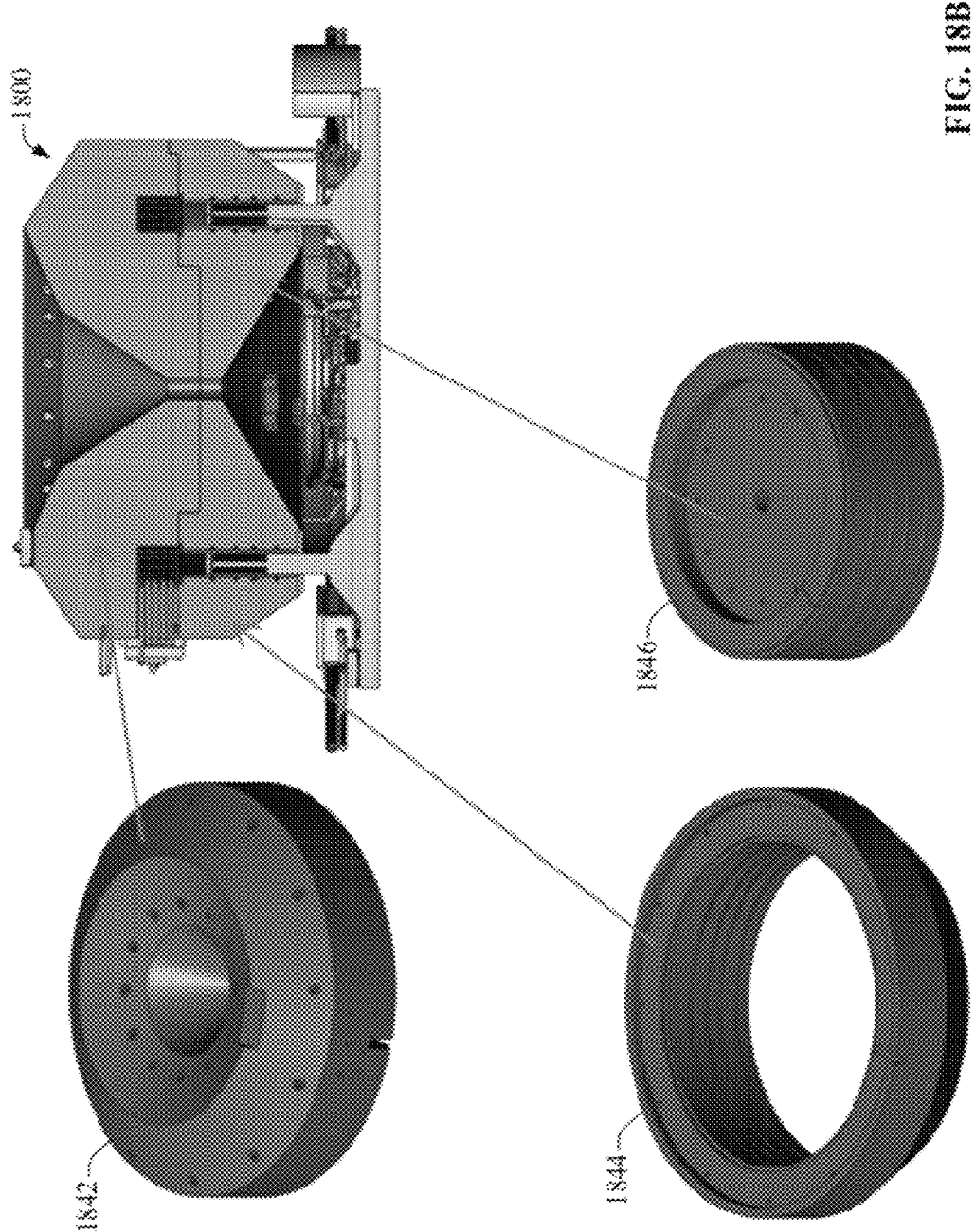
FIG. 18B illustrates an exemplary embodiment of a reaction mass.

In certain embodiments, the reaction member (e.g., reaction mass) can be a three part assembly made of a type of steel whose alloy properties are most favorable to sustaining the magnetic fields generated by the EMV field coils. In one aspect, such type of steel is a low carbon steel commonly known as AISI 1005, and referred to as A216, when discussed in context to a casting. FIG. 11B and FIG. 18B illustrate exemplary embodiments of a reaction member in position over the base member. It is noted that number in parenthesis in FIG. 11B represent a final weight after a casting in the reaction member is machined to desired dimension(s). In FIG. 18B, the reaction member comprises a top casting 1842, an outer casting 1844, and a center casting 1846. In one embodiment, the top casting 1842 can have a mass of about 9800 lbs, and a mass of about 9268 lbs after machining such casting to desired dimension(s); the outer casting 1844 can have a mass of about 3637 lbs, and about 3216 lbs after machining such casting to desired dimension(s); and the center casting 1846 can have a mass of about 2852 lbs, and about 2770 lbs after machining such casting to desired dimension(s).

In addition or in the alternative, the reaction member can have a bottom surface in which an annular channel is defined that is sized and shaped to operatively accept at least the upper end portion of an annular base member (e.g., annular base member 1850). In one aspect, such annular base member (e.g., annular base member 1850) can have an elongate lower portion (e.g., element 1858 of annular base member 1850) extending proximally from the upper end portion (e.g., element 1852) of the annular base member, and wherein the annular channel is sized and shaped to operatively accept at least a portion of the elongate lower portion of the annular base member (e.g., annular base member 1850). In another aspect, the annular channel of the reaction member can have a pair of opposed upright walls. In yet another aspect, as described herein, the reaction member can comprise a pair of opposing sleeves (or lining) mounted to the pair of opposed upright walls. As described herein, each sleeve can serve as a passive compensator (see, e.g., FIG. 18F), and can be formed of a material suitable to reduce an imposed magnetic field generated through force coils (e.g., a plurality of ECRs on portions of the reaction member in proximity to a second plurality of ECRs.) as described herein.

B. Base Member

Figure 11C:
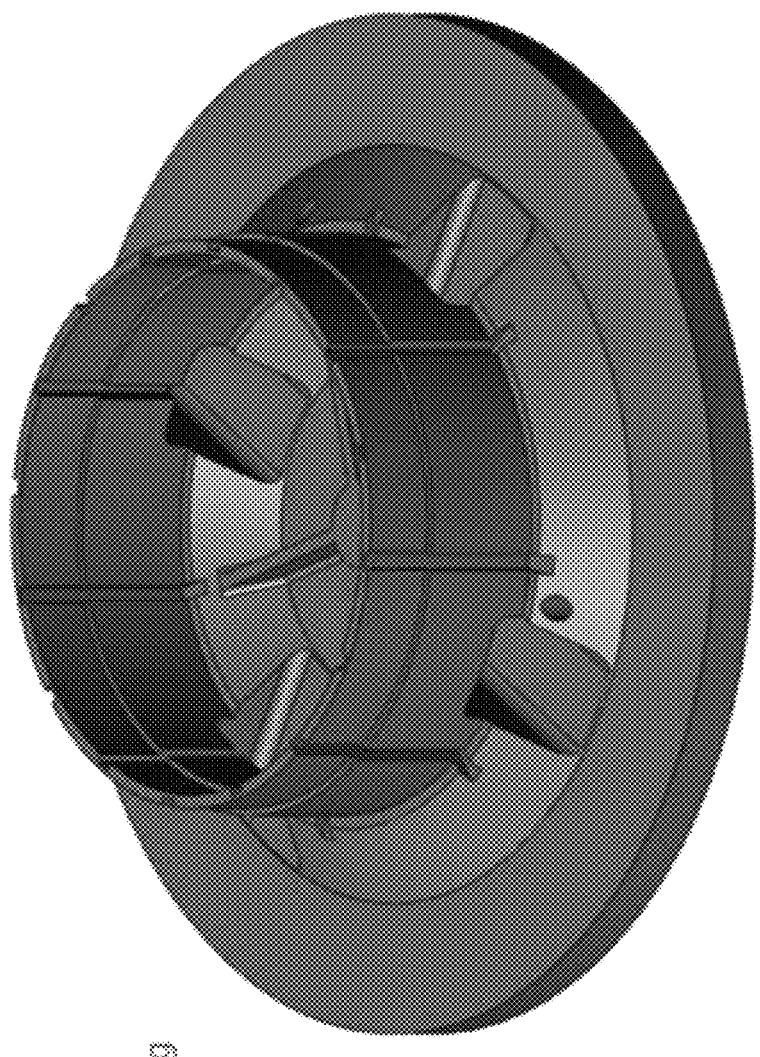
FIG. 11C illustrates an EMV baseplate.
Figure 18C:
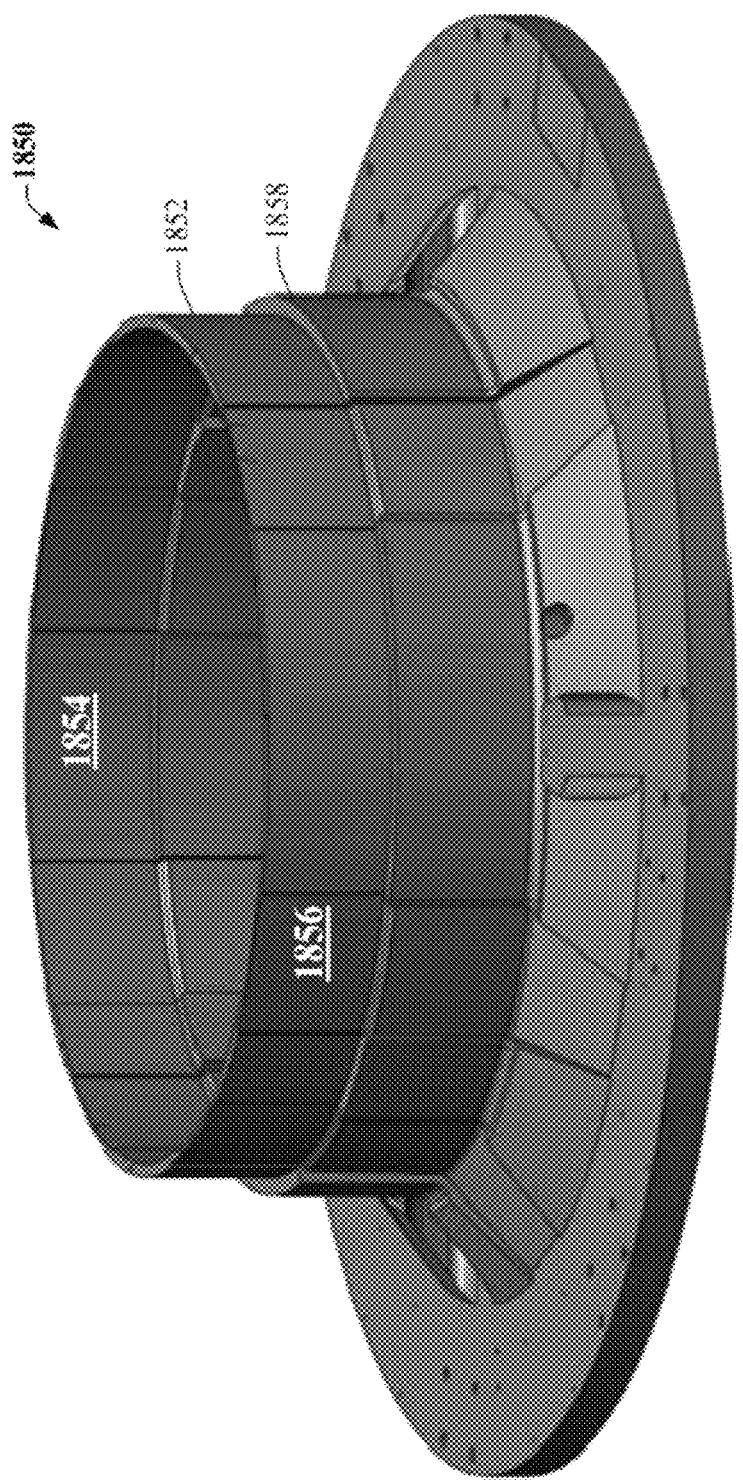
FIG. 18C illustrates an exemplary embodiment of a baseplate of an electromagnetic seismic vibrator described herein.

In one embodiment, the base member (e.g., a baseplate) can be a metal casting. The metal can be, for example, a non-magnetic CF8 (304) corrosion-resistant material as illustrated in FIG. 11C and FIG. 18C. In one aspect, the base member (e.g., the baseplate) can comprise a plurality of ribs (see, e.g., FIG. 11C) that can structurally reinforce the base member. As illustrated in FIG. 18, the base member can be an annular base member 1850 having an upright upper end portion 1852 having an inner annular surface 1854 and an outer annular surface 1856, wherein the reaction member is operatively coupled to the annular base member for selective axial movement of a reaction member about an equilibrium position relative to the annular base member 1850.

C. Field Coils

Figure 11D:
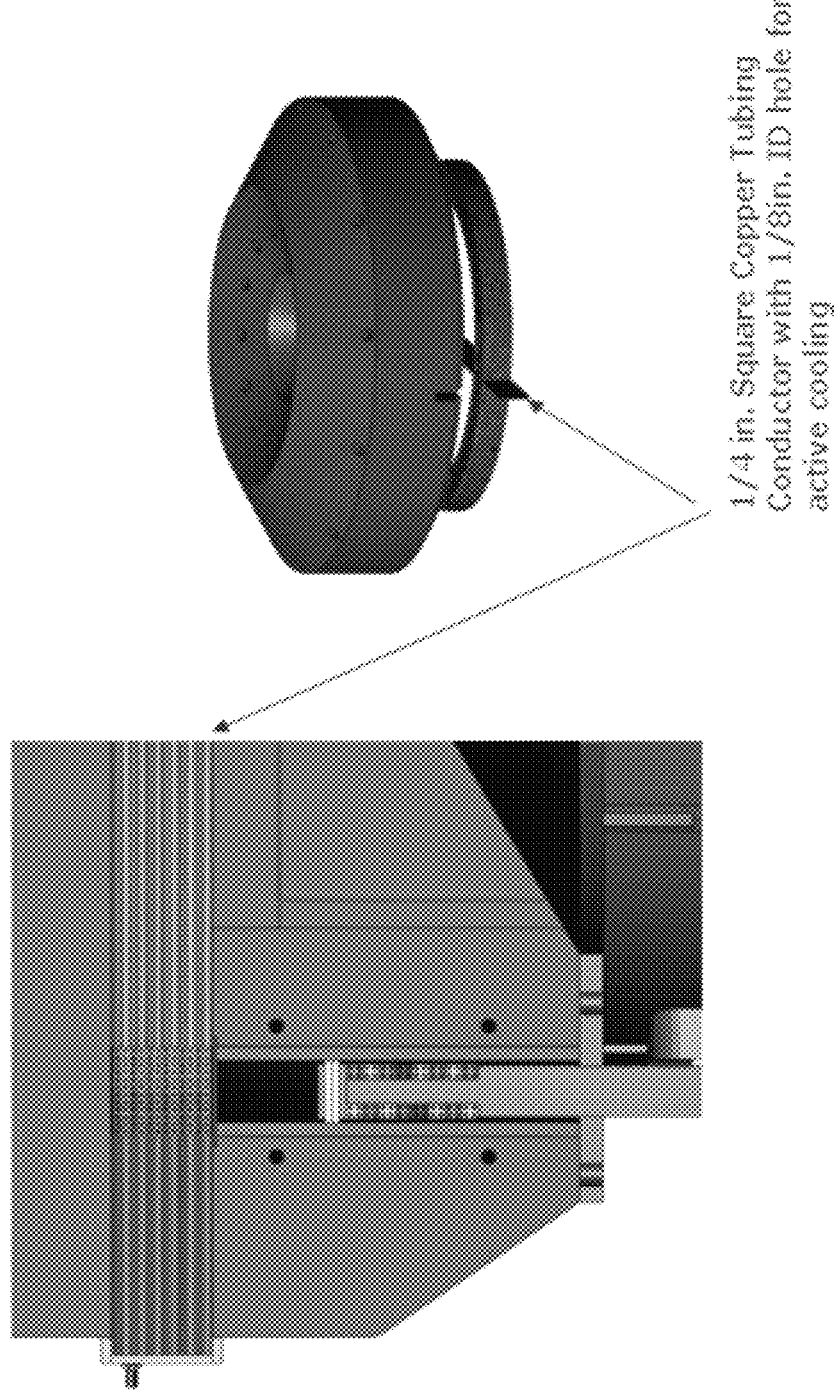
FIG. 11D illustrates field coils.
Figure 17F:
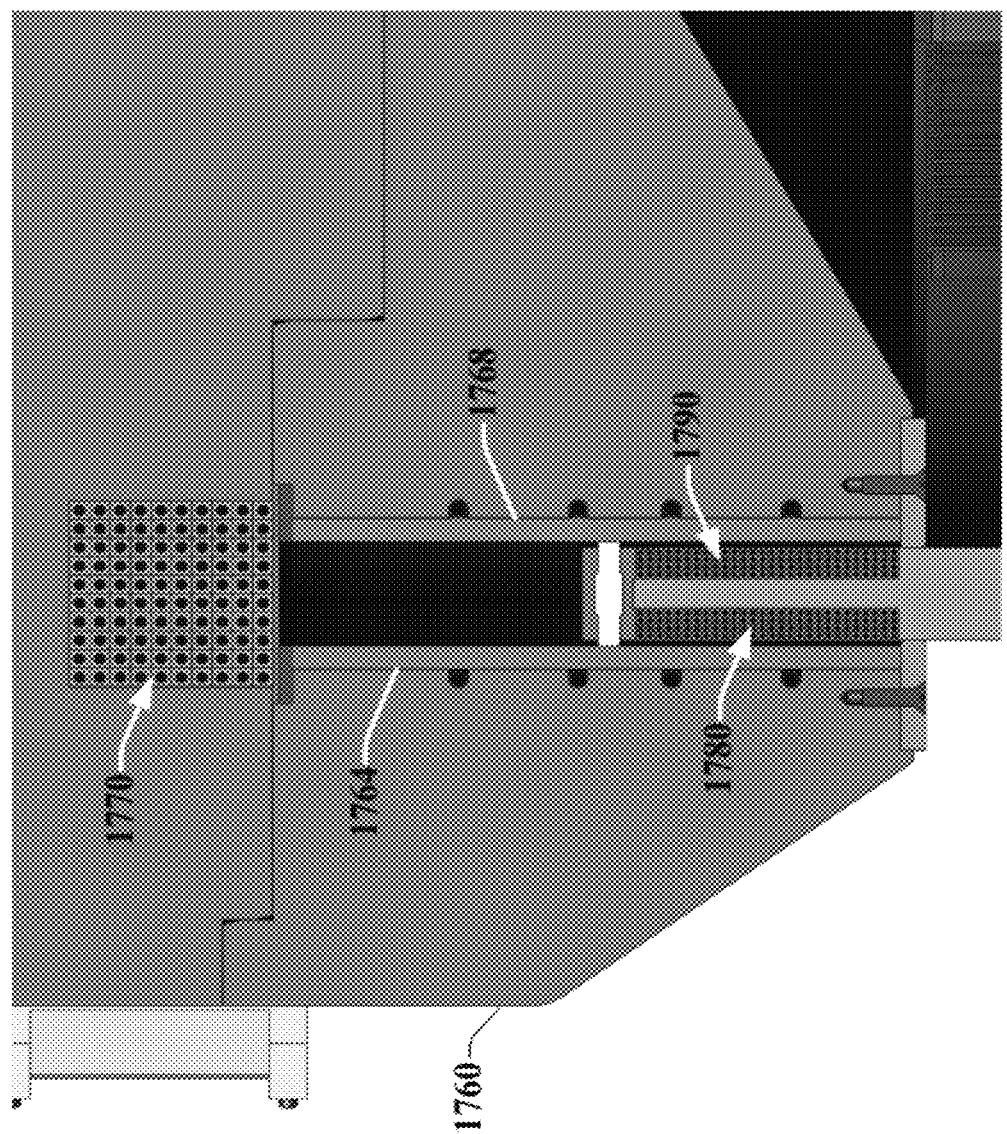
FIG. 17F illustrates exemplary field coils comprising a plurality of electrical conductor rings (ECRs).
Figure 18D:
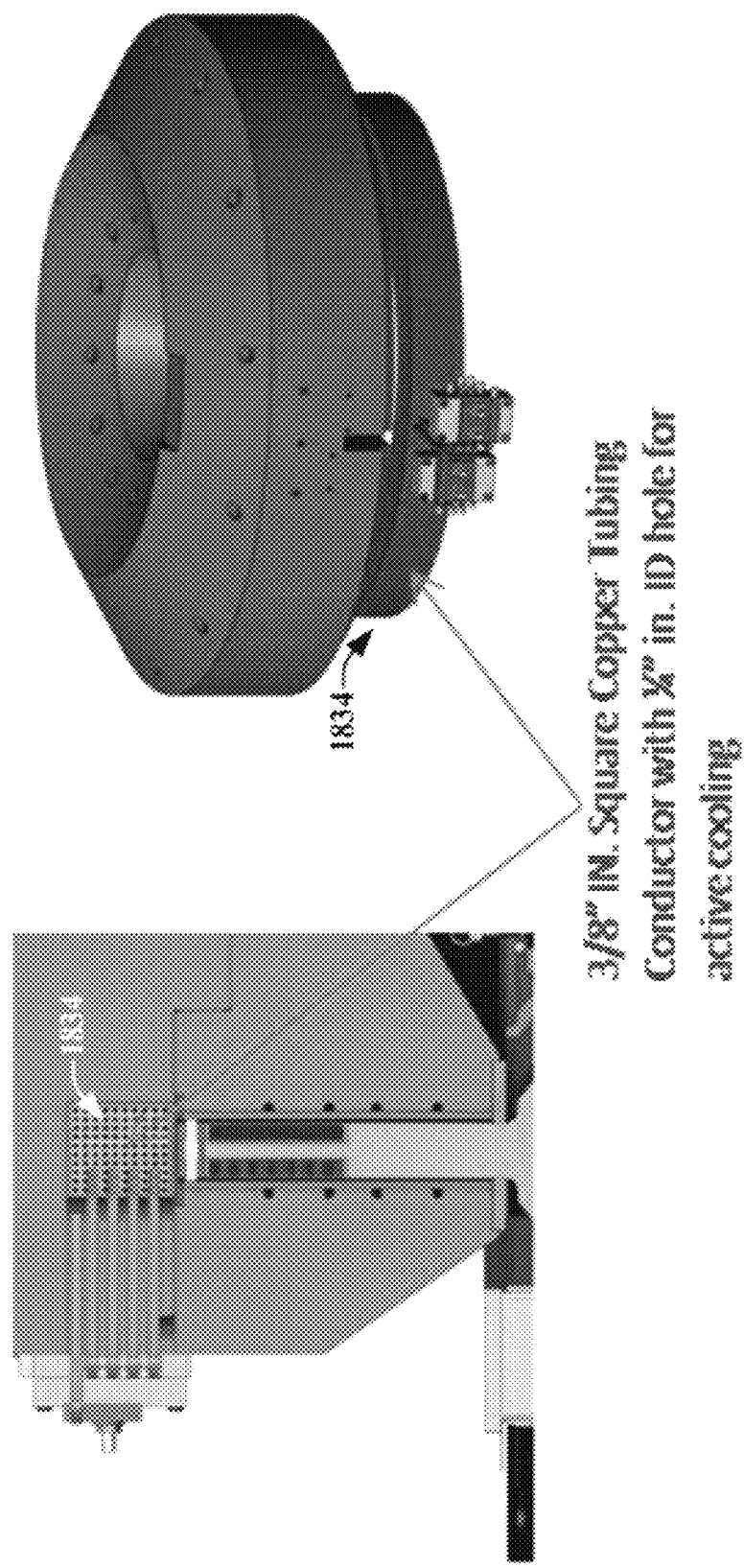
FIG. 18D illustrates an exemplary embodiment of field coils of an electromagnetic seismic vibrator described herein.

In one embodiment, the field coils in the baseline design (see, e.g., elements 1770 in FIG. 17F or elements 1834 in FIG. 18A) can comprise a plurality of electrical conductor rings (ECRs) in communication with a source of electric current. In one aspect, such plurality is coupled to a portion of the reaction member. In another aspect, such plurality of ECRs can be arranged in a specific pattern. In yet another aspect, the plurality of ECRs can be configured to transport a selectable electric current effective to create a magnetic field of a desired strength. Each of such ECRs can be hollow to permit circulation of fluid coolant for active cooling. A mixture of water and ethylene glycol can flow through the field coils to remove heat generated from current flow through the field coils when the EMV is operating. As illustrated in FIG. 11D, the fluid coolant can be injected into the field coils in a double-feed configuration. In the alternative, as shown in FIG. 18D, such coolant can be injected into the field coils in a single-feed configuration. An advantage of the single-feed configuration is reduced manufacturing complexity. Thermal analysis described herein can dictate a particular coolant injection configuration. In one aspect, each ECR of the plurality of ECRs can be an approximately 0.25 in. square-section copper conductor tubing with an approximately 0.125 in, diameter center hole. The field coils, comprising the plurality of ECRs, can be contained in a machined pocket in the top piece of the reaction mass. Electrical conductors rings in the plurality of ECRs coils can have one or more layers of insulation, which can mitigate heat dissipation into the top piece (or member) of the reaction mass. In one aspect, the outer layer can be 5 mil glass cloth that can be vacuum pressure impregnated (VPI) with a high temperature rated (e.g., class H) resin. FIG. 11D and FIG. 18D illustrate exemplary embodiments of the field coils and their location in the reaction mass.

D. Force Coils

In one embodiment, the force coils (see, e.g., elements 1780 and 1790 in FIG. 17F, or elements 1836 and 1838 in FIG. 18A) can comprise a plurality of electrical conductor rings (ECRs) in communication with a source of electric current. Such plurality of ECRs can be arranged in a specific pattern. For example, such plurality of ECRs can be transposed in a Roebel array. In one embodiment, the plurality of ECRs can be coupled to at least a portion of the inner annular surface 1854 or the outer annular surface 1854 of the upper end portion 1852 of the annular base member 1850. In one aspect, the plurality of ECRs can be configured to transport a selectable second electric current effective to operatively interact with a magnetic field generated by field coils(s) to selectively displace the reaction member from an equilibrium position.

Figure 18E:
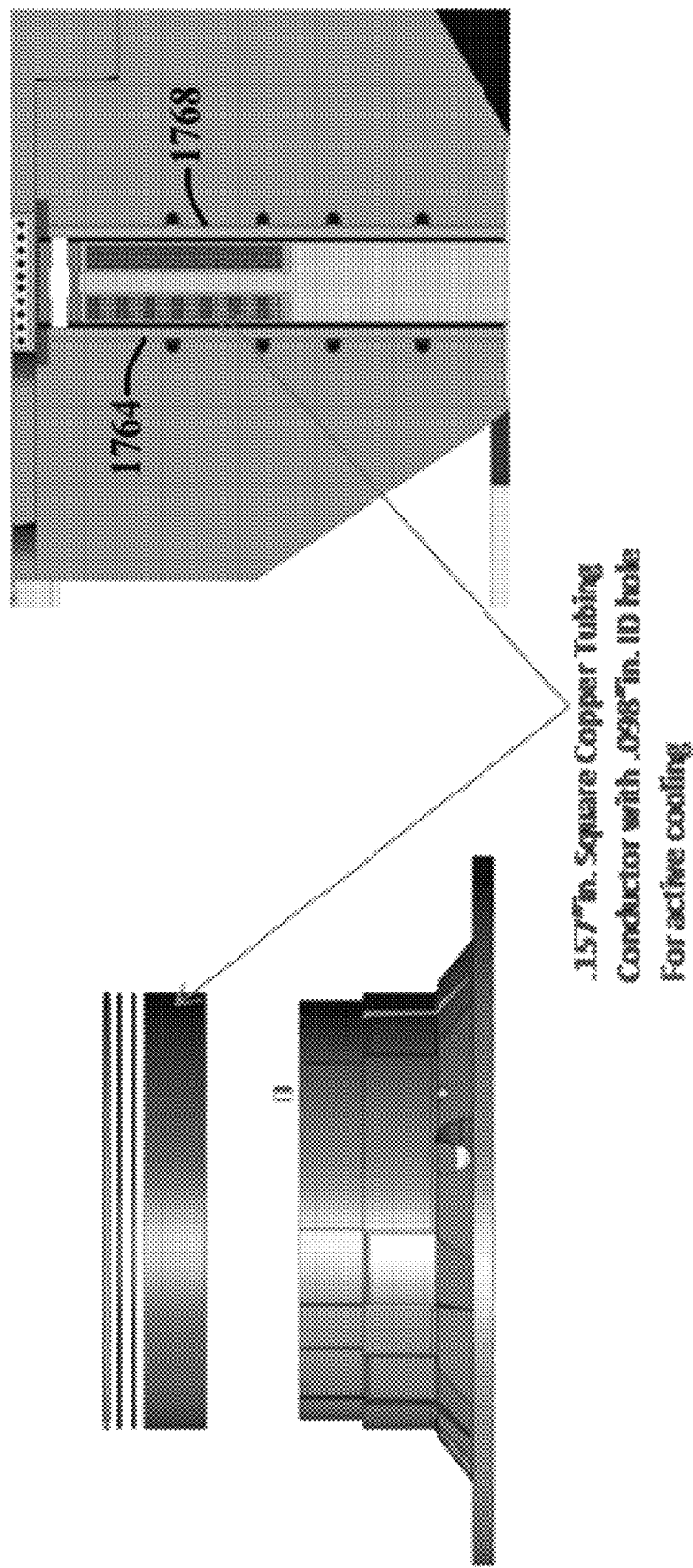
FIG. 18E illustrates an exemplary embodiment of force coils of an electromagnetic seismic vibrator described herein.

Each ECR of the plurality of ECRs can be hollow to permit circulation of fluid coolant for active cooling. In one aspect, the force coils can be wound out of approximately 0.25 in. square-section copper conductor tubing with an approximately 0.125 in. diameter center hole. In certain implementations, the plurality of ECRs can be secured to the baseplate as shown in FIG. 11E and FIG. 18E, wherein a first plurality of ECRs of the plurality of ECRs can overlie at least a portion of an outer surface of the top ring of the baseplate, and a second plurality of ECRs of the plurality of ECRs can overlie at least a portion of an inner surface of the top ring of the baseplate. The force coils also can be secured to the baseplate in other configurations. Similarly, yet not identically, to the field coils, the force coils can be resin impregnated to mitigate heat dissipation.

In one embodiment of an EMSV, the plurality of ECRs can comprise a first array of ECRs and a second array of ECRs, wherein the first array of ECRs is coupled to at least a portion of the inner annular surface 1854 of the upper end portion 1852 of the annular base member 1850, wherein the second array of ECRs is coupled to at least a portion of the outer annular surface 1856 of the upper end portion 1852 of the annular base member 1850. In addition, the first array of ECRs and the second array of ECRs are both transposed in a Roebel array.

E. Other EMV Components

Figure 11F:
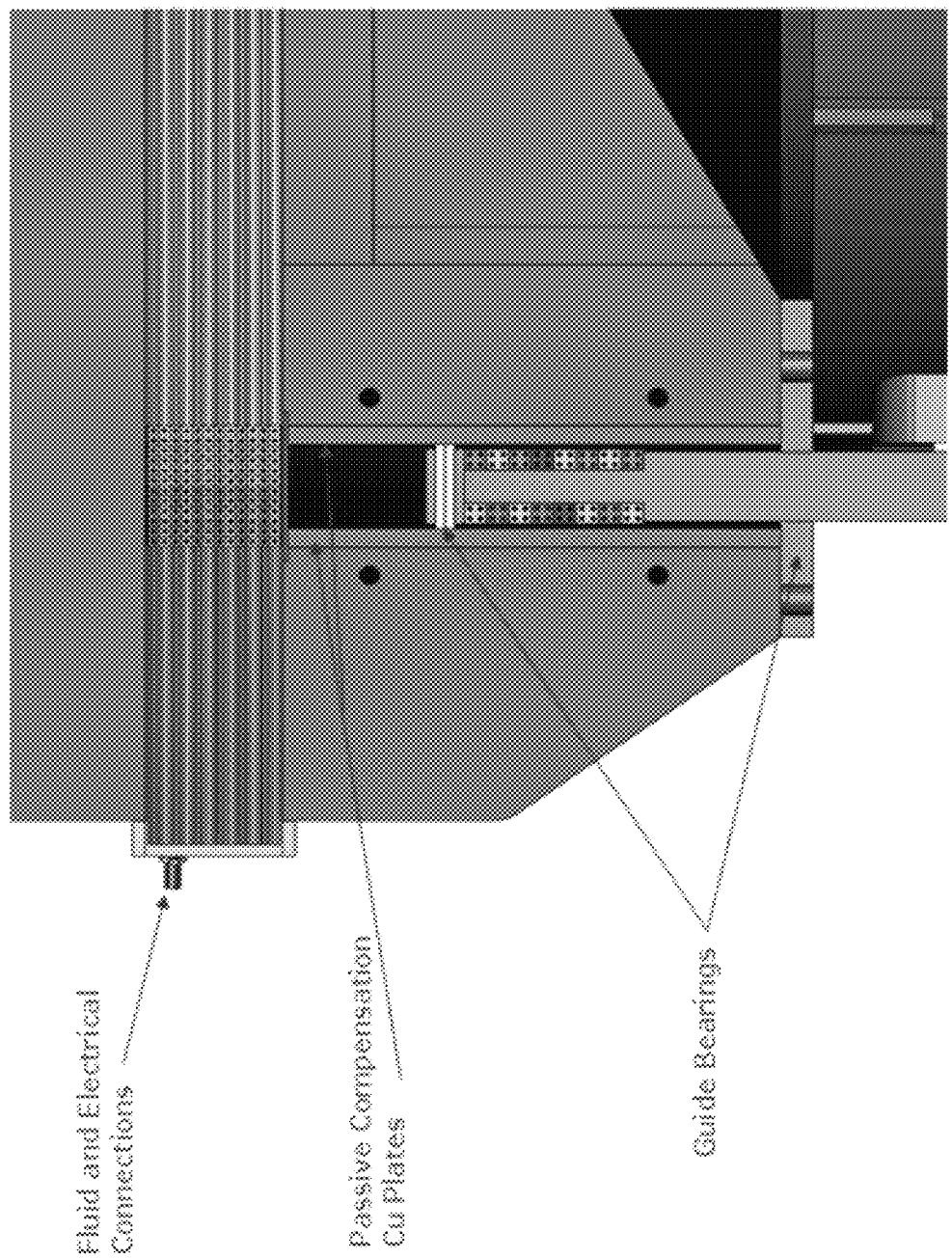
FIG. 11F illustrates other EMV Components.
Figure 11G:
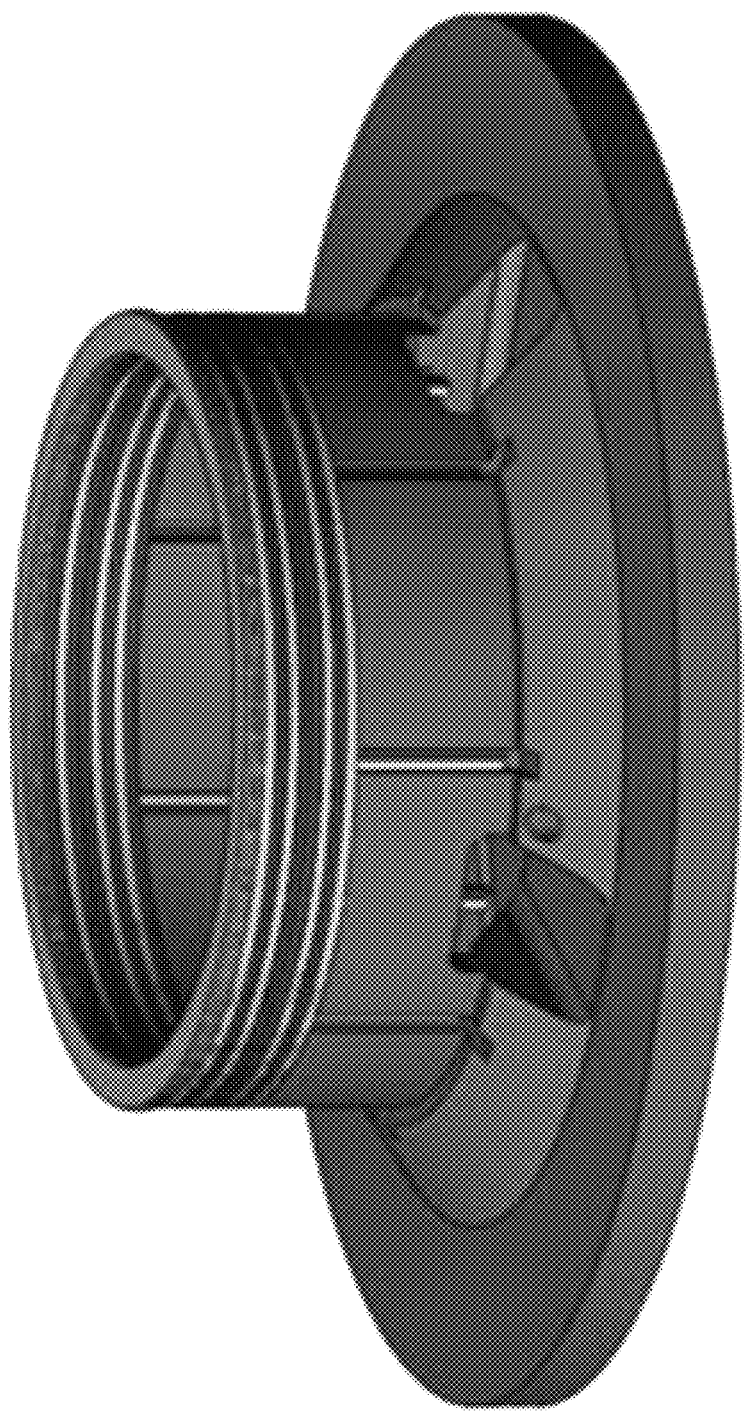
FIG. 11G illustrates EMV baseplate with force coils attached.
Figure 11H:
FIG. 11H illustrates field coils prior to placement in top reaction mass steel.
Figure 111:
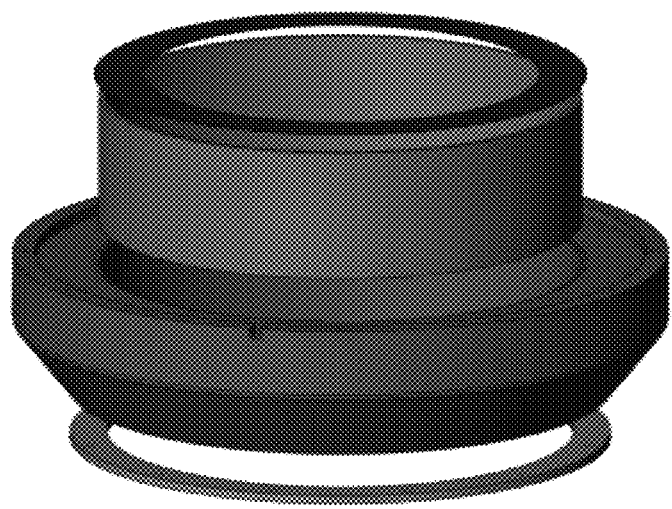
Figure 11J:
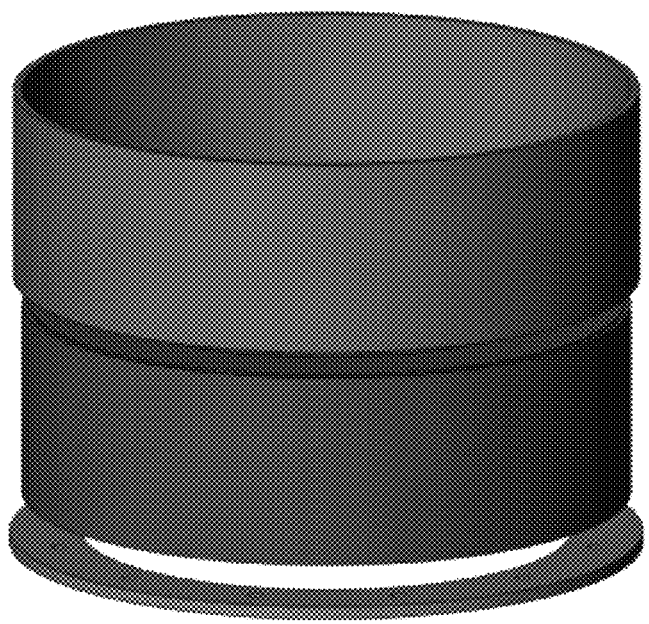
FIG. 11J illustrates the center steel casting prior to placement of a metal ring (e.g., a copper ring).
Figure 11K:
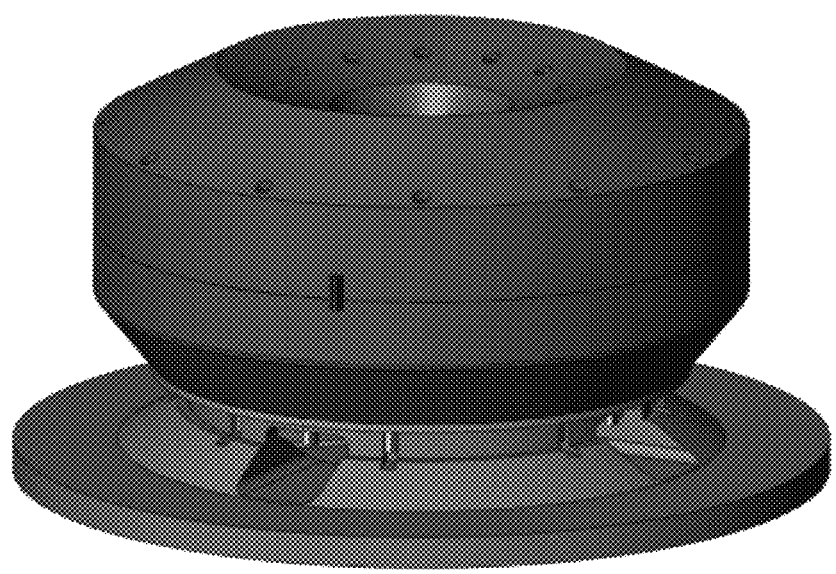
FIG. 11K illustrates EMV reaction mass with baseplate inserted.
Figure 11L:
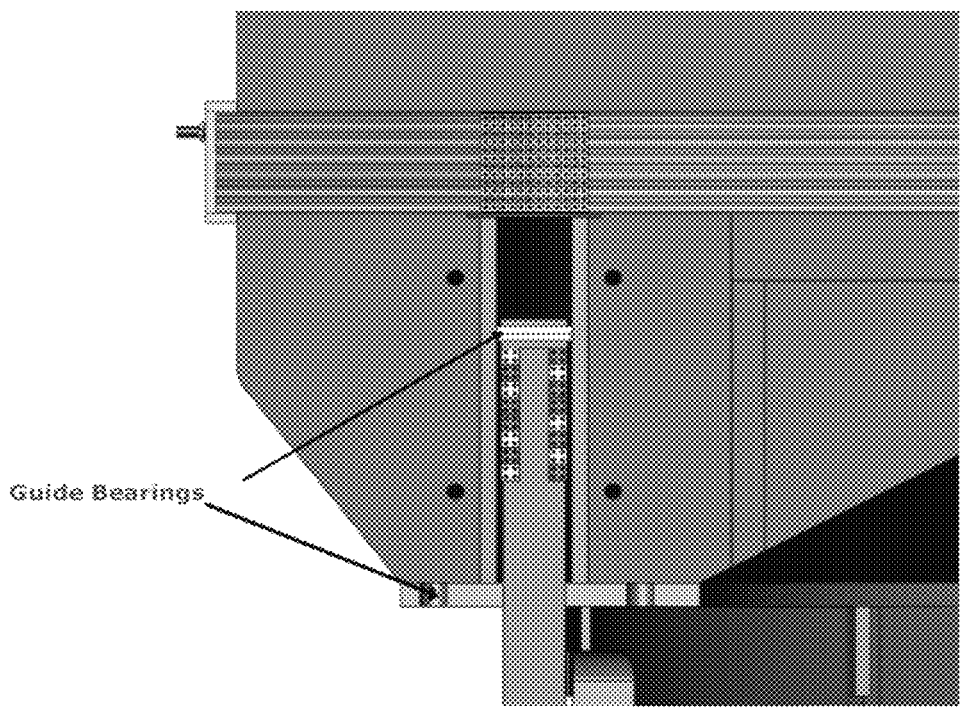
FIG. 11L illustrates EMV baseplate guide bearings.
Figure 18F:
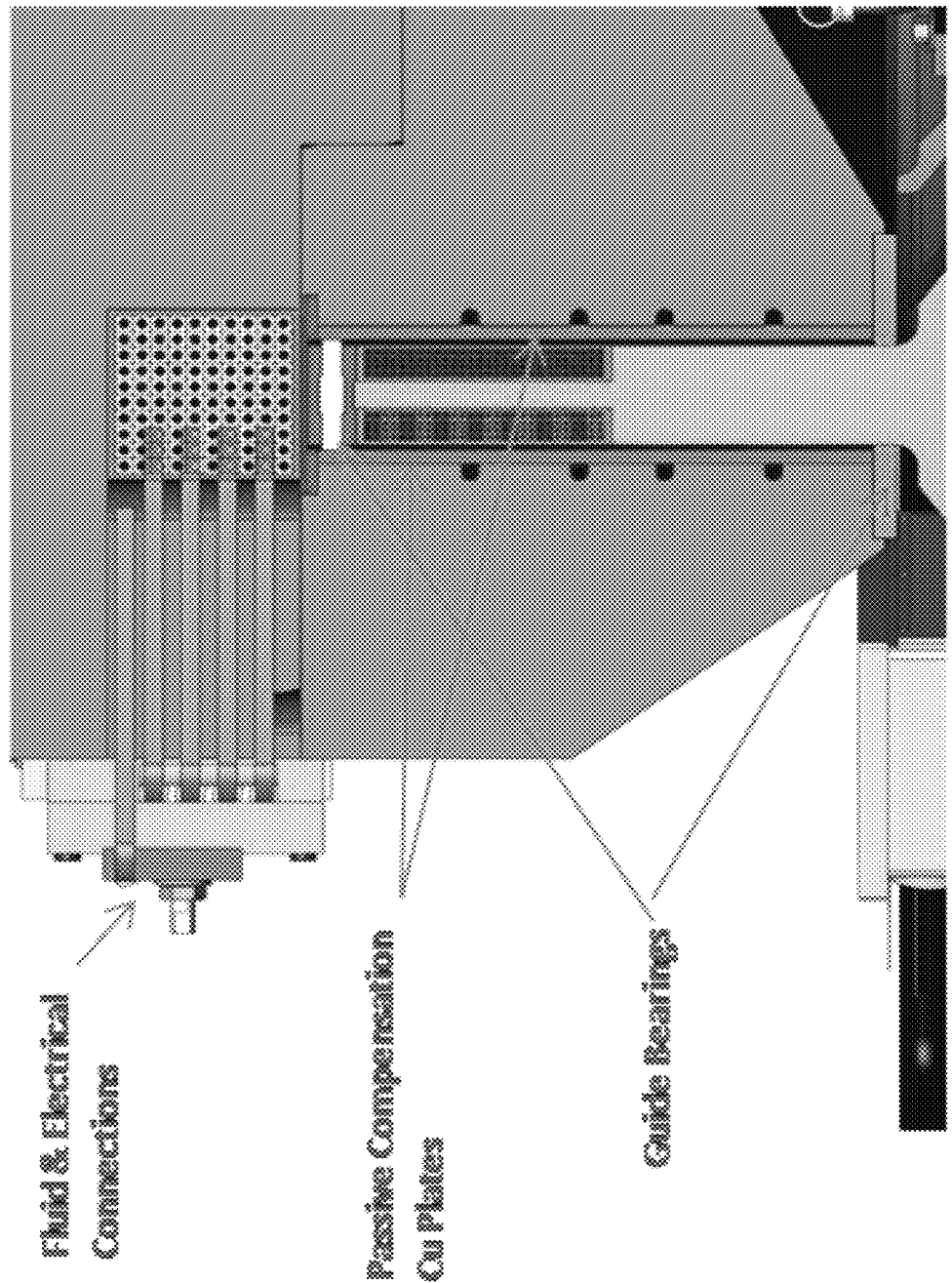
FIG. 18F illustrates an exemplary embodiment of various components that enable operation of an electromagnetic seismic vibrator described herein.
Figure 18G:
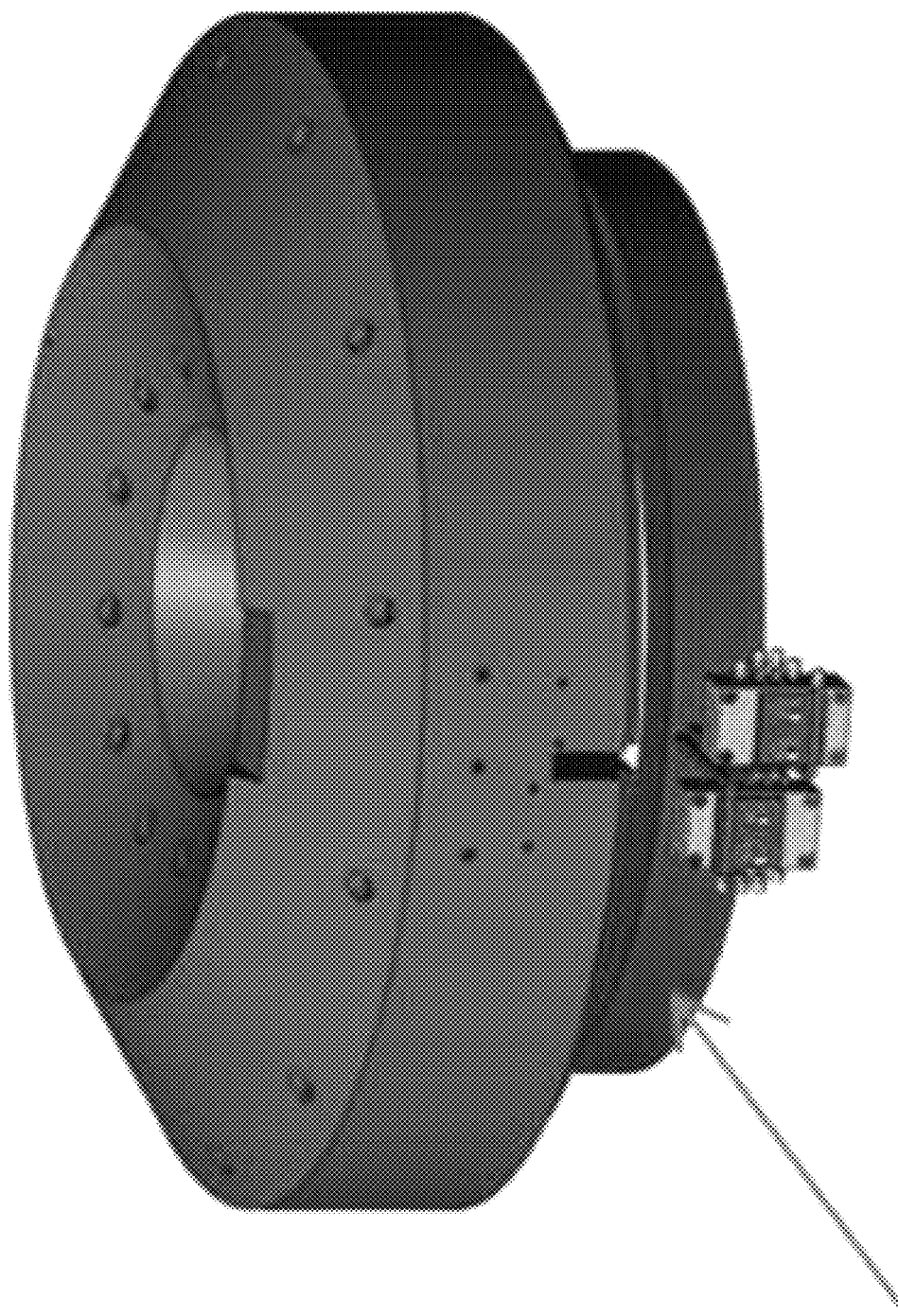
FIG. 18G illustrates an exemplary embodiment of field coils prior to placement into a top member of a reaction mass in accordance with aspects described herein.

Other parts of the EMV of the disclosure can include passive compensation metal sleeves, or passive compensation metal rings, wherein the metal can be copper; guide bearings; and robust electrical and fluid cooling terminations, or connections. Such component parts are illustrated in FIG. 11F and FIG. 18F. At least one of such parts can be custom designed and fabricated. One embodiment of the fabrication steps are shown in FIGS. 11G-11J, resulting in the final assembly shown in FIG. 11K and FIG. 11L. In another aspect, FIG. 18G illustrates field coils prior to placement into a top member of a reaction member (also referred to as reaction mass; see, e.g., FIG. 18B). For the sake of clarity, in such drawings, an arrow points to the field coils. As described herein, such field coils are coupled to fluid coolant injection connectors and electrical connectors.

Vibrator Power Supplies

The power electronics section comprises several components of an embodiment of a system, starting at the inverter that powers the force coils. This is an important power component as it powers the force coils with the current that is fully controlled by the system controller. The inverter has a DC input from the link capacitor and an AC output to the force coils. The output frequency is required to sweep from 4 to 225 Hertz while maintaining a sinusoidal output with very low total harmonic distortion (THD).

In addition to the inverter output function, the inverter package can also include a three phase rectifier bridge and the link capacitors. The rectifier bridge is a three phase, full-wave, design. The upper set of switching devices can be controlled devices while the lower three can be passive rectifiers. Making this a half-controlled bridge can allow for controlled soft-start charging of the link capacitor from the alternator. After the initial charging is completed, the unit can function as a traditional full-wave bridge.

In one embodiment, the DC link capacitor value was selected to be 0.1 Farads. The link capacitor can provide energy for the inverter in the quick burst that the inverter demands. The generator is the source of the energy, but it can operate at 70 Hz and may not be able to directly supply the inverter. The link capacitor needs to have enough energy available to assist during the low frequency portion of the sweep which is what dictated the 0.1 F value. The capacitor voltage is set by the generator output voltage, 480 V rms in this case, to be 680 V dc.

The next component in the line is the inverter itself. The inverter can be a single phase unit, configured in a classic 'H' bridge layout. This unit may be mounted on a truck and operate in all possible conditions, therefore the ambient temperature can vary from −35 to 60° C. The expected coolant inlet temperature is no higher than 65° C. The unit can be housed within a NEMA 4 style enclosure. The required output current is 2400 A rms at up to 350 V rms. The duty cycle is 100%. To achieve a low THD value and provide a swept frequency output of 4 to 225 Hz, it is estimated that a minimum switching frequency of 2.5 kHz is required.

In one embodiment, two separate inverter units can be connected in parallel to meet the current (e.g., 2400 A) specification. Each unit can be comprises of a three phase unit collapsed down to a single phase output. Such an inverter is available from, for example, Applied Power Systems, Inc. of Hicksville, N.Y.

In another embodiment, the inverter can be a highly parallel design switching at 2.5 kHz with a dead-time minimum value of 3.2 microseconds. This inverter is using four Eupec 1200 A IGBTs in parallel to achieve an output current rating of 2400 A rms in the low frequency range of 20 Hz and lower. In the upper range of 20 to 250 Hz the output rating is 3000 A rms. The expected distortion is 2.5% THD. Such an inverter is available from, for example, Saminco, Inc. of Fort Myers, Fla.

In one aspect, a DC power supply is for powering the field winding. In one embodiment, the requirements are for 931 A in the field coil. To meet this specification, an adjustable power supply with an output of 0 to 300 Volts and 0 to 1000 A can be used. Such a DC power supply is available from, for example, Dynapower Corporation of South Burlington, Vt.

In one aspect, power for the inverter and the DC power supply can be provided by an alternator connected to a prime mover such as a diesel engine. The alternator specifications are based on the loads such alternator can drive. In another aspect, the alternator can be a three phase, 480 Vac, 570 kW unit having a 60° C. ambient temperature rating. Such an alternator is available from, for example, Marathon Electric of Wausau, Wis. In other embodiments, the architecture of the DC power supply can be integrated with the PWM to provide both functions from one highly integrated cabinet.

Controls

Figure 12:
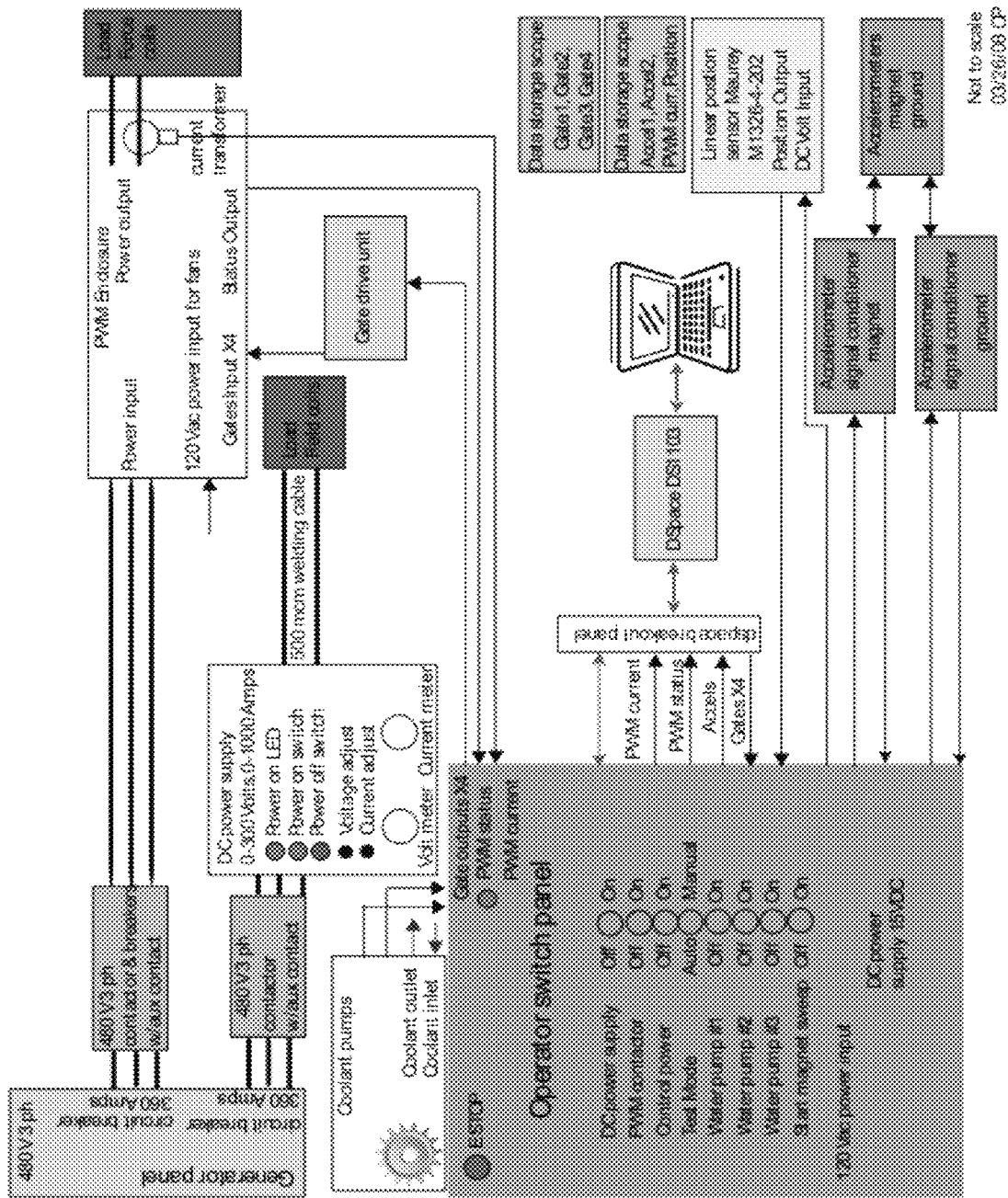
FIG. 12 illustrates a block diagram of the control system.

FIG. 12 is a block diagram of the components of an exemplary control system. From the top level down, the control system includes the system controller board, operator panel, down to an array of sensors. In one exemplary aspect, a dSPACE control board as available from dSPACE, Inc. of Wixom, Mich. can be used to allow for integration of the Matlab or Simulink test environment. In a prototype test environment, the flexibility of using a simulation package such as Simulink for the controls algorithm is ease of code changes. The dSPACE board is powered by PowerPC 750GX processor with a 1 GHz clock speed. The board has 20 analog to digital, A/D, channels with a +/−10 Volt range. These A/D channels are all 16 bit vertical resolution. There are 8 16 bit D/A channels, also with a +/−10 Volt range. There are 32 digital channels that can be configured as input or output channels. The dSPACE board includes a mounting enclosure, and a breakout panel that allows for easy connection to the input and outputs.

The block diagram (FIG. 12) presents the operator panel in the lower left area. This can be a panel with the basic controls for operating the EMV. The panel can allow for manual operation and testing of the various system components. During normal planned operation, all of the switching can be done using the dSPACE board in an automated fashion. The operator panel can have indicators for the status of many of the major components. This can assist in completing the initial checkout and locating any problem areas.

The controller board can handle all the system operation functions. The controller can collect and store signal data for later analysis. These include, for example: PWM control and gating; DC power supply control; Alternator functions; Accelerometers; Position sensors; Current sensors; Voltage sensors; Temperature sensors; and Coolant pumps.

The control board can be able to play the rising frequency sweeps, or take in external data files for an input for random phase sweeps. Again, the most flexibility possible can be built into the system to allow for the widest possible range of tests.

Exemplary Truck Layout

Described herein are basic modifications to a hydraulic shaker truck (i.e., the Mertz truck) to allow the installation of an embodiment of an EMV as described herein.

Figure 13A:
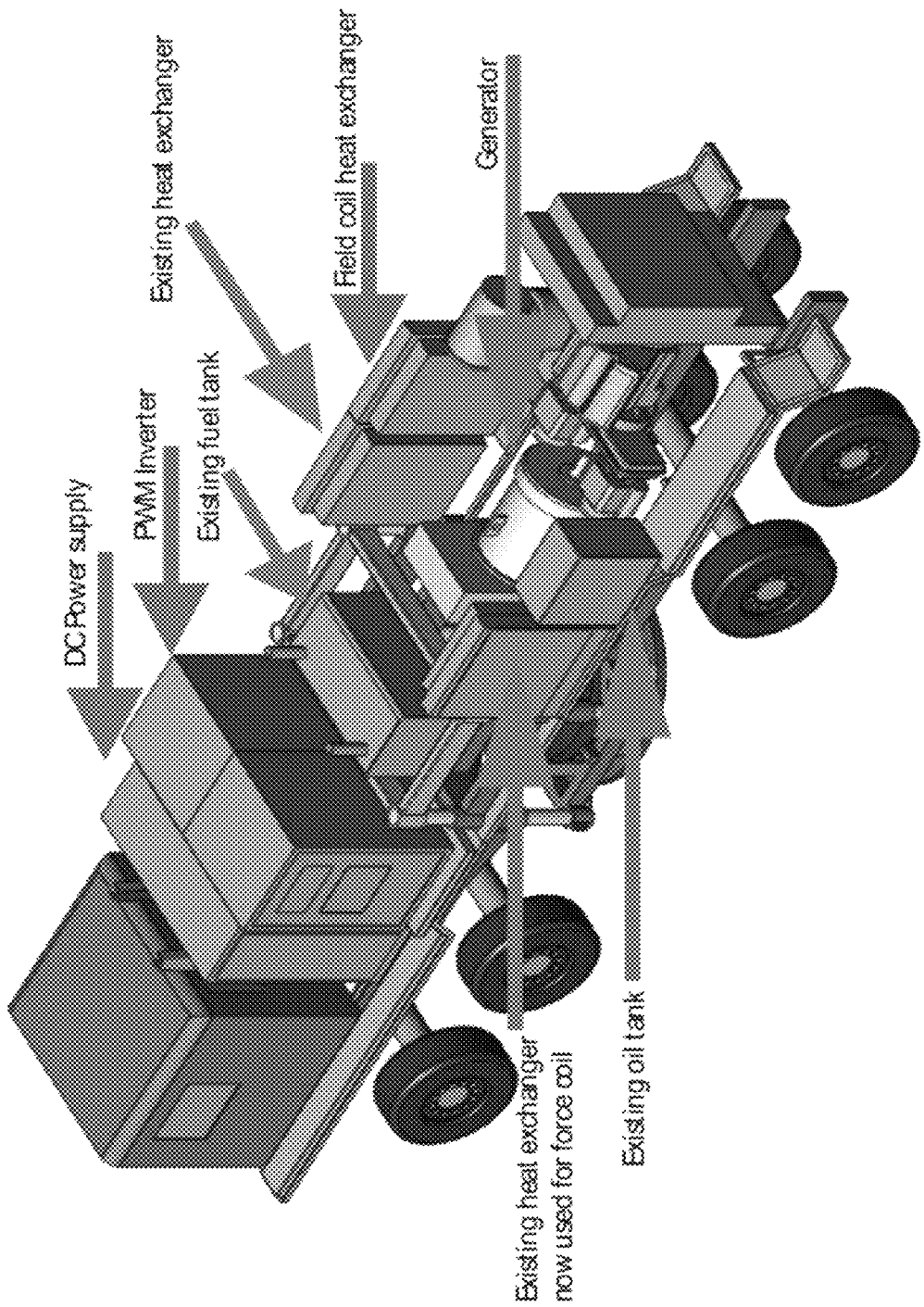
FIG. 13A illustrates a Mertz truck with the new components placed.

As shown in FIG. 13A, the generator can fit directly behind a diesel engine and the hydraulic drive transmission. The generator can be directly driven from the take-off pad that did drive the old vibrator hydraulic drive pump. The removal of the un-used vibrator hydraulic drive pump frees up the center most drive position. An adapter flange can connect to the SAE pad, and a spline shaft can couple to the drive pad. This adapter can drive a short driveshaft that can connect to the generator shaft. This setup can avoid requiring any sort of gearbox. The hydraulic drive does not include any sort of gear change. This exemplary arrangement requires the generator to operate at the Detroit diesel speed of 2100 RPM, instead of the generator design speed of 1800 RPM. The increased generator speed can result in an increase of the output frequency to about 70 Hertz, instead of 60 Hertz. The Marathon generator that has been selected has a maximum speed of 2250 RPM. To achieve an acceptable level of angle on the short driveshaft, the diesel engine should be relocated. The engine is mounted on a skid which is attached to the Mertz frame. The skid also includes the radiator, the hydraulic drive transmission, and many engine accessories. This can make relocating the engine rearward about 20" and upward 8" a simple task. A new U shaped skid can be made out of three pieces of channel steel, then slipped under the existing skid. The Mertz frame extends back the extra length, however the spare tire may be mounted elsewhere. Two new brackets that secure the skid to the frame can be fabricated. Some of the existing hydraulic hoses may not be long enough, which may require some adapters and new short lengths of hose to extend them to the rear.

Other modifications may include moving the diesel fuel tank from behind the cab to the center of the truck over the quad. The existing hydraulic oil tank can be rotated 90 degrees from next to the quad, to the right side of the truck.

Figure 13B:
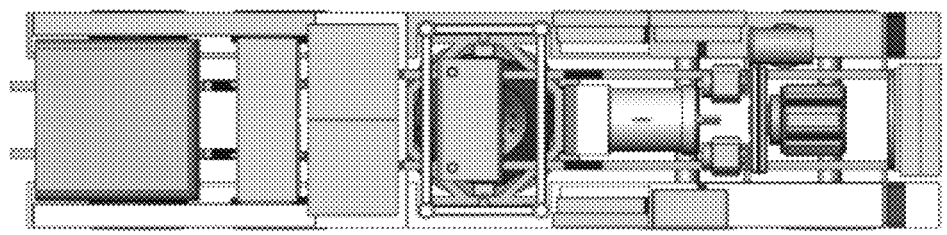
FIG. 13B illustrates a Mertz truck showing the top view.
Figure 13C:
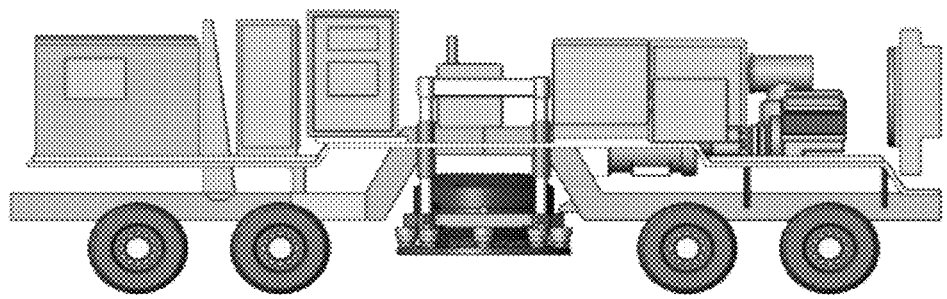
FIG. 13C illustrates a Mertz truck showing the side view.

Besides the generator, other major components that can be added to the truck. These are the inverter, the DC power supply, and a heat exchanger for the force coils. The space behind the cab can hold the inverter and the DC power supply. These are shown in the truck layout FIGS. 13A, 13B and 13C. The heat exchanger can be added on the passenger side of the truck, directly behind the existing heat exchanger. The heat exchanger fans can be driven in the same manner as the existing fans, with small hydraulic motors powered off the same source.

Baseplate Design and Analysis

A. Introduction

Structural analysis of the baseplate design was done in order to determine the maximum operating stress and whether or not the baseplate remains in contact with the ground under dynamic loading conditions. In addition to the dynamic analyses, a static analysis was done to determine stress due to off-axis loading of the baseplate that would be encountered, for example, if the baseplate was operated on a hill-side. The goal of the analysis was to determine the optimal baseplate configuration that would minimize weight while retaining stiffness and strength. The dynamic analyses were done using ABAQUS™, a commercially available finite element software package with full transient and nonlinear analysis capabilities. The static analysis was done using COSMOSWORKS™, a finite element analysis supplement to SOLIDWORKS™ solid modeling software.

B. Dynamic Response Models

Transient response of the baseplate to sinusoidal excitation of the reaction mass at three distinct frequencies was done using an explicit time integration scheme available within ABAQUS™. The explicit integrator was chosen over the implicit integrator because of superior performance in models that involve contact. Even though the explicit scheme requires very small time steps (on the order of $10^{-7}$ sec) due to its conditionally stable nature, run times for large models are generally shorter than for an implicit scheme since the stiffness matrix does not need to be decomposed and no intermediate iterations are needed for convergence in each time step. Furthermore, the small time step required ensures that the response is captured adequately. With implicit schemes, attempts to shorten run times by increasing the time step size could result in undesired loss of solution accuracy.

Figure 14A:
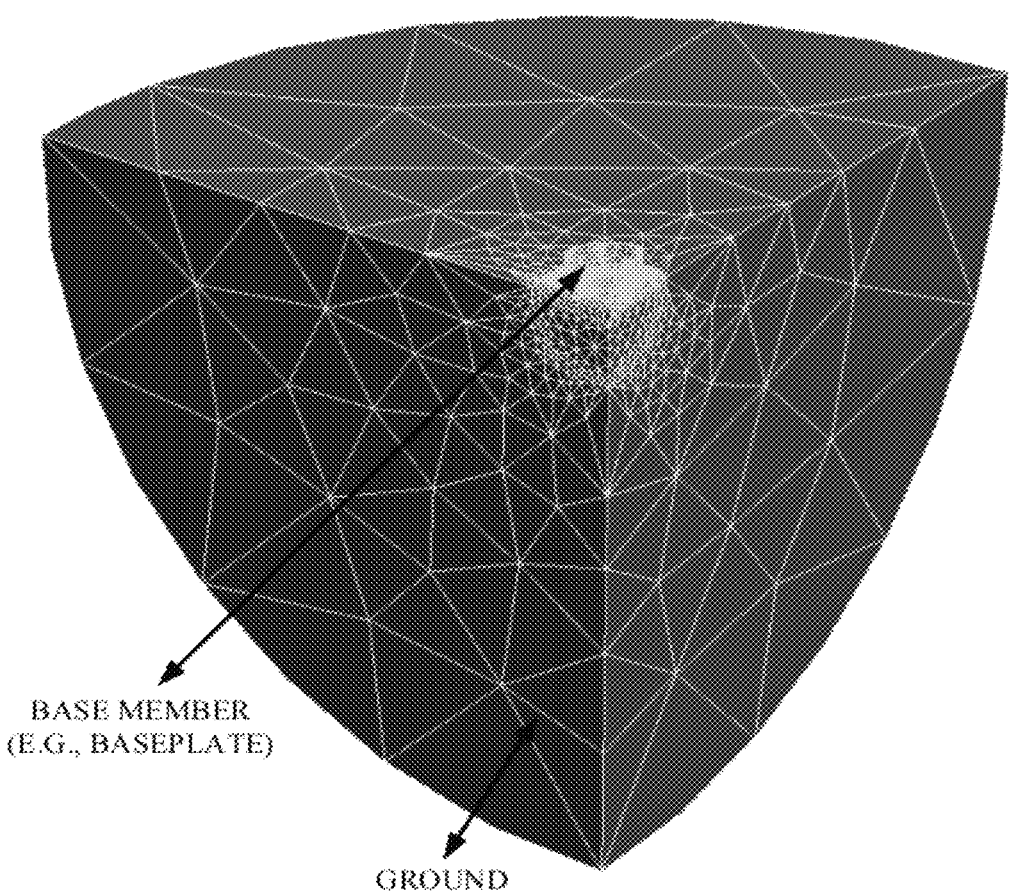
FIG. 14A illustrates a finite element model of ground and baseplate used in dynamic analyses.
Figure 14B:
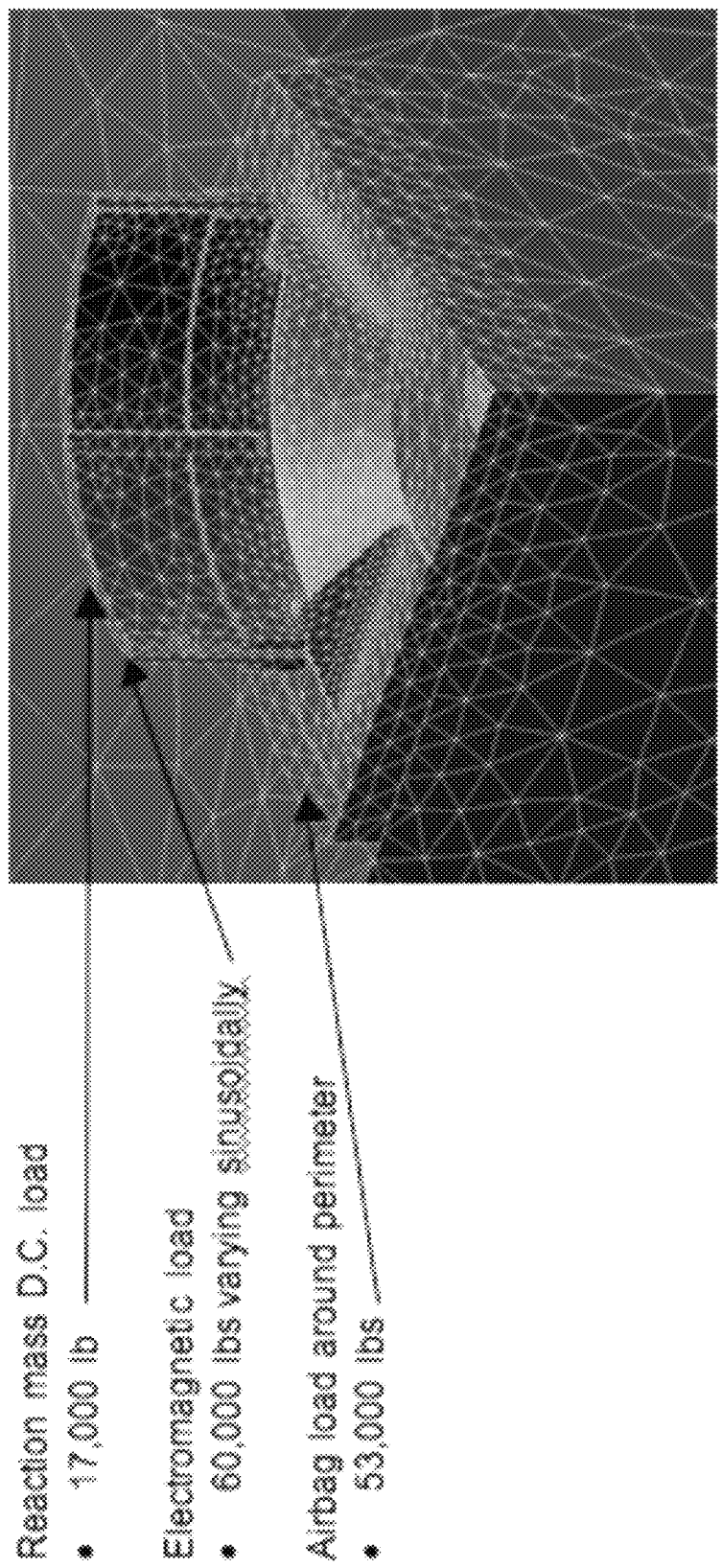
FIG. 14B is a detailed view of finite element model of ground and baseplate used in dynamic analyses, with load application areas shown.

FIGS. 14A and 14B show the finite element model used in the dynamic analyses. FIG. 14A shows the extent of the ground that was modeled along with the baseplate, and FIG. 14B shows the baseplate only. Symmetry of the baseplate and loading conditions allowed reduction of the problem to a quarter-symmetry model, thus allowing a higher mesh density for a given number of degrees of freedom. Due to the complex shape of the baseplate structure, tetrahedral elements were used to mesh the solids using the automatic mesh generator available in ABAQUS™. Second order interpolation functions were prescribed in order to maximize resolution of stress gradients within the structure. The mesh density chosen was a compromise between solution convergence and turn-around time, considering the limited time available for parameter studies in the initial design phase. Future work can address the issue of whether convergence was achieved at stress concentrations.

C. Dynamic Load Cases

Analyses were done to simulate operation of the vibrator at 10 Hz, 125 Hz and 200 Hz. These three frequencies were chosen to provide snapshots at the low, mid and high frequency ranges of operation. Since the analysis turn around time is significant in a transient analysis, it was not practical given the time constraints to model a swept sine input that would involve several seconds of load duration and several million time steps. For the 10 Hz case, the analysis was run out for 3 periods of load fluctuation. For the 125 Hz and 200 Hz cases, the analyses were run out for 5 periods.

In all three cases, a 53,000 lb distributed load was applied around the perimeter of the baseplate to simulate support of the vehicle (less the baseplate and reaction mass) on airbags. A 17,000 lb load was applied to the upper surface of the cylindrical portion of the baseplate to simulate the steady state (also referred to as the D.C.) load of the reaction mass acting through electromagnetic forces on the baseplate coils. Finally, a 60,000 lb alternating load was applied at the same surface to simulate the reaction mass being driven electromagnetically. The alternating load was varied sinusoidally at 10 Hz, 125 Hz and 200 Hz in three separate analyses.

D. Ground Model

The ground plays a part in the dynamic response of the baseplate, and it was included in the model. The ground was modeled as a hemisphere with a 240 in. radius. Of course, due to symmetry, one quarter of the hemisphere was actually modeled. An initial analysis was done with a soil modulus of 200,000 psi and a density of 0.052 in/lb$^3$. Per recommendation by Ion, the soil modulus and density were adjusted to produce a 30 Hz frequency by lowering the modulus to 20,000 psi, and increasing the density until a model of the ground without baseplate resulted in a fundamental natural frequency of 30 Hz. These values of soil modulus and density were used in subsequent analyses.

E. Boundary Conditions and Contact Surface Definition

Symmetry boundary conditions were applied at model faces corresponding to the cutting planes for the quarter-symmetry model. In addition, the outer spherical surface of the ground model was fixed in all three directions. A contact surface was defined between the ground and the baseplate that allowed separation of the baseplate away from the ground but no penetration.

F. Static Analysis Model

Figure 14C:
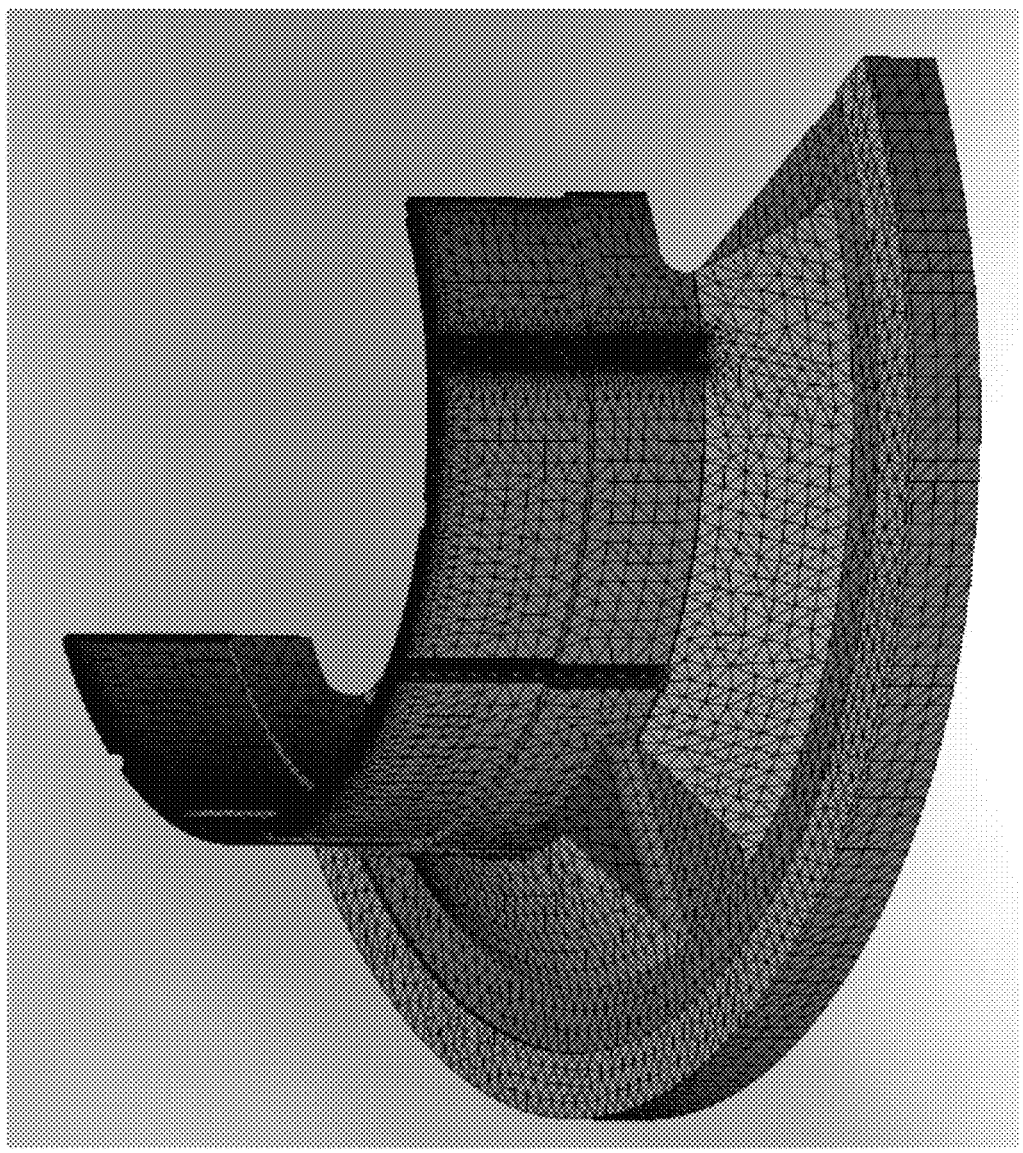
FIG. 14C illustrates a finite element mesh of baseplate used in static analysis.
Figure 14D:
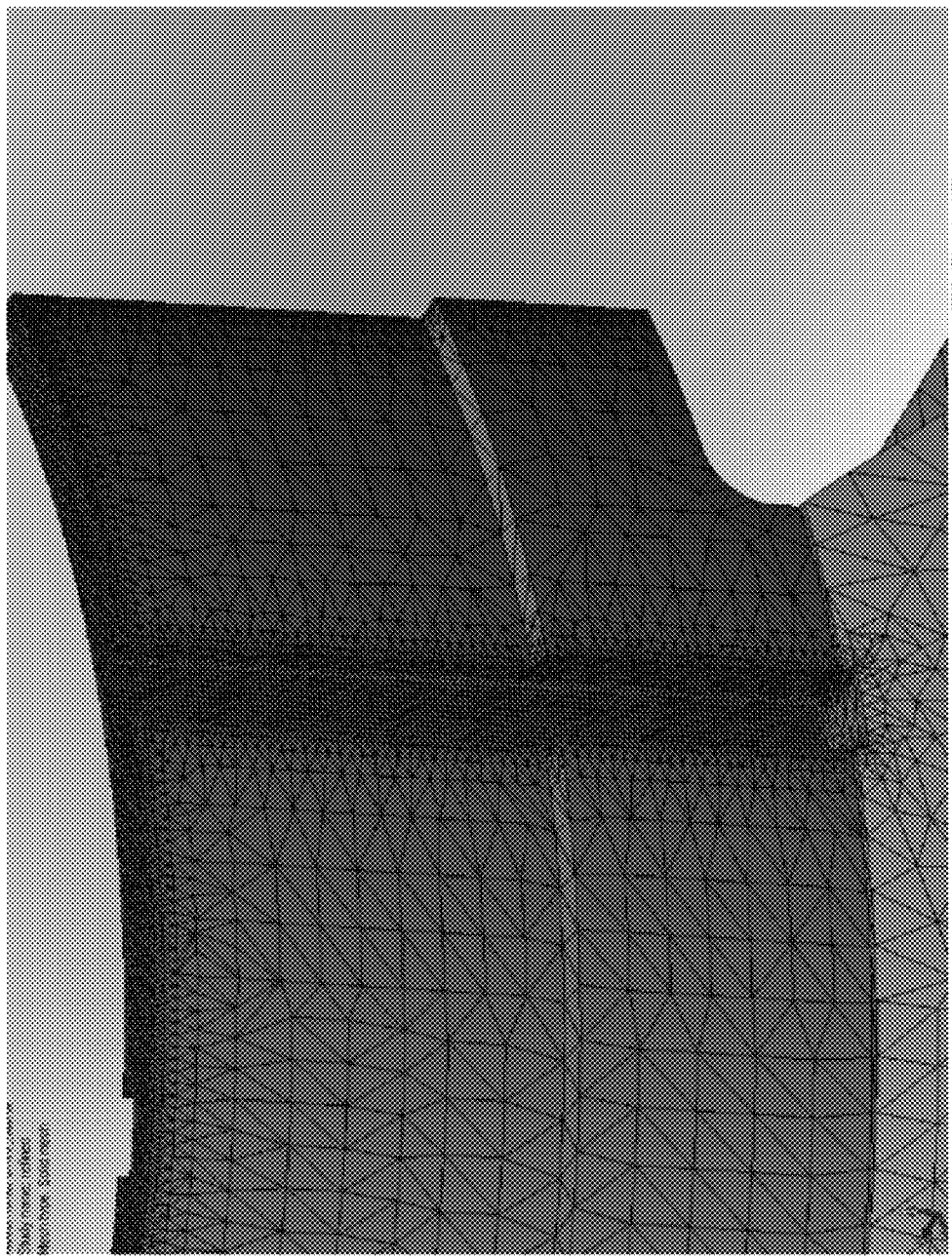
FIG. 14D illustrates a close up of finite element mesh of baseplate used in static analysis.

FIGS. 14C and 14D show the finite element model used for the static analysis. In this case, the lateral loading condition allows a half-symmetry model but not a quarter-symmetry model. Since the analysis run time is orders of magnitude smaller than that needed for the dynamic analyses, the mesh density was increased to provide a reasonably fine mesh at stress concentrations. Initial runs indicated the highest stress was in the region of a vertical slot in the upper cylindrical portion of the baseplate, and the mesh was refined in that region accordingly, as seen in FIG. 14A.

G. Static Load Cases

For the static analysis, the 60,000 lb alternating load was applied as a static load acting along the axis of the vibrator. The 53,000 lb vehicle weight load was applied around the perimeter of the baseplate, and the 17,000 lb reaction mass D.C. load was applied at the upper surface of the cylindrical portion of the baseplate. The 17,000 lb reaction mass load was decomposed into a vertical and a lateral load to model a 15 degree tilt of the baseplate on the ground. Thus the 17,000 lb reaction mass load was modeled as a 16,420 lb vertical load and a 4400 lb lateral load.

H. Boundary Conditions

The ground was not modeled in the static load case, thus the bottom of the baseplate was fixed in all three direction to prevent rigid body motion. Symmetry boundary conditions were applied at the half-symmetry cutting planes.

I. Results

Initial analysis indicated that the inner portion of the baseplate separates from the ground whenever the sinusoidal load periodically acts in an upward direction. The outer perimeter, however, remains in contact with the ground at all times due to application of the truck weight through the airbags located around the baseplate perimeter. In an attempt to eliminate the separation, the baseplate thickness was increased from 2 to 3 in. The thicker baseplate did reduce the amount of separation from the ground, but did not eliminate it entirely. The analyses presented here are for the thickened baseplate configuration.

Table 1, below, presents the maximum Von Mises stress and the maximum gap between the ground and baseplate encountered in the three cases. Stresses for all three cases are quite low compared to material strength. Deflection of the baseplate away from the ground is higher at low frequency, suggesting that the ground resonant frequency is coming into play.

Figure 14E:
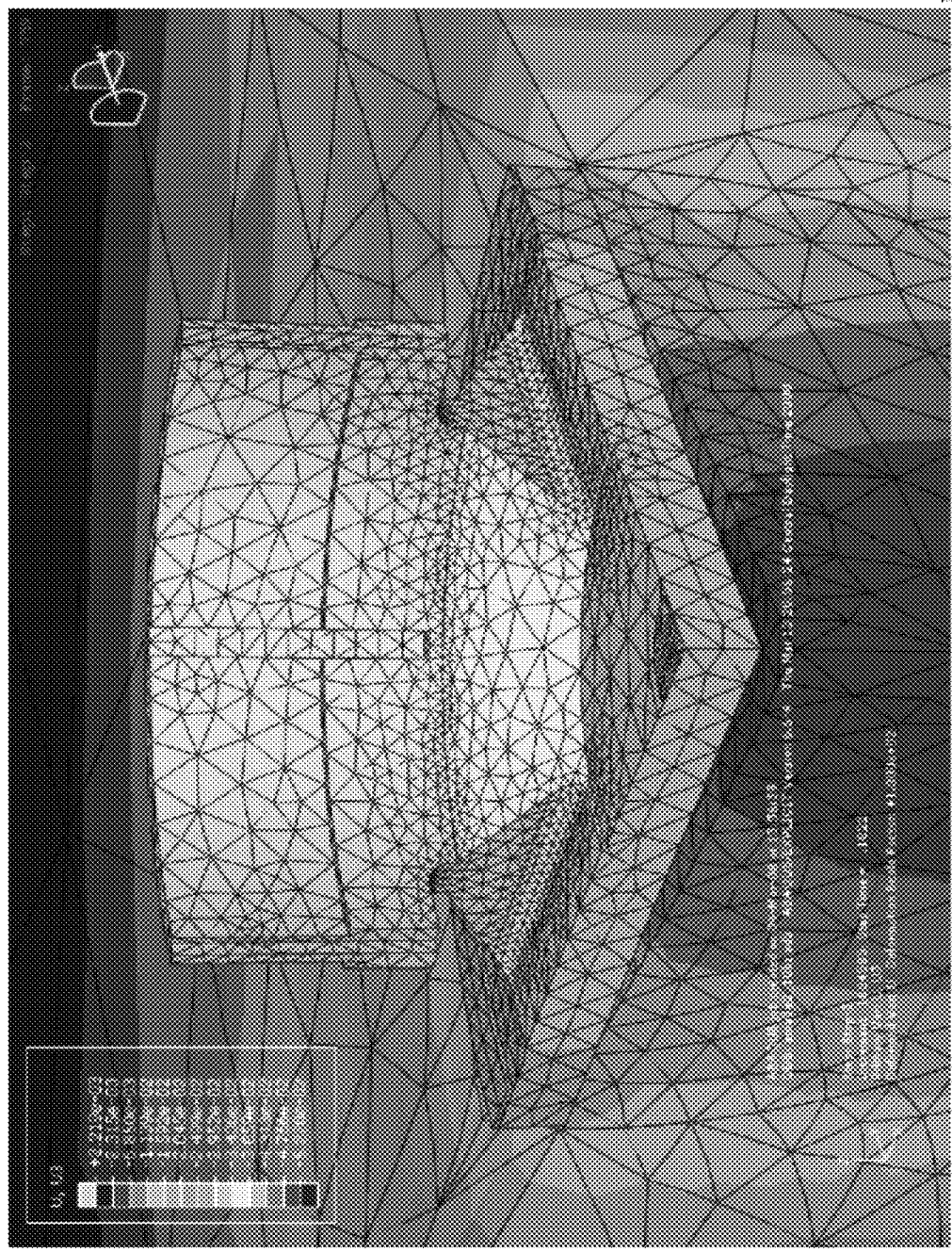
FIG. 14E illustrates a baseplate lifting up off the ground during upward application of the sinusoidal load.

FIG. 14E presents an exaggerated deflection plot of the baseplate lifting up from the ground during the course of the analysis. As seen in the plot, the outer perimeter of the baseplate stays in contact with the ground and only the central portion lifts up off the ground.

Figure 14F:
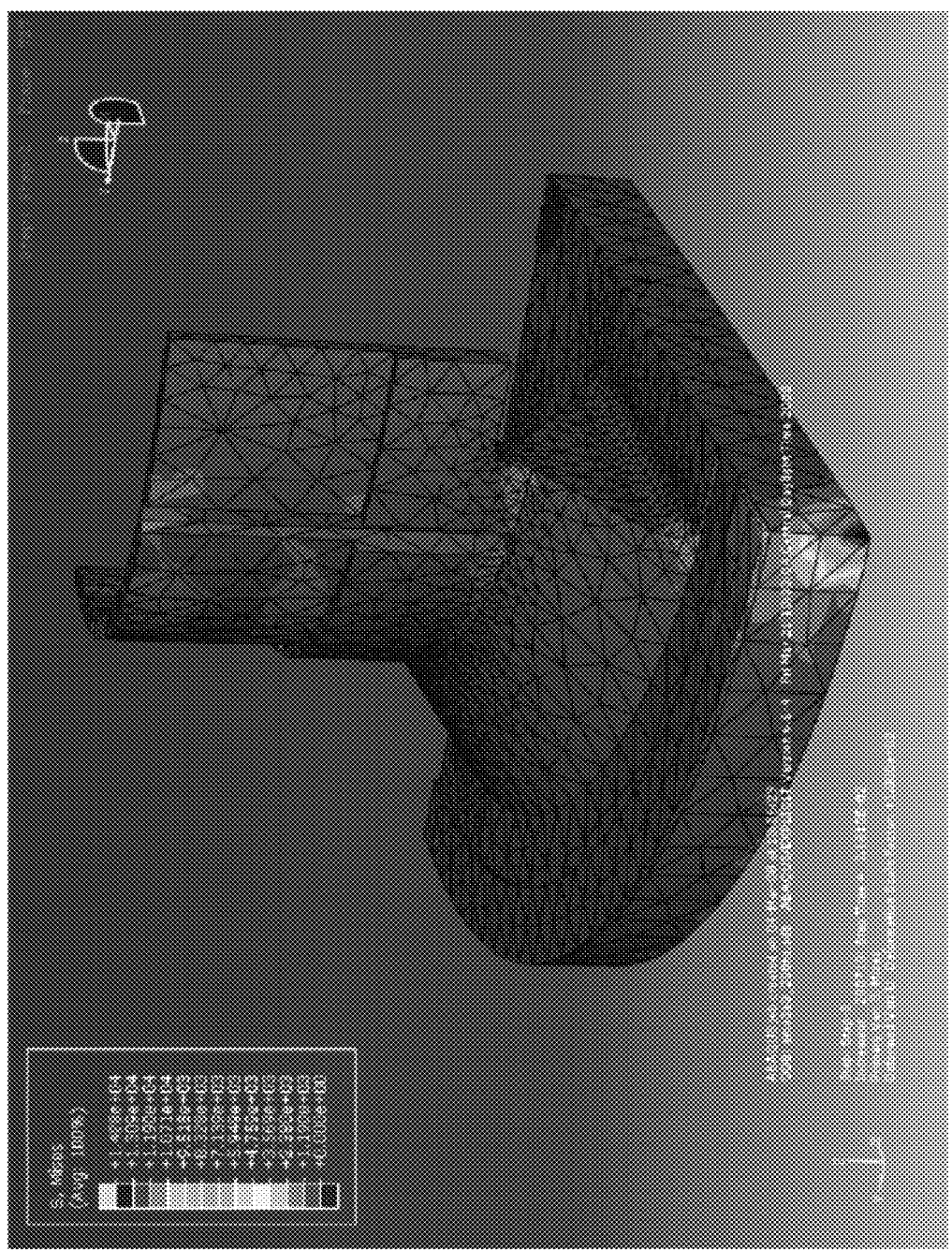
FIG. 14F illustrates the maximum Von Mises stress encountered in the dynamic analyses—the stress is 14.3 ksi.
Figure 14G:
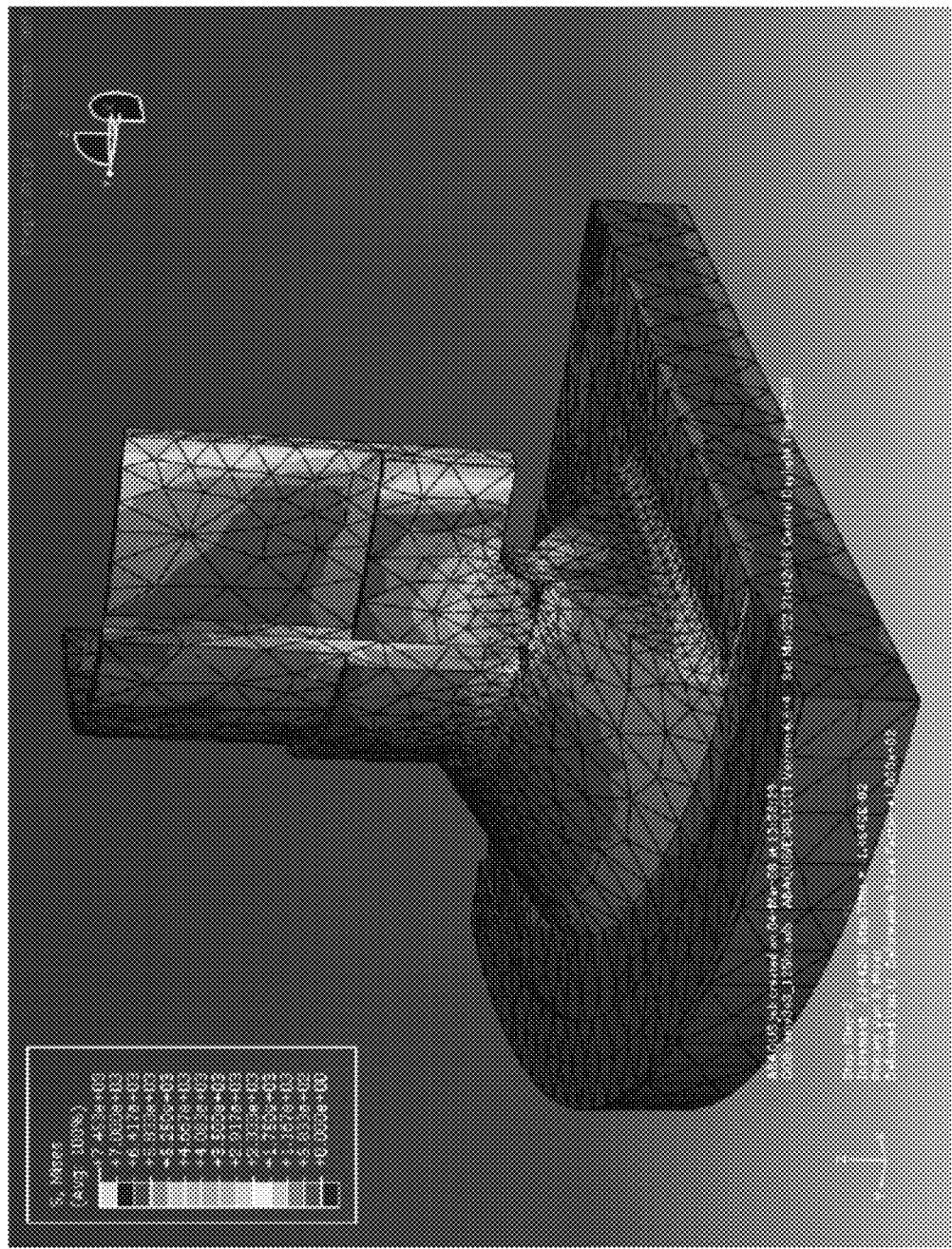
FIG. 14G illustrates the maximum Von Mises stress encountered in the upper cylindrical portion of the baseplate—the stress is 7.5 ksi.

FIGS. 14F and 14G present Von Mises stresses in the baseplate. FIG. 14F shows the overall maximum Von Mises stress encountered anywhere in the baseplate in the three loading cases, and FIG. 14G shows the maximum Von Mises stress encountered in the cylindrical portion of the baseplate. Both stresses are low compared to the material strength.

Figure 14H:
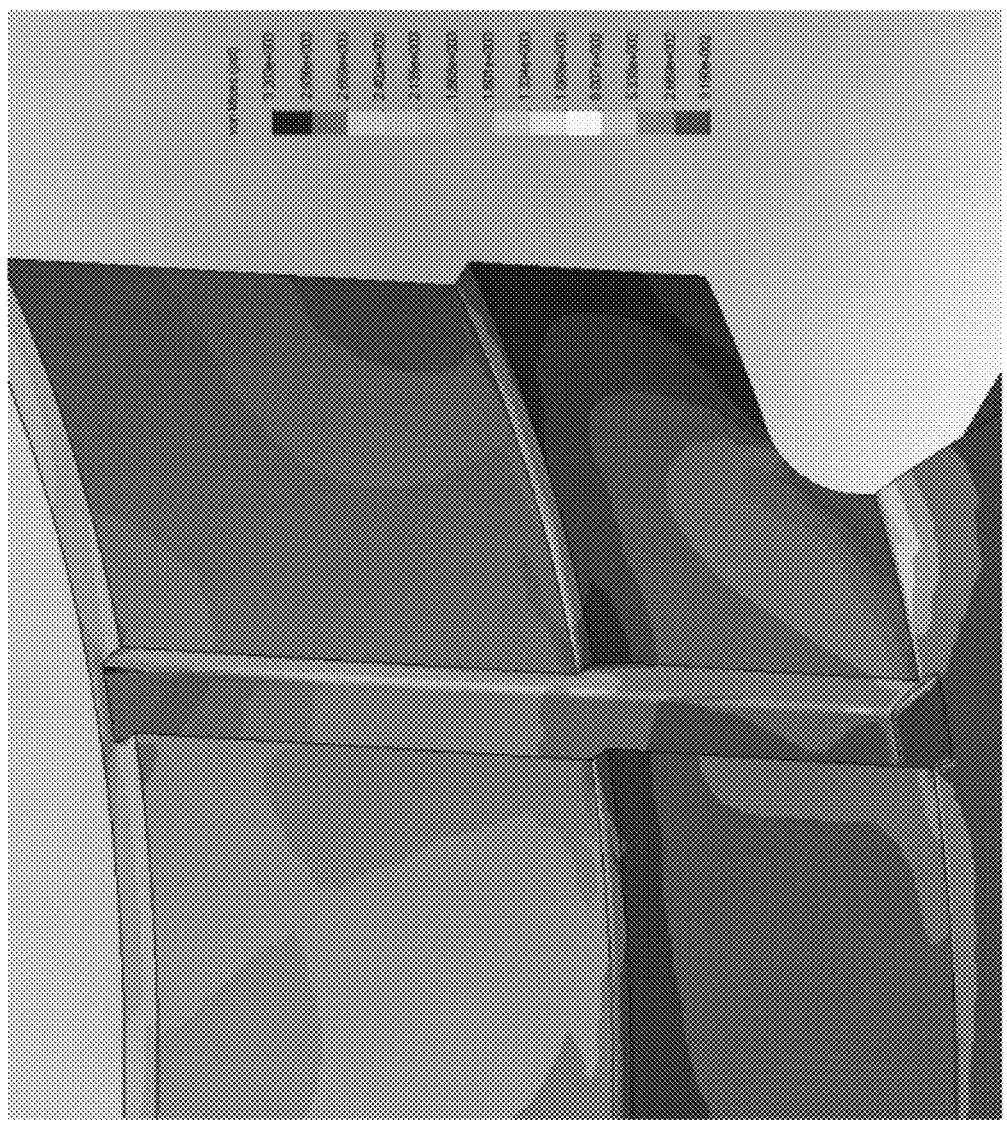
FIG. 14H illustrates maximum Von Mises stress from lateral load in static analysis.
Figure 141:
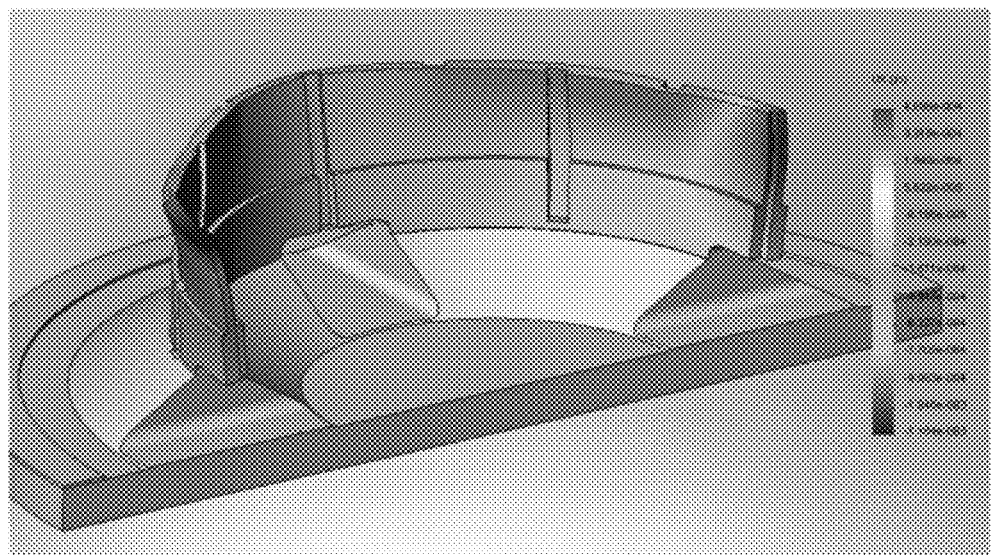

FIG. 14H presents the maximum Von Mises stress from the static analysis. The stress is 3.2 ksi, and is also quite low compared to the material strength. FIG. 14I shows the extent of lateral deflection induced by the lateral load. The deflection is less than 0.0012 in.

TABLE 1

Results from dynamic analyses

| Load case | Max. separation from ground | Max. Von Mises stress |
|---|---|---|
| 10 Hz | 0.0175 in. | 6.4 ksi |
| 125 Hz | 0.009 in. | 7.5 ksi |
| 200 Hz | 0.010 in. | 14.3 ksi |

J. Summary of Structural Analyses

Stress results from both the dynamic and static load cases are quite low, even when taking into account possibly higher stresses due to insufficient mesh density at stress concentrations.

All three dynamic loading cases resulted in separation of the baseplate away from the ground during the periodically upward portion of the load. The amount of deflection is small, but may increase for cases when the ground resonant frequency is excited (30 Hz). Further analysis with an excitation frequency of 30 Hz should be done to verify this. In no, loading case did the outer perimeter of the baseplate leave the ground, being held in place by the airbag load. This, too, should be verified for the 30 Hz case.

Figure 14J:
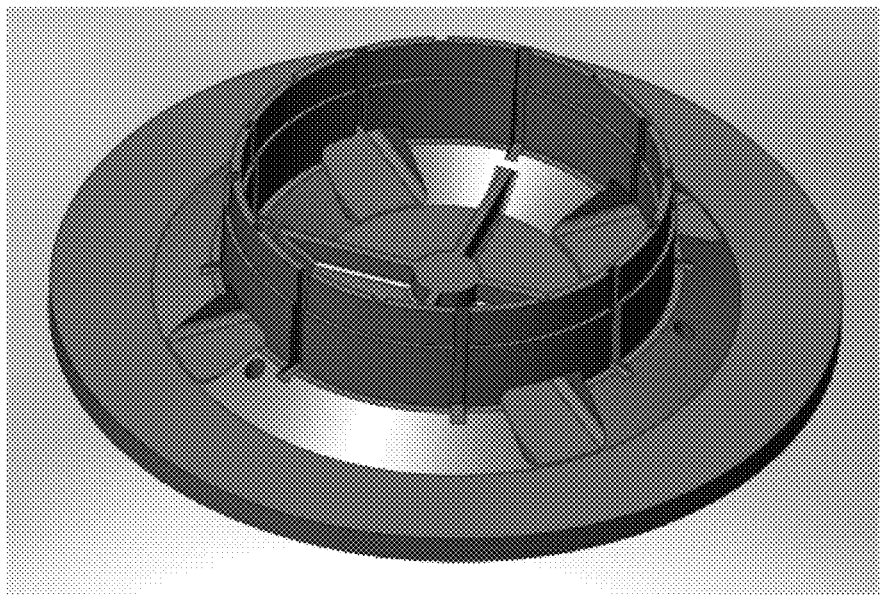
FIG. 14J illustrates a modified baseplate with stiffening ribs.

The separation from ground may be reduced or even eliminated by judicious design changes to stiffen the baseplate without penalizing weight, such as the ribbed configuration shown in FIG. 14J.

EM Vibrator Cooling and Finite-Element Thermal Analysis

Three EMV components, which are field coils, armature lift coils (also referred to as force coils), and compensating plates (e.g., compensating metal sleeves, such as metal sleeve 1764 or metal sleeve 1768; see, for example, FIGS. 17 and 18F), require active cooling to keep them from overheating under steady-state operating conditions. The heat losses generated in these three components under one embodiment of an EMV design are listed as follows:

Loss at field coil (12 pancake coils, 12 turns in each pancake coil)
  DC loss (calculated at 93° C.)=259 kW
Loss at armature lift coil (or force coil)
  DC loss in 8 lift-circuit electrical conductors=16 kW
  AC loss in other 56 lift-circuit electrical conductors=211 kW
  total loss=16 kW+211 kW=227 kW
Loss at compensating plate
  AC loss (for 2 compensating plates)=95 kW
Total heat loss=259 kW+227 kW+95 kW=581 kW (779 hp)

The field coil and armature lift coil (or force coil) insulations are class-H insulation material, which can be continuously operated at 180° C. However, the potting resin used to hold the coil conductors and insulations together has a lower thermal rating. The vibrator cooling design need to assure that the maximum insulation temperature under steady conductor coil heat loads does not exceed the thermal degradation temperature of the potting resin. In certain scenarios, the coil insulation and potting resin features can be described as follows:

Field coil and armature lift coil insulations
  conductor wrap: Austral VonRoll Isola 150 FCR Kapton™ (0.0045 in.)
  armor coil wrap: medium weave glass tape (0.010 in.)
  class-H insulation (180° C.)
Potting resin
  PDG Y881K resin
  heat deflection temperature=120° C. (yield strength)
  glass transition temperature=131° C. (failure strength)

As constrained by the heat deflection temperature of the potting resin, the cooling design goal of this machine is to keep the maximum copper coil temperature under 120° C. under steady operations.

Figure 15A:
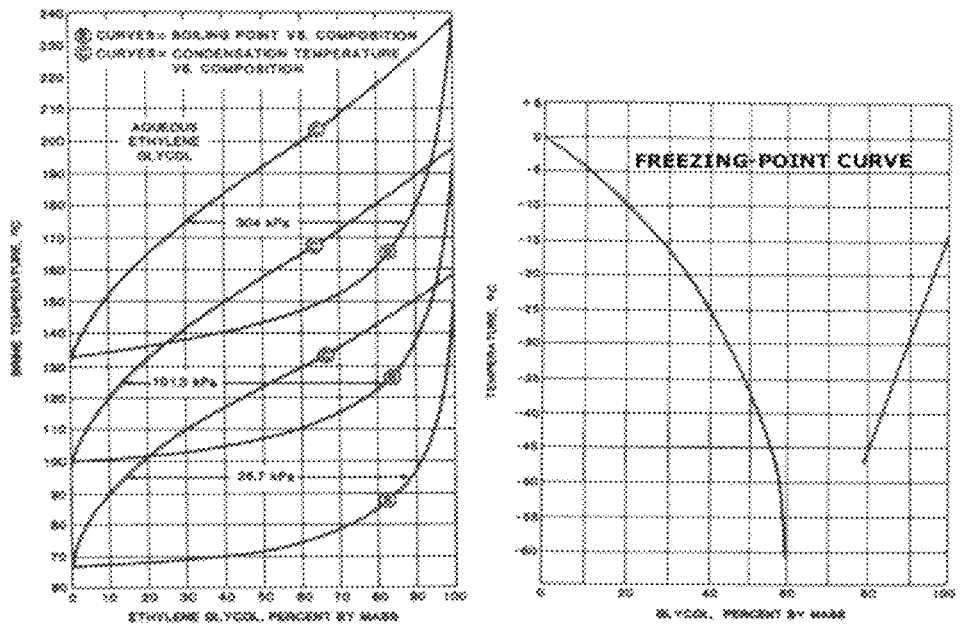
FIG. 15A illustrates boiling and freezing temperatures of ethylene glycol aqueous solutions (ASHRAE handbook).

Since the ambient temperature varies from −35° C. to 60° C., ethylene glycol water (40% ethylene glycol and 60% water by weight) has been chosen as the coolant to lower the freezing temperature and increase the boiling temperature of the coolant. FIG. 15A shows the boiling and freezing temperatures of the ethylene glycol aqueous solutions. The coolant inlet temperature to the machine is assumed to be 65° C. Other cooling schemes and heat loads are contemplated within the scope of embodiments of the invention.

Figure 15B:
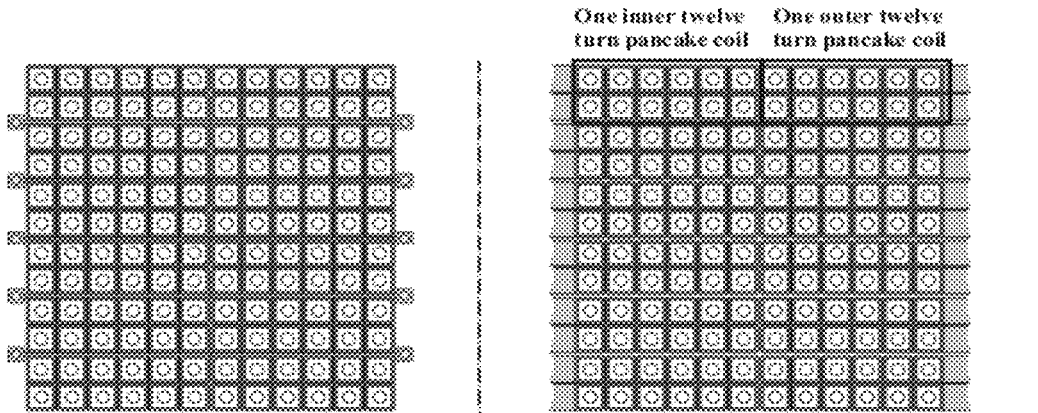
FIG. 15B illustrates a field coil cooling design.

The field coils are designed to be cooled by the coolant circulated within both copper conductor internal cooling passages and cooling passages attached to the ends of external cooling fins. Each field coil conductor is made of 0.25 in. square copper tubing with a 0.125-in hole in the middle to carry coolant. The thickness of the copper cooling fin is 0.1 in. The cooling tubes attached to the ends of each fin have the same size as that of the field coil conductors. A notional picture showing the field coil cooling design is shown in FIG. 15B.

Figure 15C:
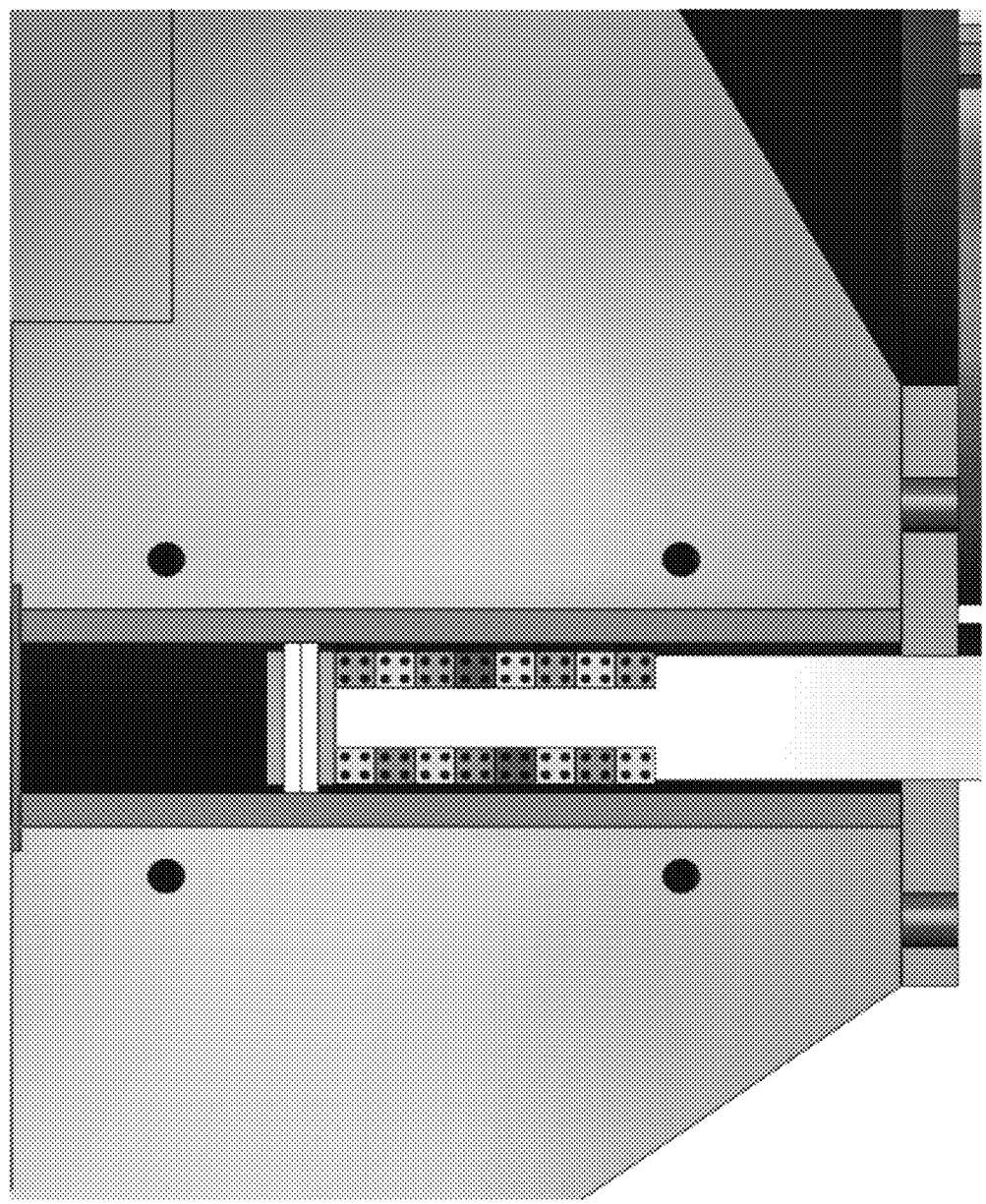
FIG. 15C illustrates an armature lift coil and compensating plate cooling design.

The armature force coils are cooled by the coolant circulated within the internal cooling passages in the copper conductors which are the same as those of the field coil copper tubing in terms of the dimensions. The compensating plate heat loss removal is accomplished by circulating the ethylene glycol coolant in four circumferential cooling passages (0.5 in. diameter each) which are located in the steel surrounding the compensating plates. The armature lift coil and compensating plate cooling design is shown in FIG. 15C.

To perform cooling analysis for predicting required coolant flow rate and coolant pumping power and to predict cooling boundary conditions required for the finite-element thermal modeling of the field coils, lift coils, and compensating plates, the coolant flow rates and cooling passage lengths need to be accurately calculated for all three cooling components. The input parameters used for the cooling analysis are listed in the following and some of the calculated cooling parameters are included in Table 2.

Coolant flow rates
  in each pancake field coil cooling passage=1.35 gpm
  in each field coil cooling fin cooling passage=0.7 gpm
  in each armature lift coil cooling passage=1.2 gpm
  in each compensating plate cooling passage=6 gpm Numbers of coils or cooling passages
  pancake field coils=12
  field coil cooling fin cooling passages=10
  armature lift coils=16
  compensating plate cooling passages=4
Component coolant flow rates
  field coil internal cooling passages=16.2 gpm
  field coil fin cooling passages=7 gpm
  armature lift coil cooling passages=19.2 gpm
  compensating plate cooling passages=24 gpm
Total coolant flow rate
  =16.2 gpm+7 gpm+19.2 gpm+24 gpm=66.4 gpm
Total cooling passage length
  each field coil internal cooling passage=37.008 m
  each field coil cooling fin cooling passage=3.025 m
  each armature lift coil cooling passage=12.649 m
  each compensating plate cooling passage=3.025 m
Surface roughness=0.00006 in. (copper tubing), 0.0018 in. (steel cooling passage)
Coolant pump efficiency=80%

TABLE 2

Calculated cooling parameters

| Component Section | Field Coil Internal Passage Average | Field Coil Fin Passage Average | Armature Lift Coil Passage Average | Compensating Plate Passage Average | Field Coil Internal Passage Exit | Field Coil Fin Passage Exit | Armature Lift Coil Passage Exit | Compensating Plate Passage Exit |
|---|---|---|---|---|---|---|---|---|
| Coolant Temp (° C.) | 89.71 | 84.16 | 89.37 | 73.28 | 114.42 | 103.32 | 113.73 | 81.56 |
| Coolant Velocity (m/s) | 10.95 | 5.65 | 9.73 | 3.00 | 11.17 | 5.74 | 9.92 | 3.02 |
| Coolant Convection Coeff (W/m²/K) | 38026 | 21568 | 34517 | 9160 | 45464 | 24896 | 41192 | 9731 |
| Coolant Passage Length (m) | 37.01 | 3.03 | 12.65 | 3.03 | 37.01 | 3.03 | 12.65 | 3.03 |
| Coolant Pressure Drop (psi) | 2348.44 | 59.22 | 647.83 | 4.93 | 2239.29 | 56.70 | 618.44 | 4.91 |
| Coolant Pumping Power Required (hp) | 27.75 | 0.30 | 9.07 | 0.09 | 26.46 | 0.29 | 8.66 | 0.09 |

In Table 2, the energy balance calculations for field coil heat losses removed by coolant in internal cooling passages and coolant in external fin cooling passages were performed by assuming a 75%-25% heat removal split (75% heat loss removed by internal cooling and 25% heat loss removed by external cooling). This 75%-25% split was obtained from thermal-circuit analysis. Material thermal properties used in the finite-element thermal analysis are included in Table 3.

TABLE 3

Material thermal properties

| Material | Density (kg/m³) | Specific Heat (J/kg/K) | Thermal Conductivity (W/m/K) |
|---|---|---|---|
| Copper | 8954 | 383 | 386 |
| Insulation (after VPI) | 1895 | 1129 | 0.19 |
| Potting Resin | 1300 | 1883 | 0.2 |
| AISI 1005 Steel | 7872 | 481 | 54 |

Figure 15D:
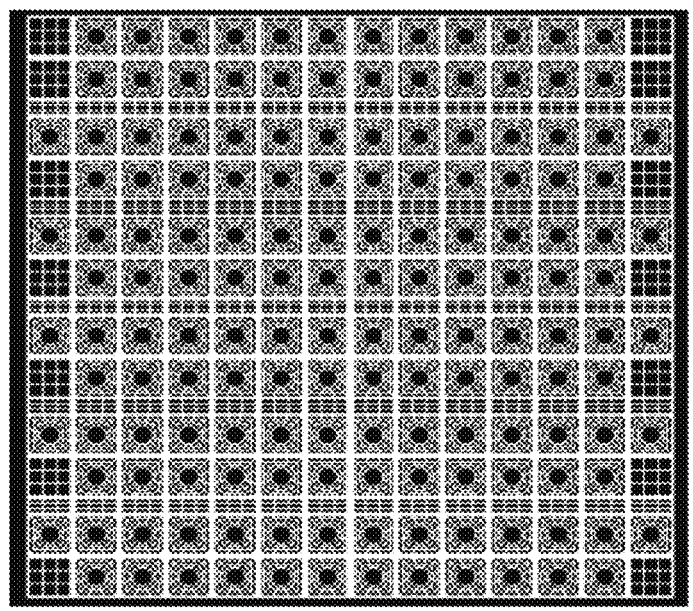
FIG. 15D illustrates a finite-element thermal model mesh for field coils.
Figure 15E:
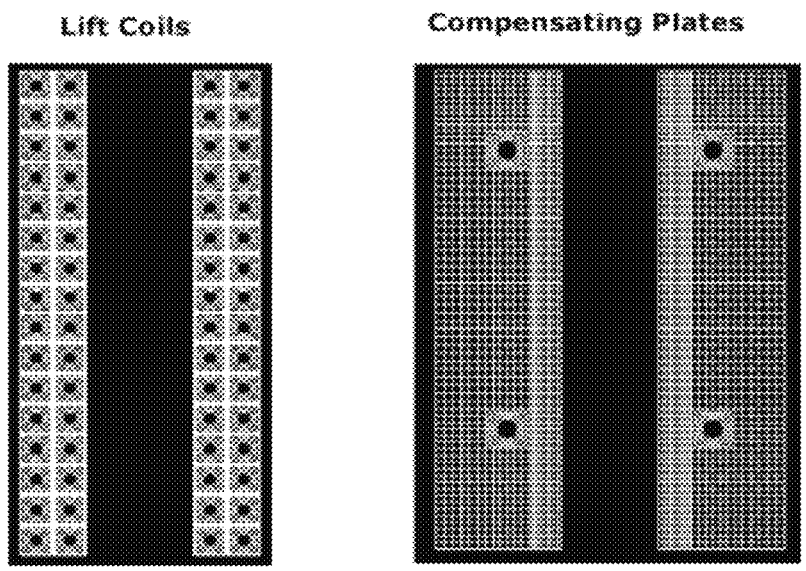
FIG. 15E illustrates a finite-element thermal model meshing for lift coils and compensating plates.
Figure 15F:
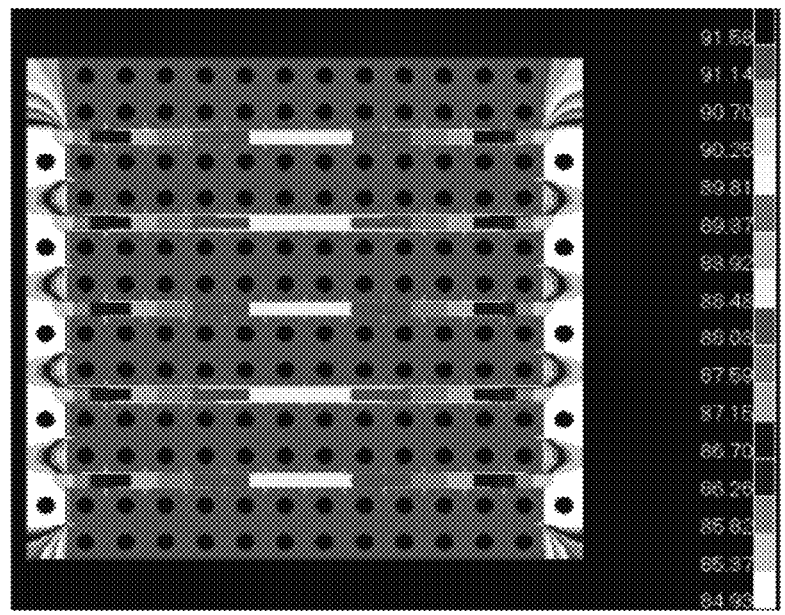
FIG. 15F illustrates a field coil steady-state temperature distribution (using average coolant temperature).
Figure 15G:
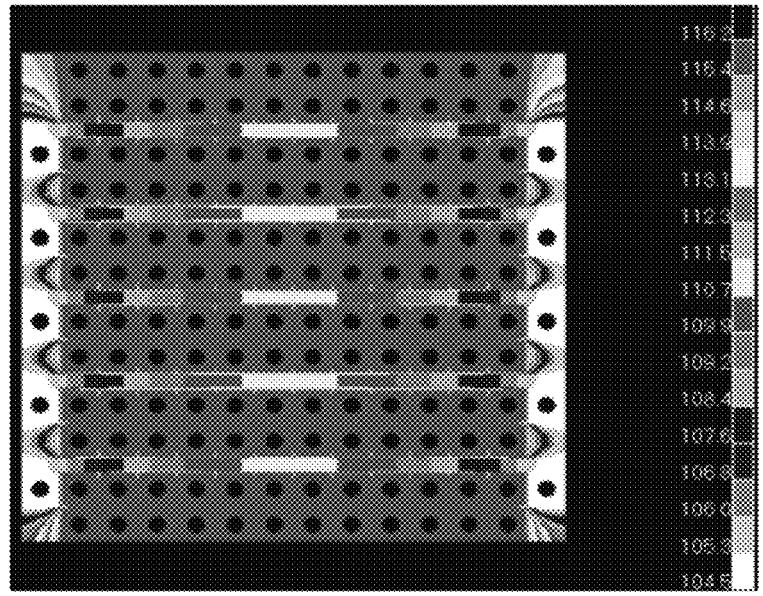
FIG. 15G illustrates a field coil steady-state temperature distribution (using exit coolant temperature).
Figure 15H:
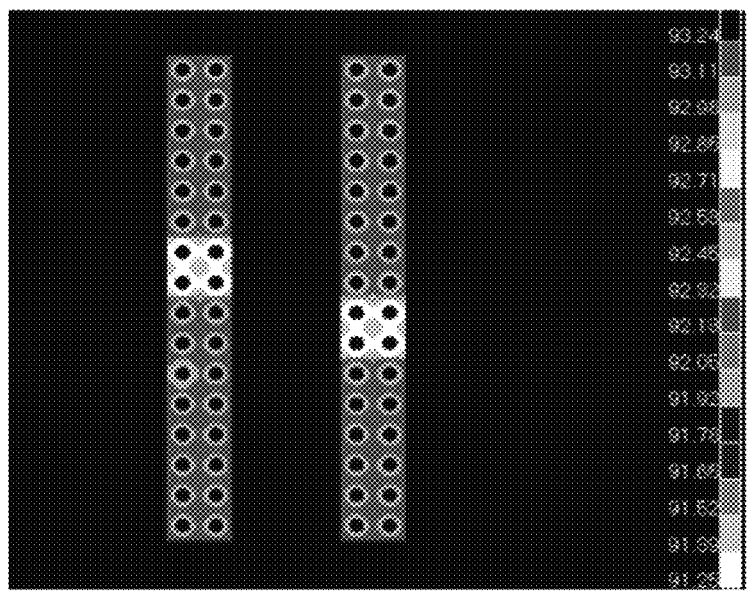
FIG. 15H illustrates a lift coil steady-state temperature distribution (using average coolant temperature).
Figure 15I:
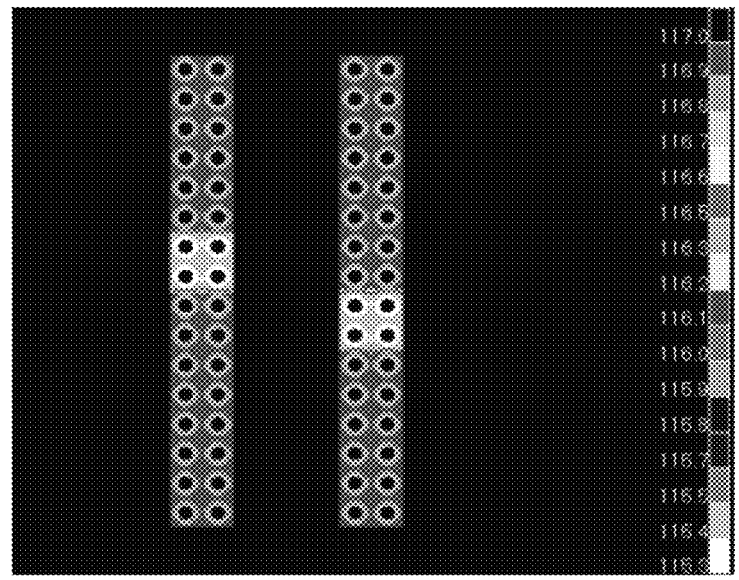
FIG. 15I illustrates a lift coil steady-state temperature distribution (using exit coolant temperature).
Figure 15J:
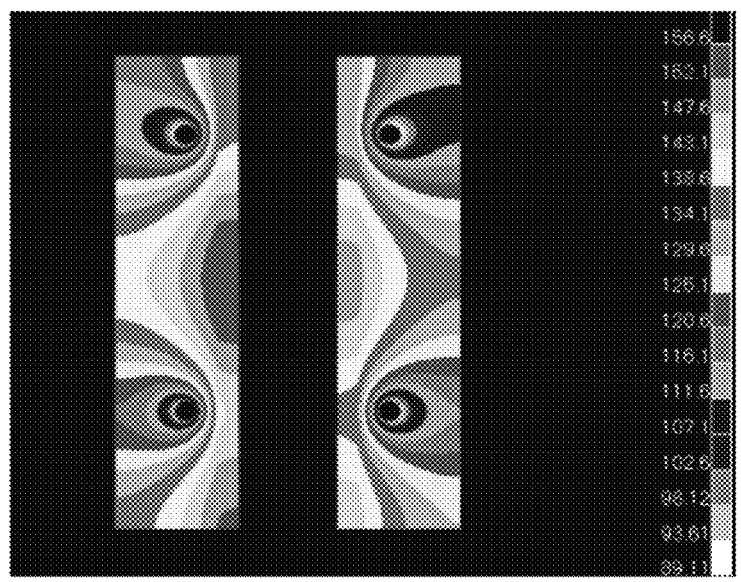
FIG. 15J illustrates a compensating plate steady-state temperature distribution (using average coolant temperature).
Figure 15K:
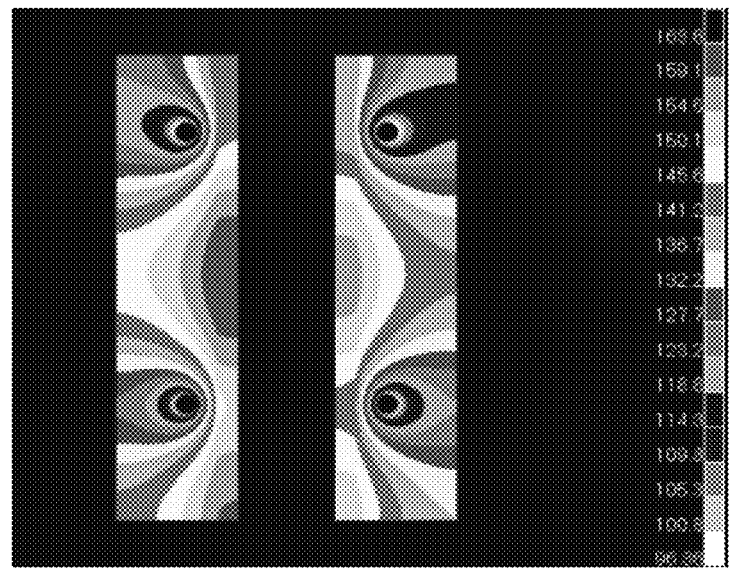
FIG. 15K illustrates a compensating plate steady-state temperature distribution (using exit coolant temperature).

Finite-element meshes for two-dimensional axis-symmetric thermal models of field coils, lift coils, and compensating plates are shown in FIGS. 15D and 15E. Two thermal analyses have been performed for each cooling component; one analysis used the cooling boundary conditions calculated at the average coolant temperature and the other analysis used the cooling boundary conditions calculated at the exit coolant temperature, which is the worst case. These cooling boundary conditions, coolant temperatures and coolant convection coefficients, are shown in Table 2. The predicted steady-state temperature distributions in the field coils, lift coils, and compensating plates are shown in FIGS. 15F through 15K.

Testing

The test plan for the vibrator system can begin with component development tests early in the fabrication process. In a testing scenario, eight force coils can be bonded to a stainless steel tube with the resin system proposed for a prototype unit. It should be appreciated that the mock-up can be faithful to the final design of the prototype force coils. After the mock-up is cured, the mock-up can be instrumented in a press and the bond strength to the stainless tube evaluated. For instance, a pass criterion can be a bond strength at least a factor of about two over a desired (e.g., required) strength in operation. The next component tests can be a steady state thermal test of a water-cooled, insulated force coil and a water-cooled, insulated field pancake coil. The appropriate electrical load that represents full force operation of the EMVS can be applied to the coils. The coils can be heated until the temperature rise is less than 2° C. per hour. Such increase rate can be considered steady state and the operating temperature can be recorded. The pass criterion for this test is that the steady state temperature does not exceed the heat deflection temperature of the resin insulation system.

Figure 16A:
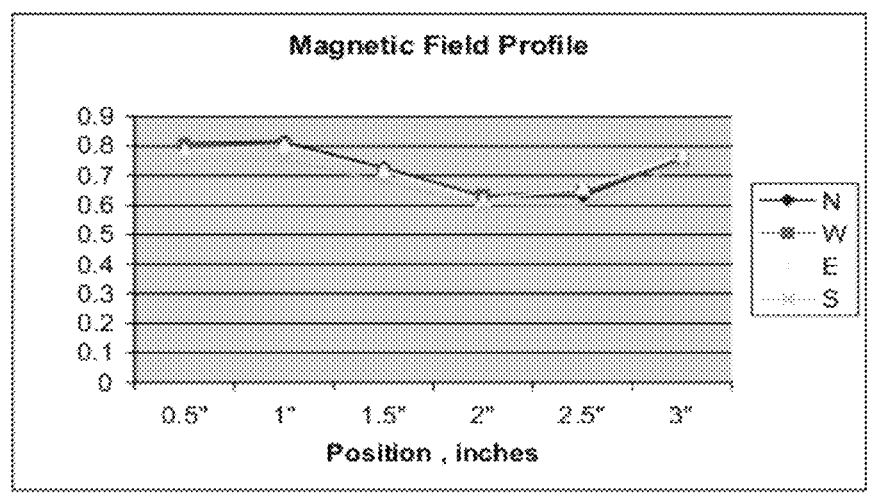
FIG. 16A illustrates a magnetic field map in air gap.

After the reaction mass is complete, the cooling coils can be plumbed to a hot water source (149 F) and a laboratory DC power supply can be used to apply operating current to the field coil. A Hall probe can be used in the air gap to the measure magnetic field strength at several angular positions, each time mapping the magnetic field as a function of axial position. An example of the data that can be collected is shown in FIG. 16A. A passing inspection can be one in which the data can be within about 5% of the values predicted by the FEA magnetic analysis. During these tests, the field coil temperature can be monitored to determine the steady state operating temperature of the as-built field coil. The steady state temperature can remain below the heat deflection temperature of the resin system.

When the baseplate returns from Vacuum Pressure Impregnation (VPI) of the field coil, it can be tested for correct frequency response. The baseplate can be hung from a cable and an instrumented with an accelerometer. An instrumented hammer and data acquisition system can be used to find the eigenmodes of the baseplate. These can be compared to FEA structural models of the baseplate and should match to within 10%.

After rap testing the baseplate can be assembled with the reaction mass and the impedance of the force coils can be measured at discrete frequencies as a function of axial position in the reaction mass. An example of the data that can be collected is shown in Table 4. This data can be compared to the values predicted by the FEA magnetics code and should match to within 10%.

TABLE 4

Force coil impedance as a function of frequency and position

| x | Test Freq 20 Hz | Test Freq 50 Hz | Test Freq 120 Hz |
|---|---|---|---|
| −0.75 | 178 | 163 | 141 |
| −0.25 | 73.5 | 73.7 | 67 |
| 0 | 54 | 53 | 53.1 |
| 0.25 | 55.8 | 55.1 | 53.3 |
| 0.5 | 71.2 | 69.2 | 67.2 |

With the vibrator assembled a series of DC tests can be performed. The water cooling and a DC power supply can be connected to the field coil. Additionally a second laboratory DC power supply can be connected to the water cooled force coils. The correct current can be established in the field coil and then the DC power supply connected to the force coil can be incremented until levitation is realized. The test levels can be compared to those predicted by the simulation. After the levitation test the baseplate can be locked to the reaction mass with a load cell. The force coil can be excited by itself and the reluctance force measured. This level can be compared the FEA magnetics analysis and recorded. The field coil can then be excited and current applied to the force coil in several positions established by shimming the load cell. The generated force can be recorded as a function of position.

Figure 16B:
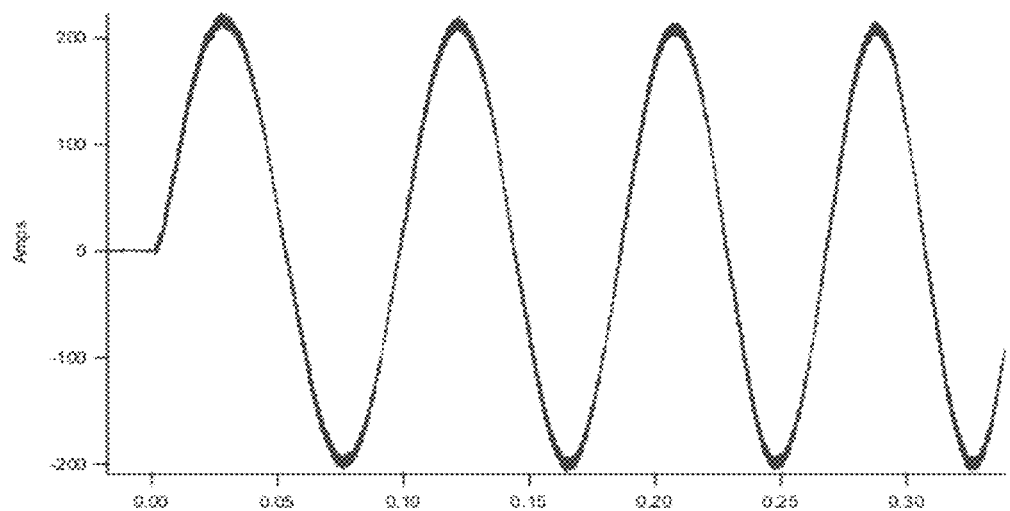
FIG. 16B illustrates a current check out of a PWM at 10 Hz.
Figure 16C:
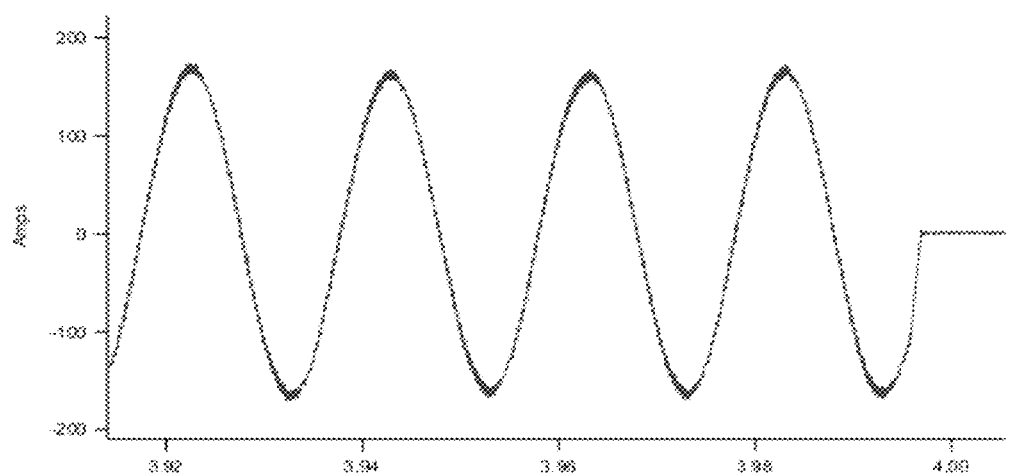
FIG. 16C illustrates a check out of a PWM converter at 50 Hz.

At this point in the schedule the Pulsed Width Modulated (PWM) Converter can be delivered and checkout tests into a dummy load can be conducted. Examples of PWM test waveforms are shown in FIGS. 16B and 16C.

Once the PWM is deemed operational it can be connected to the shaker and low level vibration tests conducted. This allows debugging of the instrumentation and the data acquisition system. In addition the control gains may be adjusted for optimal operation. Once the vibrator has been demonstrated at low force integration with the truck can commence.

Power Mitigation Technologies

As described in previous sections if the vibrator was required to produce full force at 225 Hz in steady state operation it would require 770 Hp of prime mover and the equivalent capability in heat rejection. In the prototype unit we intend to modify the Mertz engine to produce 600 Hp. The prototype can taper the force at high frequency to observe the 600 Hp rating of the diesel engine. For a production unit, it is desired to bring the required power down into the 600 Hp range while maintaining full force capability at 225 Hz.

There are several technologies that can reduce the power requirements for the electromagnetic seismic vibrator (EMSV) such as, for example, the use of permanent magnets in an embodiment of the EMSV.

Figure 17A:
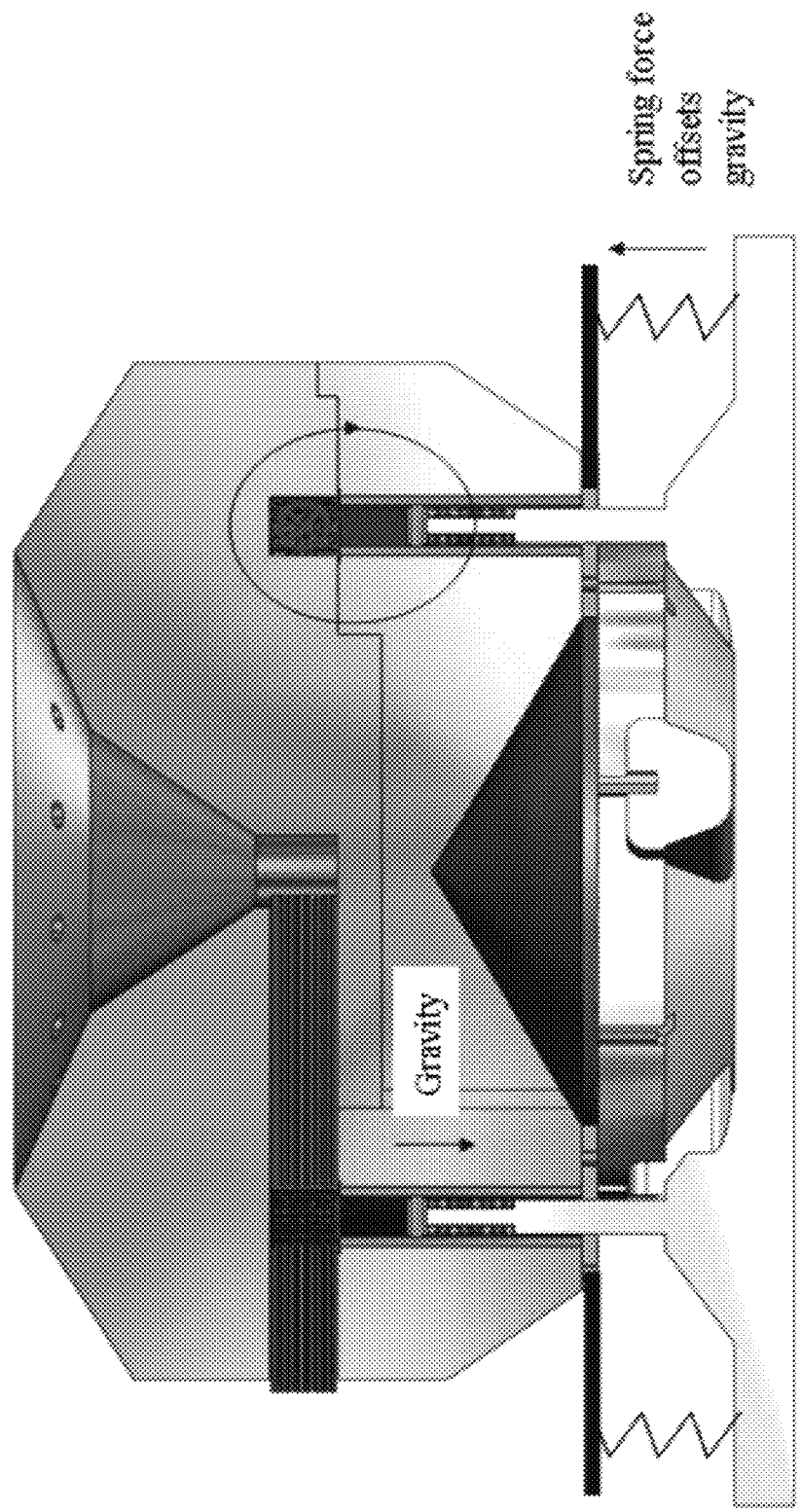
FIG. 17A illustrates springs added between baseplate and reaction mass.
Figure 17B:
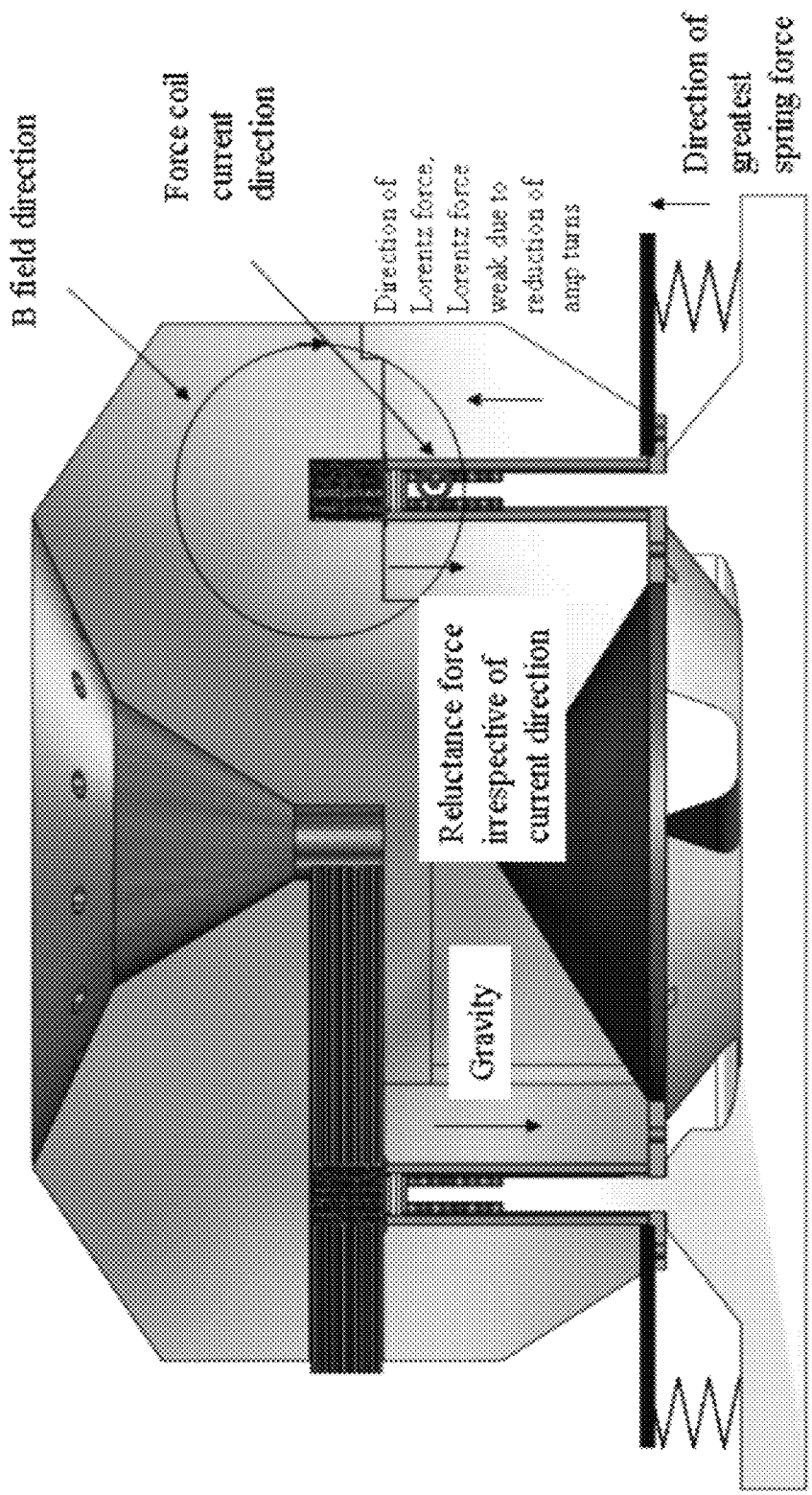
FIG. 17B illustrates a vibrator in full down position.
Figure 17C:
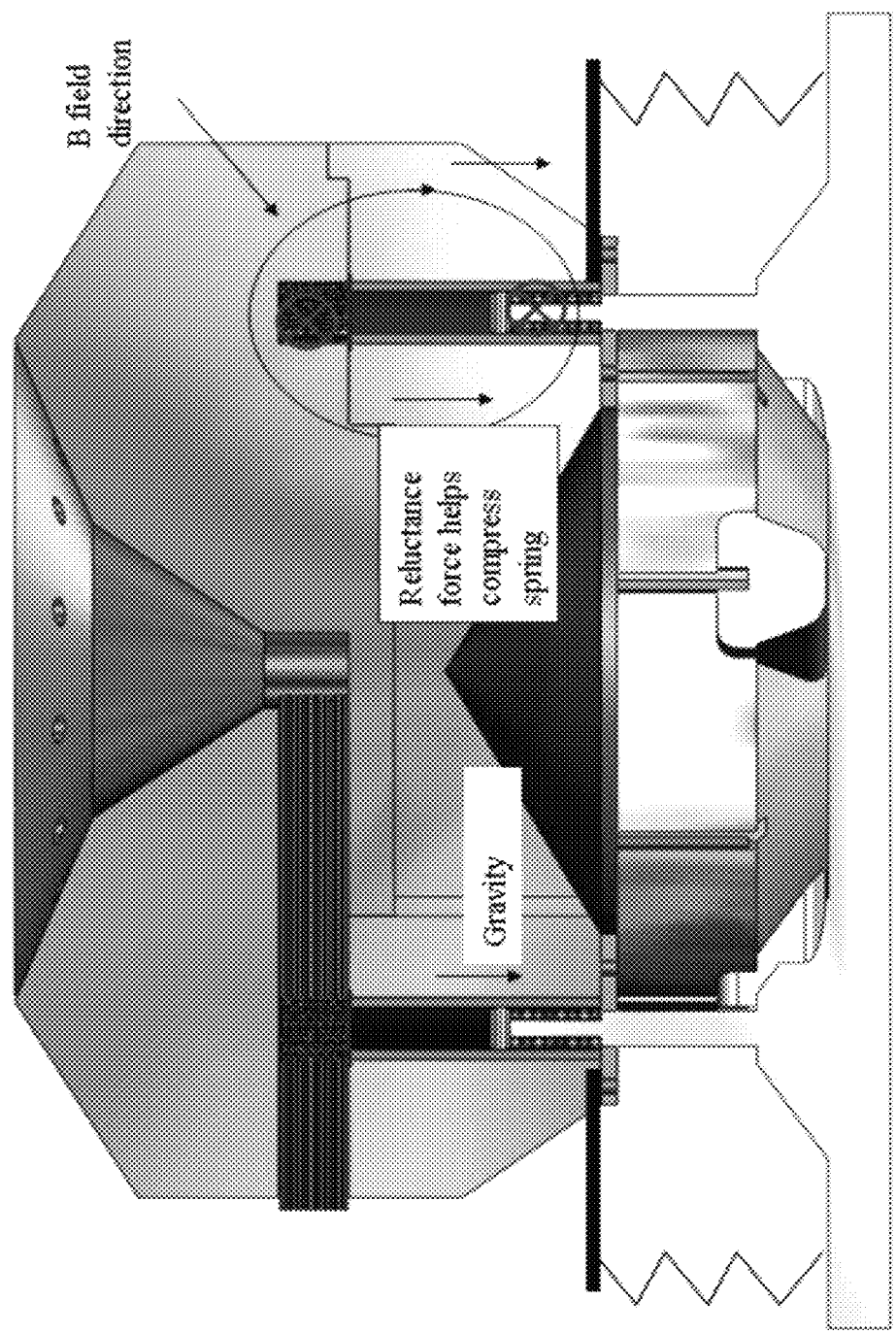
FIG. 17C illustrates a vibrator in full up position.

Another technology that can be used is spring assist. Springs can be positioned between the base member (e.g., baseplate) and the reaction member (e.g., reaction mass) to aid the Lorentz force (FIG. 17A). In such scenario, the first advantage that emerges is that springs can provide levitation force. Further advantage can become apparent by examining the EMSV at its extremes of axial movement. In FIG. 17B it is seen that the springs are fully compressed in the full down position. In such position (an extreme of oscillatory motion of EMSV) in the trajectory of the shaker can largely benefit from a reaction force exerted by a compressed spring. Gravity, the reluctance force, and weakening of the Lorentz force can collectively occur at such extreme of the displacement range. The springs can thus supply elastic energy to the EMSV in state at which the EMSV can largely benefit from such energy. The other extreme in the range of motion is when the EMSV is in the full up position (FIG. 17C). At this point of the stroke the spring has to be stretched and is receiving energy. It is at this point of the cycle that the baseplate current and the field current are in a direction to aid one another and establish more magnetic field strength in the air gap. The Lorentz force is at a maximum right when the spring is stretched. Such observations point to a conclusion that the insertion of springs may allow reduction of both the field and armature currents to a level that would provide substantial reductions in power.

Figure 17D:
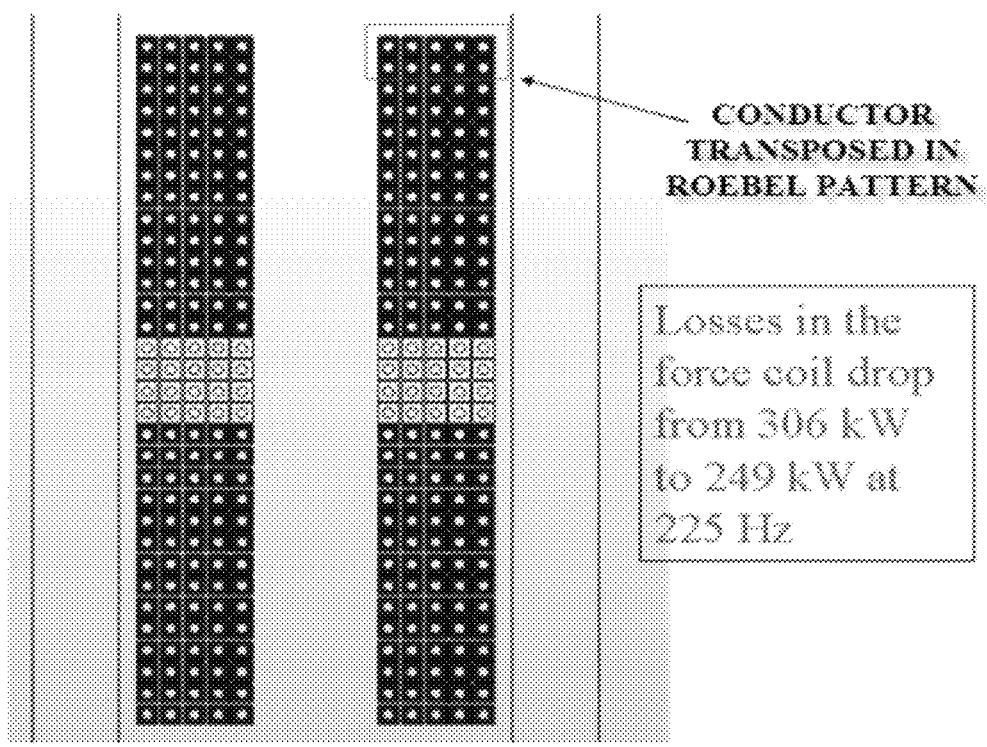
FIG. 17D illustrates conductors redesigned with 0.125 in. tubing.
Figure 17E:
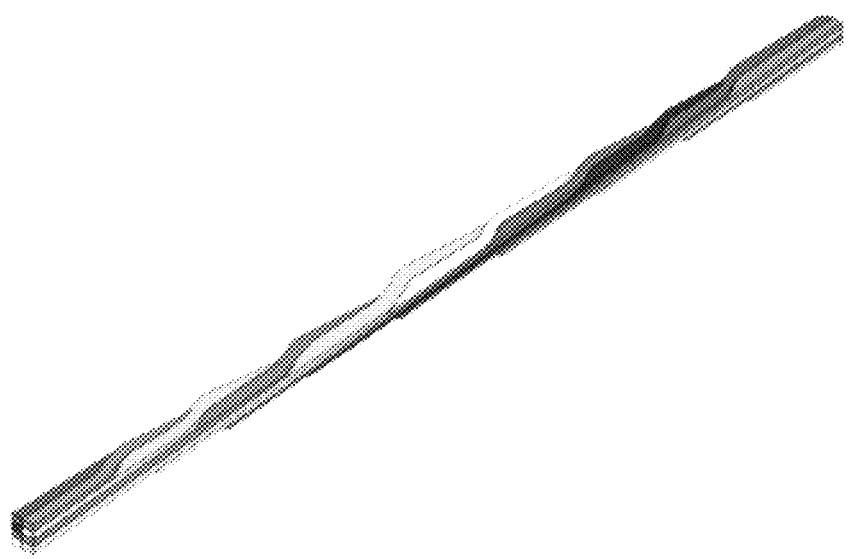
FIG. 17E illustrates an exemplary conductor in a Roebel arrangement, the conductor being employed in a force coil of an electromagnetic seismic vibrator described herein.

Another area for power consumption reduction can include conductor design. In one scenario, eddy current and proximity losses can be lowered by reducing the exposed area in the direction that the time varying magnetic field intercepts the conductor. FIG. 17D shows a design where the conductor size has been reduced from about 0.250 in. to about 0.125 in. In addition, the conductor has been transposed using a Roebel configuration, or Roebel pattern or Roebel array, to reduce circulating currents. It can be readily appreciated that this conductor structural change can reduce power losses in the force coil. For example, in one embodiment, for an alternating electric current with a frequency of about 225 Hz and for a copper conductor, power losses at the force coil can decrease from about 306 kW to about 249 kW. For another example, for an alternating electric current with a frequency of about 125 Hz and for a copper conductor, power losses at the force coil can decrease from about 182 kW to about 136 kW. FIG. 17E illustrates an exemplary conductor comprising a plurality of electric conductor rings (ECRs) in a Roebel pattern that can be employed in the force coil of an electromagnetic seismic vibrator described herein.

Figure 24A:
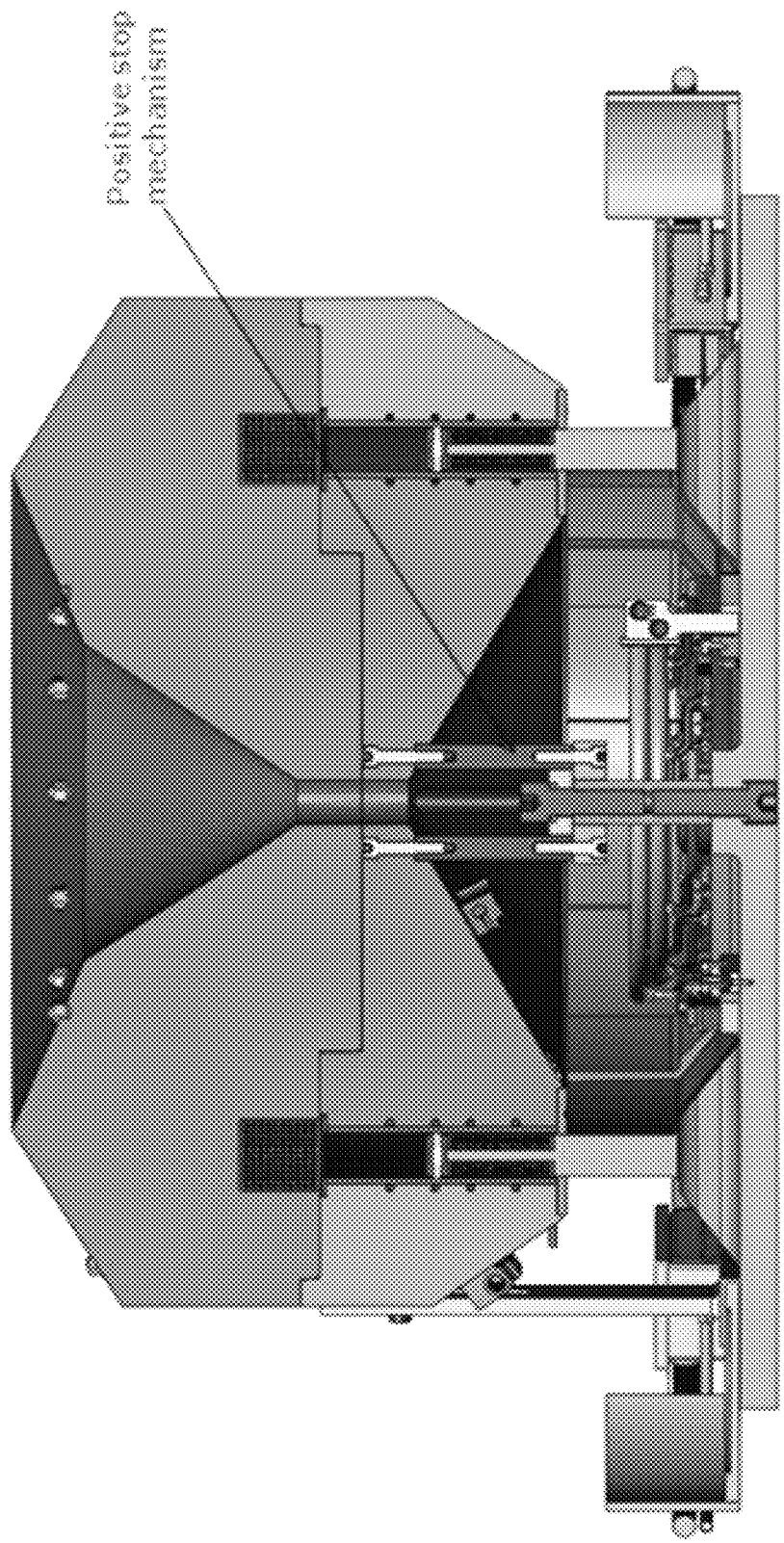
FIGS. 24A-24B illustrate and exemplary embodiment of a restriction assembly of the disclosure integrated into an EMVS in accordance with aspects of the disclosure.
Figure 24B:
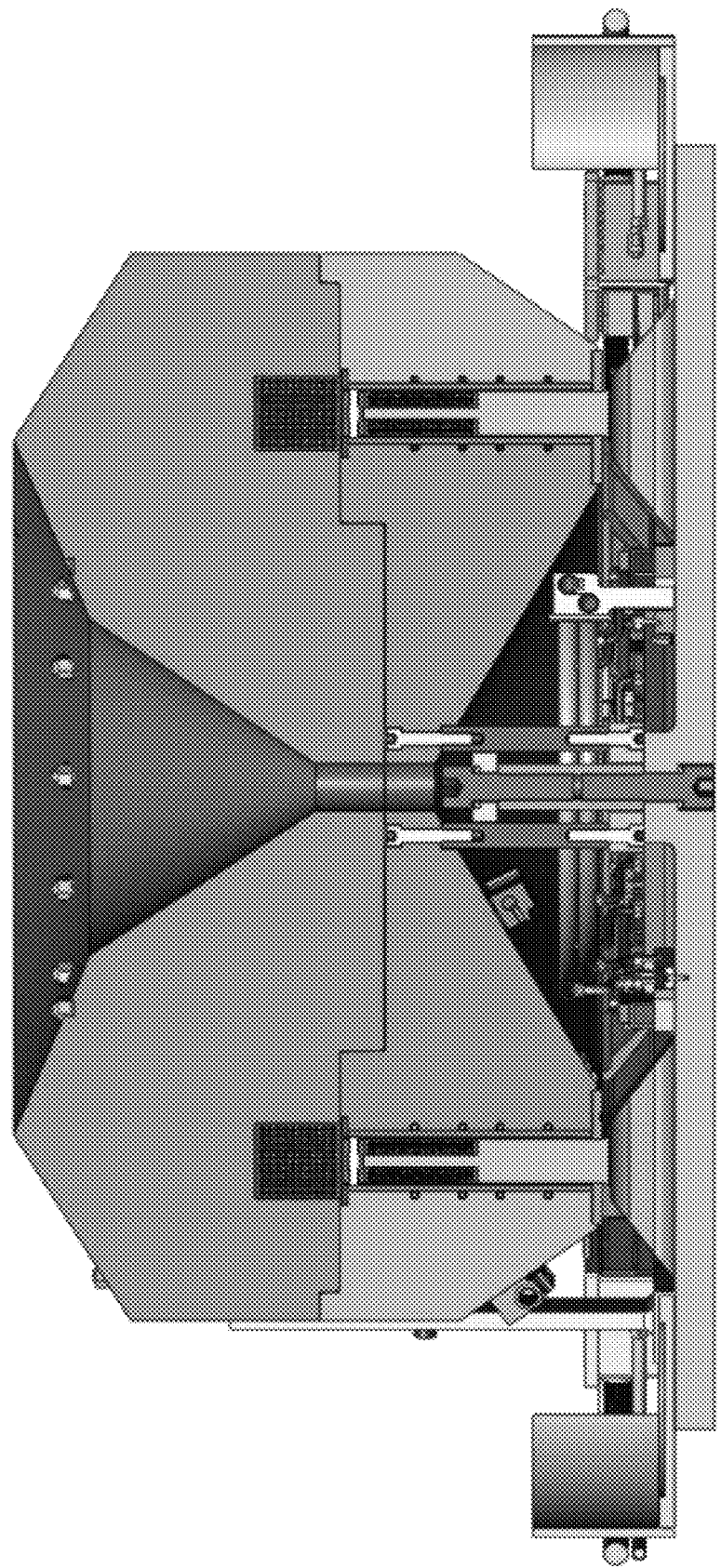

Transposing a conductor according to a Roebel pattern (or Roebel array), which can be referred to as Roebeling the conductor, can be accomplished by Roebeling separate portions of the conductor. For instance, the conductor can comprise several electrical conductor rings (ECRs) that can be divided in groups having a respective plurality of ECRs (e.g., eight ECRs, 10 ECRs), and each of such pluralities of ECRs can be transposed in a Roebel array. Roebeling can be implemented along a first axis that is substantially normal to a bottom surface of a base member of an EMSV (see, e.g., FIG. 18A or FIG. 24A), or along a second axis substantially parallel to the bottom surface of the base member. As an illustration, FIG. 17F presents a cross-sectional view of an EMSV having (i) a first array 1780 of ECRs transposed in a Roebel pattern and coupled to an inner annular surface of an upper end portion of an annular base member (e.g., base member 1830) of the EMSV, and (ii) a second array 1790 of ECRs coupled to an outer annular surface of the upper end portion of the annular base member. Also shown in FIG. 17F is a plurality 1770 of ECRs that form a force coil. In one aspect, as described herein, the plurality 1770 of ECRs is in communication with a source of electric current and is coupled to a portion of a reaction member 1760 (e.g., a reaction mass) of the EMSV. The plurality 1770 of ECRs is configured to transport a selectable first electric current effective to create a magnetic field of a desired strength.

Figure 19:
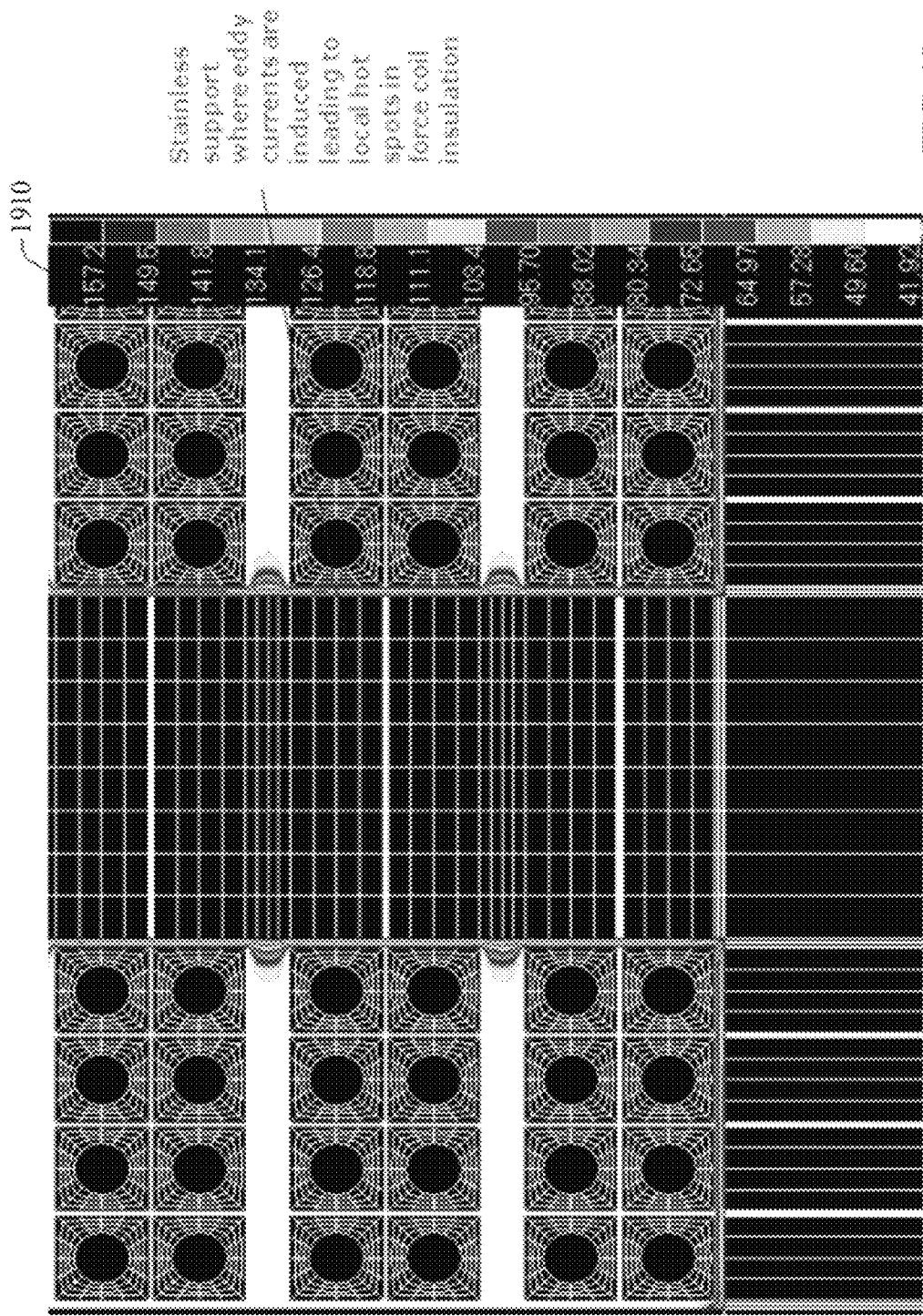
FIG. 19 presents results of an exemplary finite element thermal analysis of local heating of insulation material coating the one or more force coils.

Mitigation of eddy currents and associated heat dissipation in a baseplate, also referred to as base member, of an electromagnetic seismic vibrator (EMSV) described herein can be accomplished through a modification in the force tube of the baseplate. The force tube is a solid, continuous structure in the baseplate (see, e.g., base member 1830 in FIG. 18C) onto which one or more force coils can be overlaid. As illustrated in the exemplary embodiment in FIG. 18C, the base member is an integral metal member, such as a metal casting (e.g., a stainless steel casting) which is machined or otherwise processed to form specific structural features of the base member. In response to application of an electric current in a force coil of the one or more force coils, an eddy current develops primarily in the force tube and heat dissipation ensues. As an illustration, FIG. 19 presents results of a finite element thermal analysis of local heating of insulation material coating the one or more force coils. In such analysis, full-rating current at an excitation frequency of about 125 Hz is assumed. In one aspect, FIG. 19 presents a temperature profile in force coil insulation proximal to the force tube (e.g., in contact with the stainless steel that forms the force tube). The magnitude of the calculated temperature can be gleaned from scale 1910. Local hot spots are readily apparent. Near the boundary of the force tube temperatures exceed 150° C., which can reduce the lifetime of the insulation coating in case such elevated temperatures are maintained for extended periods.

Figure 20A:
FIG. 20A illustrates an exemplary embodiment of a composite structure having a modified structure that mitigates eddy current induction and associated heat dissipation in accordance with aspects described herein.
Figure 20B:
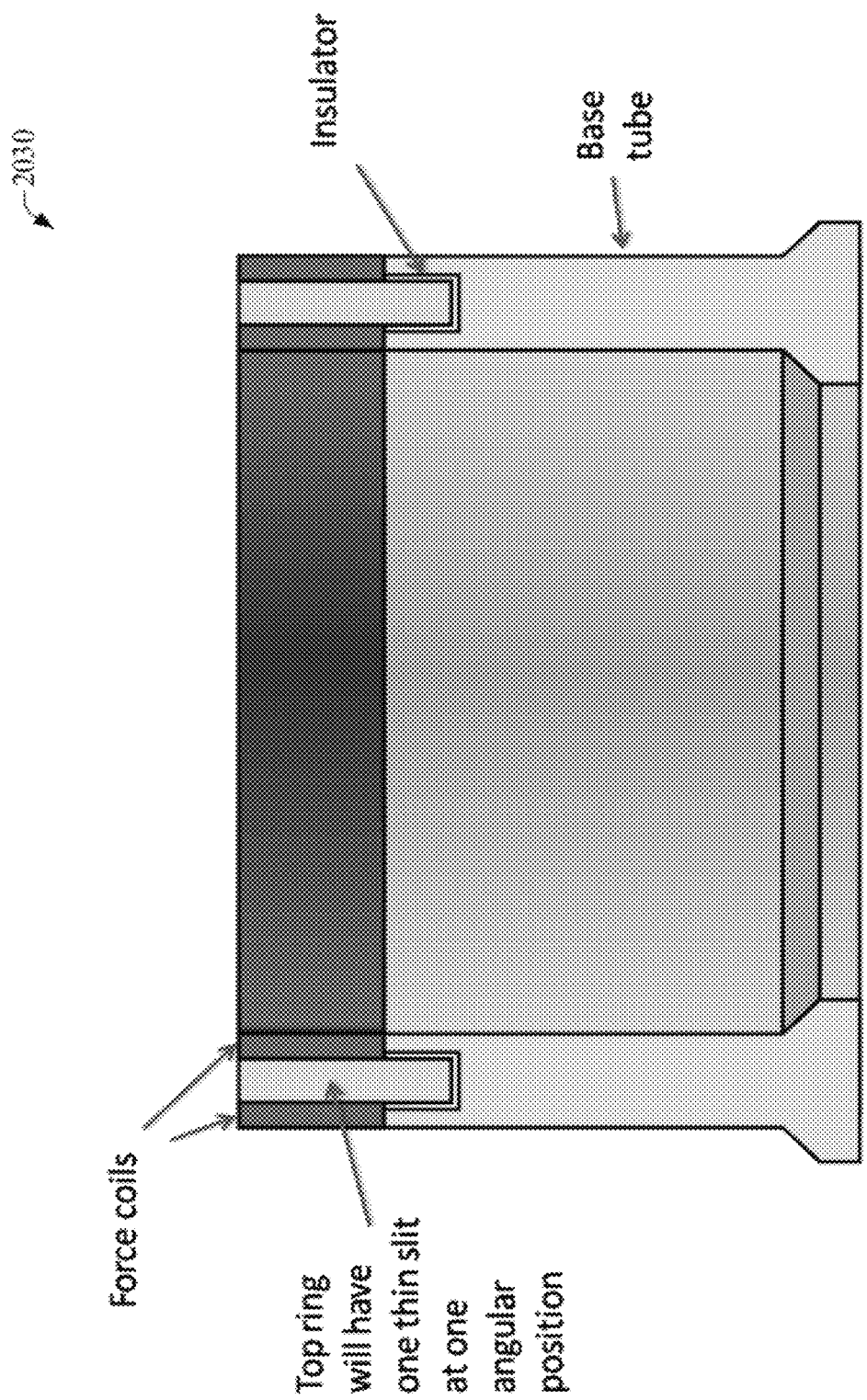
FIGS. 20B-20C are diagrams that present sections of the exemplary embodiment of the composite structure shown in FIG. 20A.

In one embodiment, the disclosed modification can comprise separation of a single-piece base member (e.g., annular base member 1850) into an upper end portion and an elongate lower portion. In one aspect, the upper end portion can have bottom end and the elongate lower portion can have a top end defining an annular slot that is configured to accept a portion of the upper end portion proximate to the bottom end of the upper end portion, as illustrated in FIG. 20B. The modification comprises provision (e.g., deposition) of an electrically insulating coating configured to reduce electrical conduction (e.g., transport of eddy currents) into the elongate lower portion. In one aspect, the electrically insulating coating is disposed therebetween the annular slot of the elongate lower portion and the portion of the upper end portion that is positioned therein the annular slot. In certain embodiments, the upper end portion can have a split-ring shape (see, e.g., FIG. 20A) having ends spaced apart a desired distance that is configured to prevent pathway for transport of an eddy current in the split-ring.

Figure 20C:
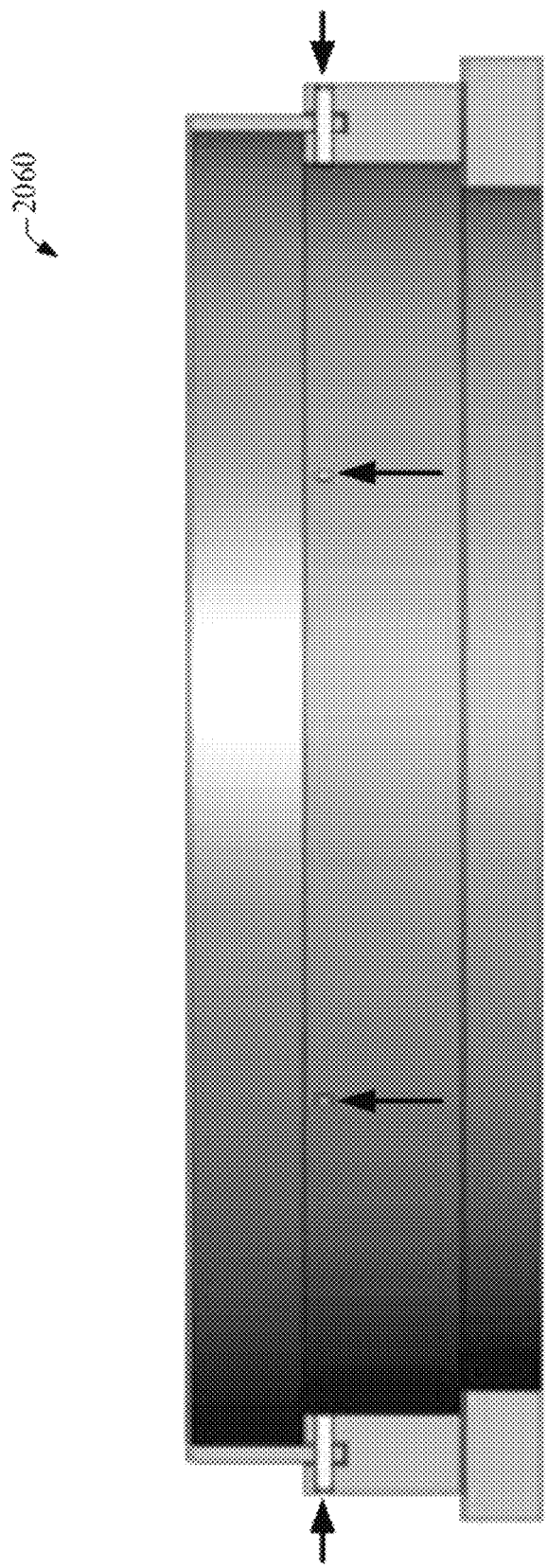

As described herein, the modified base member is an electrically insulated structure that can break a pathway for transport of an eddy current induced in the open ring member in response to application of an electric current in a force coil (e.g., alternative current applied to an ECR that comprises the force coils). It should be appreciated that breaking the pathway for transport of the eddy current advantageously allows the controllability of an EMSV having the modified base member. FIG. 20A illustrates an exemplary embodiment of a composite structure having the modified base member and the open ring member in accordance with aspects described herein. An open-head arrow indicates a slit that renders the open ring member open. FIGS. 20B-20C are diagrams that present sections of the exemplary embodiment of the composite structure shown in FIG. 20A. In diagram 2030, force coils are represented in dark grey hue and are overlaid on both the inner surface and the outer surface of the open-ring member. The electrically insulated channel in the base member also is indicated. In diagram 2060, black arrows indicate ceramic-coated dowel pins that can fasten the fitted portion of the open-ring member to the modified base member.

Figure 21:
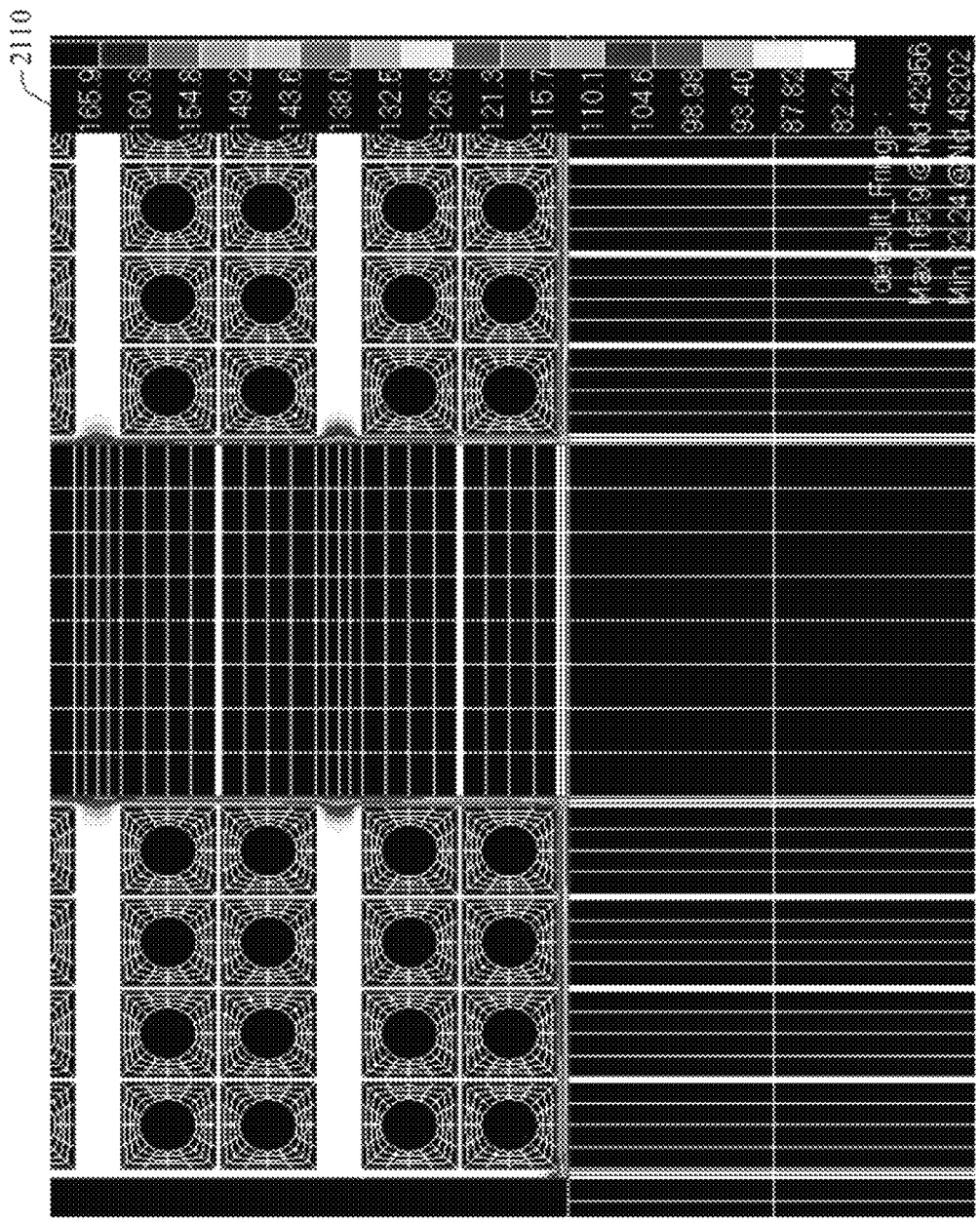
FIG. 21 presents exemplary results of computations of a force generated by a force coil as a function of an electric current applied to the force coil for different exemplary embodiments of an EMVS.

As an illustration, FIG. 21 presents results of an exemplary finite element thermal analysis of local heating of insulation material coating the one or more force coils. In such analysis, similarly to the exemplary analysis illustrated in FIG. 19, full-rating current at an excitation frequency of about 125 Hz is assumed. In one aspect, FIG. 21 presents a temperature profile in force coil insulation in proximity to the open ring member (see, e.g., FIG. 20B). The magnitude of the calculated temperature can be gleaned from scale 2110. In comparison to the temperature profile computed for a single-piece baseplate, the thermal analysis reveals that local hot spots have largely subsided and near the boundary of the open ring member, wherein temperature is expected to be higher, the computed temperatures remain mostly below 130° C. Accordingly, the temperatures attained in response to electric heating can be within the rating, or capability, of the insulation coating and, thus, such temperatures are unlikely to degrade the insulation coating.

When compared to a single-piece base member (e.g., annular base member 1850), the estimated power loss in the composite structure (e.g., a composite stainless steel structure) comprising the electrical insulation coating and the open-ring shaped member is reduced by about 27 kW at 125 Hz excitation frequency. It should be appreciated that such reduction in power loss can provide various design and performance improvements in an EMSV having the composite base member, such advantages including reduction in size of force coil power supply and prime mover that supplies power to the a power alternator that energizes the EMSV. Estimated power loss in the EMVS is about is 478 kW.

Figure 22A:
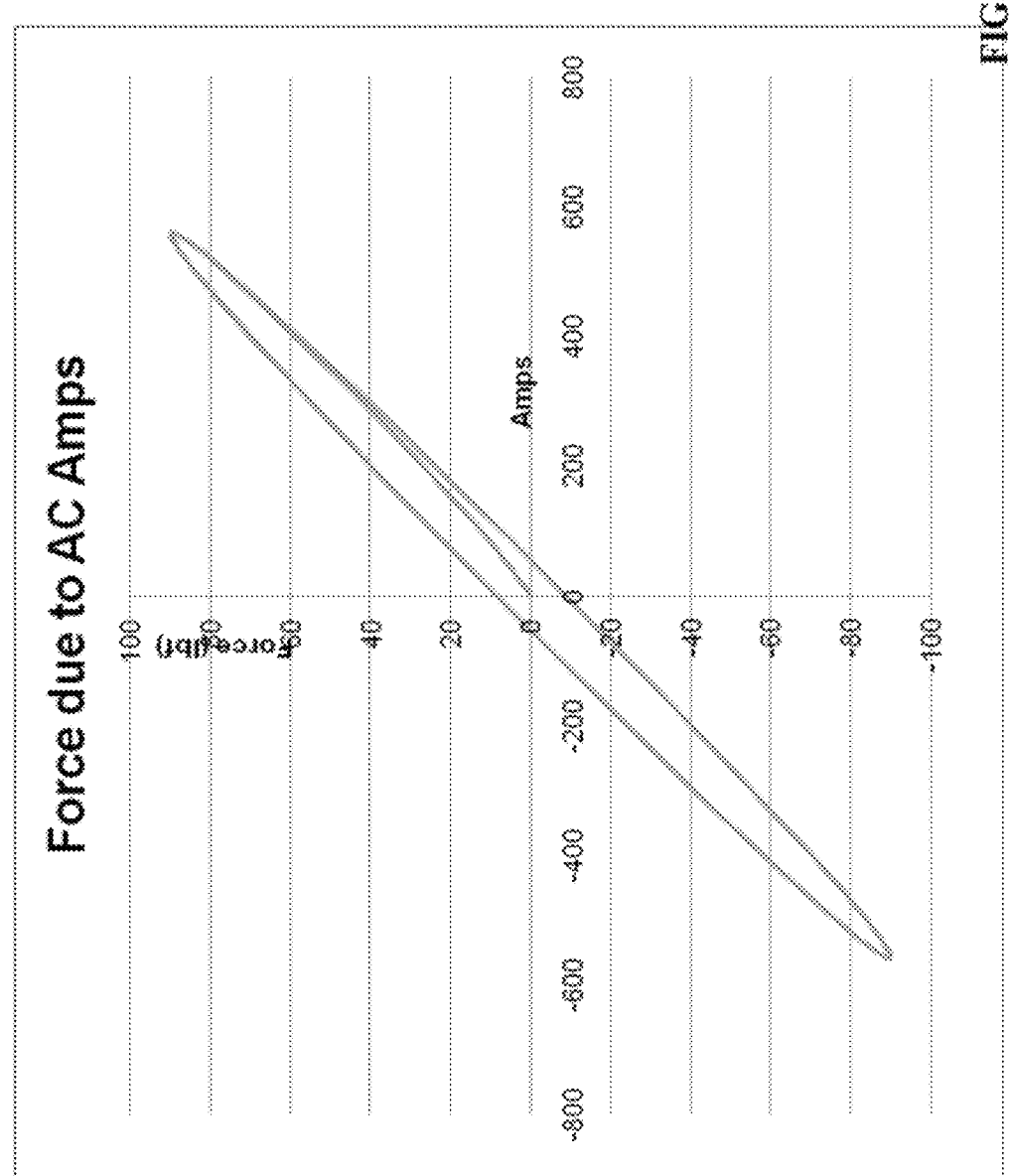
FIGS. 22A-22B illustrate an exemplary embodiment of a device that can cooperate with an EMVS of the disclosure to mitigate or avoid out-of-range excursions of a reaction member of the EMVS.

Another improvement attained through the composite structure (e.g., a composite stainless steel structure) comprising the insulation coating and the open ring member relates to controllability of the electromagnetic seismic vibrator. In one aspect, a force produced by an EMSV having a solid, single-piece (also referred to as integral) base member with a force tube that is an integral part of such base member can be analyzed with transient magnetodynamics formalisms. Such formalisms can include finite element magnetic application software for execution in a computing device. FIG. 22A is a chart 2200 presenting results of a computation of force generated by a force coil as a function of an electric current applied to the force coil. The force coil is par of the EMVS. The force is conveyed in lbf units and the current is conveyed in amperes (Amps). Due to finite time constant of an eddy current, the computed force generally is a double-valued function of the applied electric current and, therefore, hysteretic response is obtained. Accordingly, for an alternating current with a predetermined frequency and during a period of such current, the force can be non-zero when the magnitude of the alternating current is zero. For instance, at zero amplitude of an alternating electric current with a frequency of about 125 Hz, the force can be about 38 kN. It should be appreciated that the non-zero force when an AC of predetermined frequency generally depends on the frequency and decreases with decreasing frequency. As one outcome, the hysteretic behavior displayed in FIG. 22A can incorporate non-linearity and time delay to a response of the EMVS, thus making control difficult.

Figure 22B:
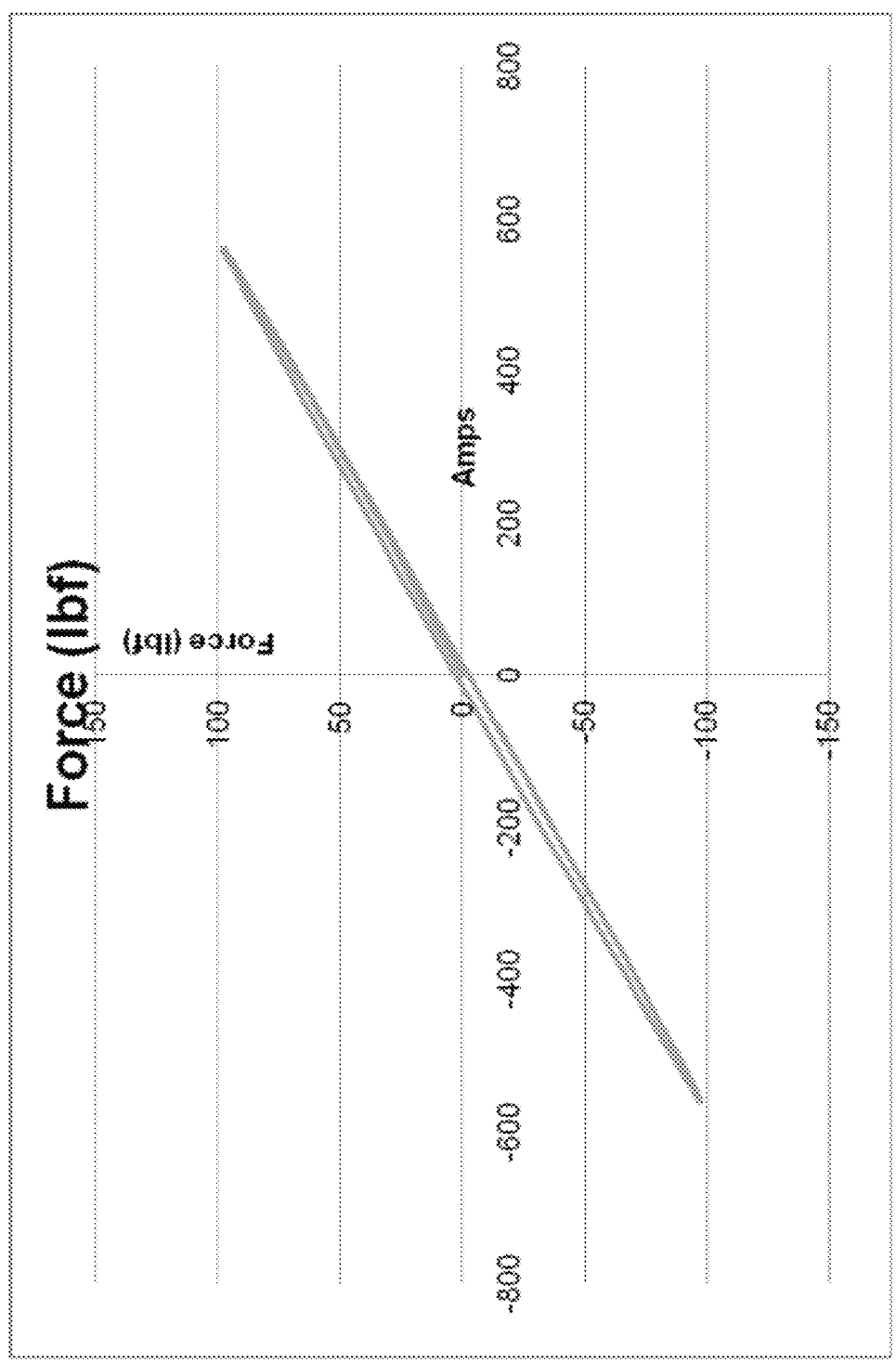

In contrast, for an EMVS that has a modified base member as described herein, the predicted force generated by a force coil overlaid onto the open ring member presents a substantially reduced hysteretic behavior, as illustrated in FIG. 22B. Without intending to be bound by theory, simulation, and/or modeling, mitigation of the hysteretic behavior is believed to originate in one or more of a reduction of magnitude of eddy currents induced in the open ring member, and a reduced relaxation time of such currents. Reduction of relaxation time of eddy currents induced in the open ring member causes such currents to vanish more quickly, with the ensuing lessening of a delay between application of the electric current and establishment of the resulting force. Accordingly, for an EMVS having force coils deployed in an open ring member as described herein, response of the EMVS to an applied electric current in the force coils is faster, with the ensuing improved controllability of such EMVS.

Figure 23A:
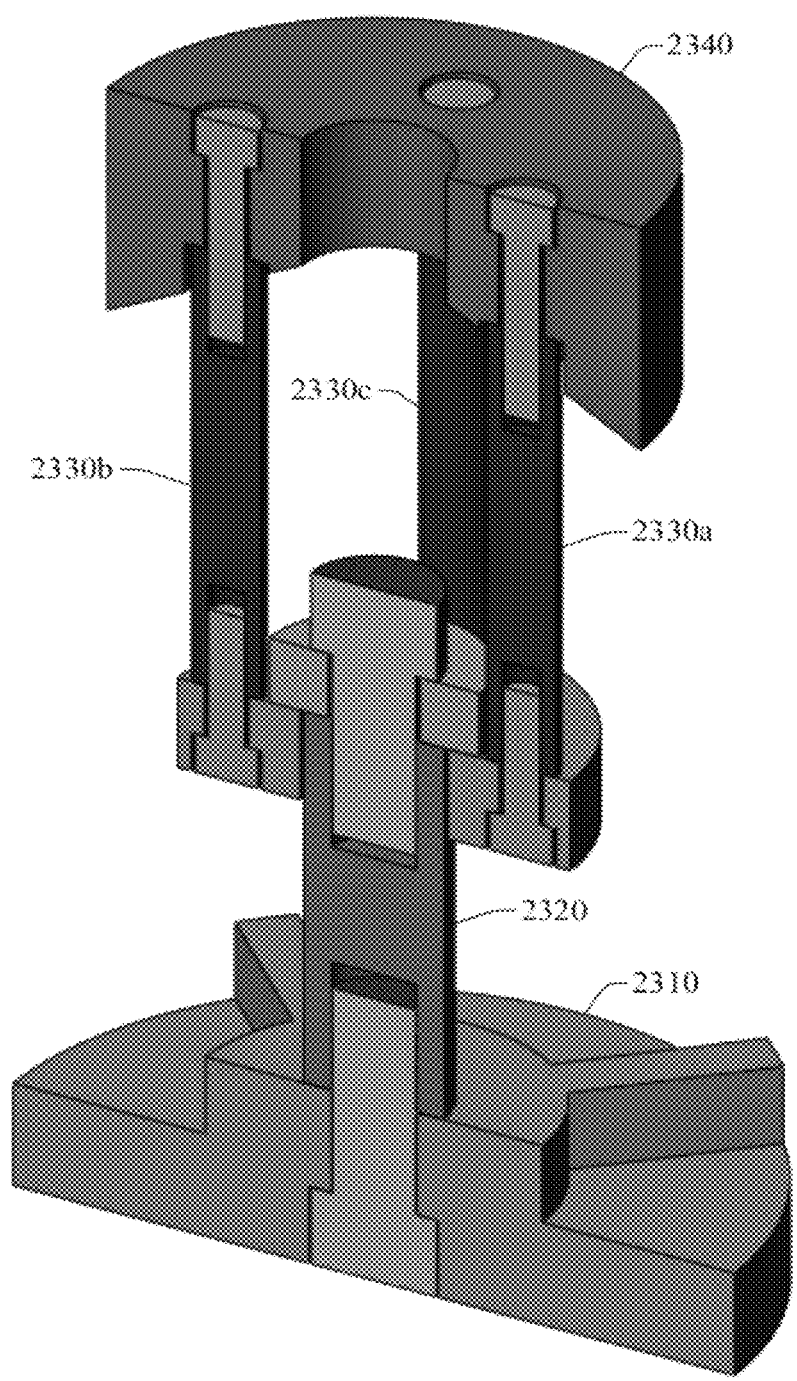
FIGS. 23A-23B illustrate and exemplary embodiment of a safety stoppage device of the disclosure integrated into an EMVS in accordance with aspects of the disclosure.
Figure 23B:
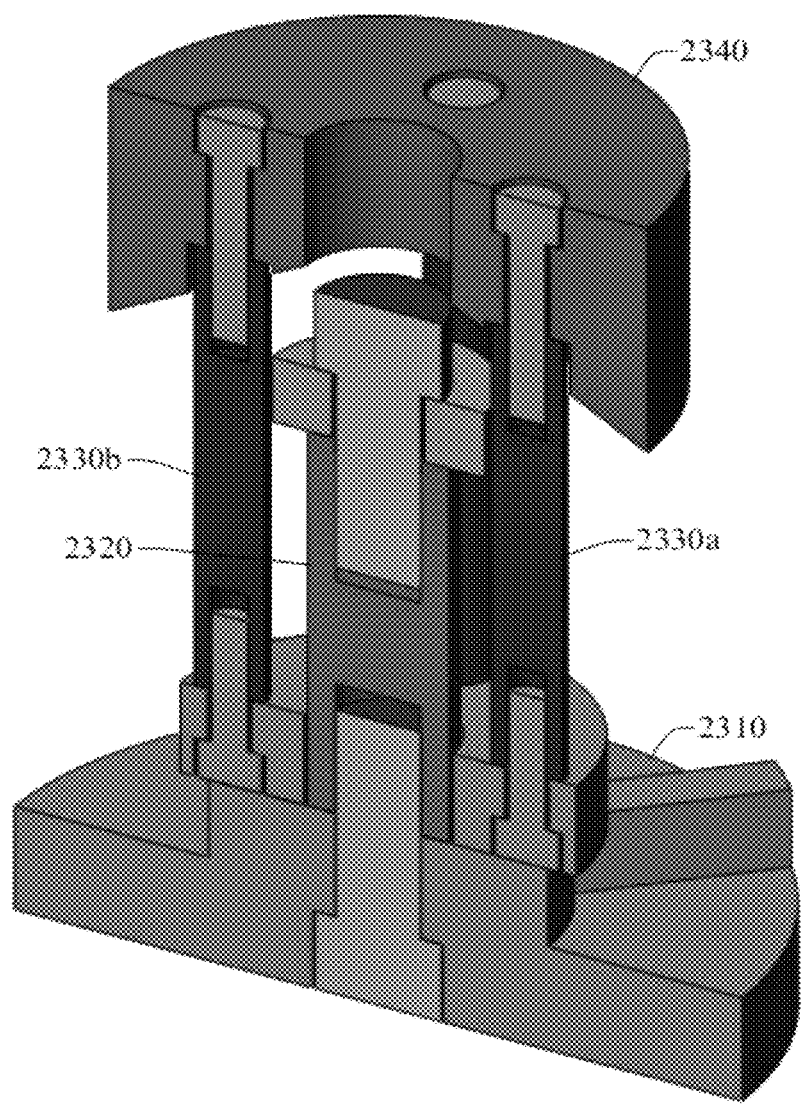

Levitation of a reaction member (e.g., reaction mass; see, e.g., FIG. 18B) in an EMVS can be accomplished through application and feedback control of an electric current applied to a field coil. Accordingly, in scenarios in which control may be lost, such levitation can be unstable, possibly leading to operational failure wherein the reaction member levitates at about a position that is outside range of stroke in the upward direction and features of the EMSV are damaged. To mitigate or avoid such failure, certain embodiments of the disclosure provide means for restricting axial movement of a reaction member of the EMSV relative to a base member of the EMSV. FIGS. 23A-23B present views of an exemplary embodiment of the means for restricting such axial movement. The means for restricting such movement can prevent out-of-range upward movement of the reaction member in the EMVS. To at least such end, in certain embodiments, the means for restricting axial movement of a reaction member can comprise a restriction assembly (also referred to as positive stop mechanism) configured to react at least a force exerted by the reaction member during operation of an EMVS having and configured to cooperate with restriction assembly. In one aspect, the restriction assembly can react to a force with a magnitude of at least about 60000 lbf. FIG. 23A and FIG. 23B illustrate, respectively, cross-section views of such embodiment in a full upward position and a full downward position. In the full upward position, the restriction assembly can restrain axial movement of the reaction member in the upward direction, whereas in the full downward position the restriction assembly can restrain axial movement of the reaction member in the downward direction. In certain embodiments, in response to upward axial movement, the restriction assembly can elongate to span at least about 5 in. In the embodiment illustrated in FIGS. 23A-23B, the structure of the restriction assembly (also referred to as positive stop) that bolts to the base can be about 2.625 in. In one aspect, 4340 carbon can permit steel tube threaded to accept 1½×" carbon steel alloy bolts. In another aspect, the top cap of the restriction assembly that can bolt to such tube can be a 304 stainless disk of about 3.75 in. in outer diameter (OD), about 1.625 in. in internal diameter (ID), and about 1.25 in. thick. In the illustrated embodiment, the cage structure which comprises the plurality of fasteners of the positive stop and that bolts to the reaction member can be comprised of 4, 304 stainless steel bars having about 1.375" in diameter and about 8.350" in length. In view of cross section, one fastener is not shown. Such bars can be threaded at each end for a ¾ in.-10 carbon steel alloy bolt. The platform 2310 (e.g., a disk) that can bolt to the bottom of these four bars to complete the cage structure and capture the striker plate anchored to the base can be about 7.00 in. in outer diameter (OD), about 2.625 in. in inner diameter (ID), and about 1.750 in. thick, and formed of 304 stainless steel.

In one embodiment (see, e.g., FIGS. 23A-23B), the restriction assembly can be formed from at least a metal, and can comprise a platform 2310 coupled to the base member and having a male protrusion 2320. As illustrated, the male protrusion can be a multi-part structure. In addition, the restriction assembly can comprise a plurality of fasteners (e.g., three fasteners 2320a-2320c and a fourth fastener not visible in the cross-sectional view, as illustrated in FIGS. 23A-23B) attached to the reaction member. Element 2340 in FIGS. 23A-23B represents a portion of the reaction member to which the plurality of fasteners is attached. The plurality of fasteners also is slidably coupled to the male protrusion 2320 of the platform 2310. Each fastener of the plurality of fasteners can be a multi-part assembly, as described herein. Each of such fasteners can be formed of a combination of metal and non-metal material, such a non-metal ceramic. In the alternative, such fasteners can be formed of a non-metal material.

As illustrated in FIGS. 23A through 24B, in certain embodiments, the restriction assembly can be integrated into an EMVS comprising a modified base member and an open ring member.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims or inventive concepts.

What is claimed is:

1. An apparatus for excitation of a seismic platform, the apparatus comprising:
    a reaction member;
    a first plurality of electrical conductor rings (ECRs) in communication with at least one source of electric current, the first plurality of ECRs being coupled to a portion of the reaction member, wherein the first plurality of ECRs is configured to transport a selectable first electric current effective to create a magnetic field of a desired strength;
    an annular base member having an upright upper end portion having an inner annular surface and an outer annular surface, wherein the reaction member is operatively coupled to the base member for selective axial movement about an equilibrium position relative to the annular base member; and
    a second plurality of ECRs in communication with the at least one source of electric current, the second plurality of ECRs being coupled to at least a portion of the inner annular surface or the outer annular surface of the upper end portion of the annular base member, wherein the second plurality of ECRs is configured to transport a selectable second electric current effective to operatively interact with the magnetic field generated by the first plurality of ECRs to selectively displace the reaction member from the equilibrium position, and wherein at least a portion of the second plurality of ECRs are transposed in a Roebel array.

2. The apparatus of claim 1, wherein the second plurality of ECRs comprised a first array of ECRs and a second array of ECRs, wherein the first array of ECRs is coupled to at least a portion of the inner annular surface of the upper end portion of the annular base member, wherein the second array of ECRs is coupled to at least a portion of the outer annular surface of the upper end portion of the annular base member.

3. The apparatus of claim 2, wherein the first array of ECRs and the second array of ECRs are both transposed in a Roebel array.

4. The apparatus of claim 1, wherein at least a portion of the first plurality of ECRs are transposed in a Roebel array.

5. The apparatus of claim 1, wherein the reaction member has a bottom surface in which an annular channel is defined that is sized and shaped to operatively accept at least the upper end portion of the annular base member.

6. The apparatus of claim 5, wherein annular base member has an elongate lower portion extending proximally from the upper end portion of the annular base member, and wherein the annular channel is sized and shaped to operatively accept at least a portion of the elongate lower portion of the annular base member.

7. The apparatus of claim 6, wherein the annular channel of the reaction member has a pair of opposed upright walls, and wherein the reaction member further comprises a pair of opposing sleeves mounted to the pair of opposed upright walls, each sleeve being formed of a material suitable to reduce an imposed magnetic field generated through the second plurality of ECRs on portions of the reaction member in proximity to the second plurality of ECRs.

8. The apparatus of claim 6, wherein the upper end portion and the elongate lower portion of the annular base member are separate members, wherein the upper end portion has a bottom end, and wherein the elongate lower portion has a top end defining an annular slot that is configured to accept a portion of the upper end portion proximate to the bottom end of the upper end portion.

9. The apparatus of claim 8, further comprising an electrically insulating coating configured to reduce electrical conduction into the lower portion of the annular base member from the operatively coupled upper end portion, wherein the electrically insulating coating is disposed therebetween the annular slot of the elongate lower portion of the annular base member and the portion of the between the upper end portion of the annular base member that is positioned therein the annular slot.

10. The apparatus of claim 8, wherein the upper end portion has a split-ring shape having ends spaced apart a desired distance that is configured to prevent a pathway for transport of an eddy current in the split-ring.

11. The apparatus of claim 1, further comprising a means for restricting the axial movement of the reaction member relative to the base member during operation of the apparatus.

12. The apparatus of claim 11, wherein the means for restricting the axial movement comprises a restriction assembly configured to react at least a force exerted by the reaction member during operation of the apparatus.

13. The apparatus of claim 12, wherein the restriction assembly comprises:
    a platform coupled to the base member and having a male protrusion; and
    a plurality of fasteners attached to the reaction member and slidably coupled to the male protrusion of the platform.

14. The apparatus of claim 1, further comprising a control system coupled to the first and second ECRs and programmed to selectively supply a selectable and desired waveform of electric current to the respective first and second ECRs to selectively control at least one of amplitude and frequency of the selective axial movement of the reaction member relative to the annular base member and about the equilibrium position.

15. The apparatus of claim 1, wherein the second electric current is an alternating current having a frequency that is at least 4 Hz.

16. The apparatus of claim 1, wherein the second electric current is an alternating current having a frequency that is at most 225 Hz.

17. The apparatus of claim 1, wherein the reaction member comprises a plurality of metal castings.

18. The apparatus of claim 1, wherein the base member is integral and formed from a metal.

19. The apparatus of claim 1, wherein the base member is a metal casting.

20. An apparatus for excitation of a seismic platform, the apparatus comprising:
  a reaction member;
  a first plurality of electrical conductor rings (ECRs) in communication with at least one source of electric current, the first plurality of ECRs being coupled to a portion of the reaction member, wherein the first plurality of ECRs is configured to transport a selectable first electric current effective to create a magnetic field of a desired strength;
  an annular base member having an upright upper end portion and an elongate lower portion, the upper end portion having bottom end, an inner annular surface and an outer annular surface, the elongate lower portion having a top end defining an annular slot that is configured to accept a portion of the upper end portion proximate to the bottom end of the upper end portion, wherein the upper end portion has a split ring shape, and wherein the reaction member is operatively coupled to the base member for selective axial movement about an equilibrium position relative to the annular base member; and
  a second plurality of ECRs in communication with the at least one source of electric current, the second plurality of ECRs being coupled to at least a portion of the inner annular surface or the outer annular surface of the upper end portion of the annular base member, wherein the second plurality of ECRs is configured to transport a selectable second electric current effective to operatively interact with the magnetic field generated by the first plurality of ECRs to selectively displace the reaction member from the equilibrium position, and wherein at least a portion of the second plurality of ECRs are transposed in a Roebel array.

21. The apparatus of claim 20, wherein the reaction member has a bottom surface in which an annular channel is defined that is sized and shaped to operatively accept the upper portion of the annular base member and at least a portion of the elongate lower portion of the annular base member.

22. The apparatus of claim 21, wherein the annular channel of the reaction member has a pair of opposed upright walls, and wherein the reaction member further comprises a pair of opposing sleeves mounted to the pair of opposed upright walls, each sleeve being formed of a material suitable to reduce an imposed magnetic field generated through the second plurality of ECRs on portions of the reaction member in proximity to the second plurality of ECRs.

23. The apparatus of claim 20, wherein the second plurality of ECRs comprised a first array of ECRs and a second array of ECRs, wherein the first array of ECRs is coupled to at least a portion of the inner annular surface of the upper end portion of the annular base member, wherein the second array of ECRs is coupled to at least a portion of the outer annular surface of the upper end portion of the annular base member.

24. The apparatus of claim 23, wherein the first array of ECRs and the second array of ECRs are both transposed in a Roebel array.

25. The apparatus of claim 20, wherein at least a portion of the first plurality of ECRs are transposed in a Roebel array.

26. The apparatus of claim 20, further comprising an electrically insulating coating configured to reduce electrical conduction into the lower portion of the annular base member from the operatively coupled upper end portion, wherein the electrically insulating coating is disposed therebetween the annular slot of the elongate lower portion of the annular base member and the portion of the between the upper end portion of the annular base member that is positioned therein the annular slot.

27. The apparatus of claim 20, further comprising a means for restricting the axial movement of the reaction member relative to the base member during operation of the apparatus.

28. The apparatus of claim 20, further comprising a control system coupled to the first and second ECRs and programmed to selectively supply a selectable and desired waveform of electric current to the respective first and second ECRs to selectively control at least one of amplitude and frequency of the selective axial movement of the reaction member relative to the annular base member and about the equilibrium position.

* * * * *